United States Patent
Denney et al.

(10) Patent No.: US 7,289,206 B2
(45) Date of Patent: *Oct. 30, 2007

(54) METHOD AND APPARATUS FOR DETECTING EMBEDDED REBAR WITHIN AN INTERACTION REGION OF A STRUCTURE IRRADIATED WITH LASER LIGHT

(75) Inventors: Paul E. Denney, Columbus, OH (US); Jay R. Eastman, Westerville, OH (US); Ta-Chieh Huang, Dublin, OH (US)

(73) Assignee: Loma Linda University Medical Center, Loma Linda, CA (US)

( * ) Notice: Subject to any disclaimer, the term of this patent is extended or adjusted under 35 U.S.C. 154(b) by 376 days.

This patent is subject to a terminal disclaimer.

(21) Appl. No.: 10/803,267

(22) Filed: Mar. 18, 2004

(65) Prior Publication Data

US 2004/0182999 A1  Sep. 23, 2004

Related U.S. Application Data

(63) Continuation-in-part of application No. 10/691,444, filed on Oct. 22, 2003.

(60) Provisional application No. 60/496,460, filed on Aug. 20, 2003, provisional application No. 60/471,057, filed on May 16, 2003, provisional application No. 60/456,043, filed on Mar. 18, 2003.

(51) Int. Cl.
   *G01J 3/18* (2006.01)
   *G01J 3/30* (2006.01)
   *G01N 21/63* (2006.01)

(52) U.S. Cl. .................. 356/318; 356/328

(58) Field of Classification Search ................ 356/318, 356/326, 328

See application file for complete search history.

(56) References Cited

U.S. PATENT DOCUMENTS 3,569,660 A     3/1971  Houldcroft et al.

(Continued)

FOREIGN PATENT DOCUMENTS

EP           0 521 194 A       1/1993

(Continued)

OTHER PUBLICATIONS

PCT International Search Report dated Sep. 23, 2003 in 5 pages.

(Continued)

*Primary Examiner*—F. L. Evans
(74) *Attorney, Agent, or Firm*—Knobbe Martens Olson & Bear LLP

(57) ABSTRACT

A detection system is used during irradiation of an interaction region of a structure including embedded material with laser light. The detection system includes a collimating lens positioned to receive light emitted from the interaction region. The detection system further includes an optical fiber optically coupled to the collimating lens and a spectrometer optically coupled to the optical fiber. The spectrometer is adapted for analysis of the light for indications of the embedded material within the interaction region. The spectrometer includes an input slit adapted to receive light from the optical fiber. The input slit has a width selected to provide sufficient light transmittance and sufficient resolution. The spectrometer further includes an optical grating adapted to receive light from the input slit and to separate the light into a spectrum of wavelengths. The spectrometer further includes a collection lens adapted to receive a selected range of wavelengths of the separated light from the optical grating. The spectrometer further includes a light sensor adapted to receive the selected range of wavelengths and to generate a signal corresponding to an intensity of the received light.

21 Claims, 37 Drawing Sheets

U.S. PATENT DOCUMENTS

| | | | |
|---|---|---|---|
| 3,871,485 A | 3/1975 | Keenan, Jr. | |
| 4,060,327 A | 11/1977 | Jacobowitz et al. | |
| 4,151,393 A | 4/1979 | Fenneman et al. | |
| 4,227,582 A | 10/1980 | Price | |
| 4,568,814 A | 2/1986 | Hamasaki et al. | |
| 4,675,501 A | 6/1987 | Klingel | |
| 4,896,015 A | 1/1990 | Taboada et al. | |
| 5,026,966 A | 6/1991 | Roth | |
| 5,034,010 A | 7/1991 | Kittrell et al. | |
| 5,085,026 A | 2/1992 | McGill et al. | |
| 5,107,516 A | 4/1992 | Dressel et al. | |
| 5,148,446 A | 9/1992 | Radich | |
| 5,256,852 A | 10/1993 | Boudot | |
| 5,554,335 A | 9/1996 | Fields et al. | |
| 5,592,283 A | 1/1997 | Flesher et al. | |
| 5,657,595 A | 8/1997 | Fyfe et al. | |
| 5,664,389 A | 9/1997 | Williams | |
| 5,717,487 A * | 2/1998 | Davies | 356/328 |
| 5,780,806 A | 7/1998 | Ferguson et al. | |
| 5,782,043 A | 7/1998 | Duncan et al. | |
| 5,847,825 A | 12/1998 | Alexander | |
| 5,920,938 A | 7/1999 | Elcock et al. | |
| 5,977,515 A | 11/1999 | Uraki et al. | |
| 5,986,234 A | 11/1999 | Matthews et al. | |
| 6,056,827 A | 5/2000 | Fukui et al. | |
| 6,064,034 A | 5/2000 | Rieck | |
| 6,114,676 A | 9/2000 | Jerby et al. | |
| 6,147,754 A | 11/2000 | Theriault et al. | |
| 6,191,382 B1 | 2/2001 | Damikolas | |
| 6,201,214 B1 | 3/2001 | Duffin | |
| 6,215,094 B1 | 4/2001 | Dausinger et al. | |
| 6,288,362 B1 | 9/2001 | Thomas et al. | |
| 6,288,363 B1 | 9/2001 | Kaga et al. | |
| 6,350,326 B1 | 2/2002 | McCay et al. | |
| 6,417,487 B2 | 7/2002 | Nagura et al. | |
| 6,507,000 B2 | 1/2003 | Otsubo et al. | |
| 6,521,864 B2 | 2/2003 | Bertez et al. | |
| 6,614,002 B2 | 9/2003 | Weber | |
| 6,649,866 B2 | 11/2003 | Reichmann et al. | |
| 6,664,495 B2 | 12/2003 | Yamaguchi et al. | |
| 6,664,504 B2 | 12/2003 | Bertez | |
| 6,667,458 B1 | 12/2003 | Sirat | |
| 6,670,571 B2 | 12/2003 | Dance | |
| 6,670,575 B1 | 12/2003 | Wrba et al. | |
| 6,683,277 B1 | 1/2004 | Millard et al. | |
| 6,693,255 B2 | 2/2004 | Freiwald et al. | |
| 6,693,256 B2 | 2/2004 | Furujo et al. | |
| 6,720,567 B2 | 4/2004 | Fordahl et al. | |
| 6,777,646 B2 | 8/2004 | Schubert | |
| 6,791,061 B2 | 9/2004 | Fujii et al. | |
| 6,797,919 B1 | 9/2004 | Millard et al. | |
| 6,875,951 B2 | 4/2005 | Sakamoto et al. | |
| 7,038,166 B2 | 5/2006 | Denney et al. | |
| 2003/0132210 A1 | 7/2003 | Fujii et al. | |
| 2003/0183608 A1 | 10/2003 | Yamazaki et al. | |
| 2003/0222062 A1 | 12/2003 | Brown et al. | |
| 2004/0182840 A1 | 9/2004 | Denney et al. | |
| 2004/0182841 A1 | 9/2004 | Denney et al. | |
| 2004/0182842 A1 | 9/2004 | Denney et al. | |
| 2004/0182998 A1 | 9/2004 | Denney et al. | |
| 2004/0208212 A1 | 10/2004 | Denney et al. | |
| 2005/0040150 A1 | 2/2005 | Denney et al. | |
| 2006/0065650 A1 | 3/2006 | Guo | |

FOREIGN PATENT DOCUMENTS

| | | |
|---|---|---|
| EP | 0 540 745 A | 5/1993 |
| EP | 1 189 241 A1 | 3/2002 |
| EP | 1 236 535 A2 | 9/2002 |
| JP | 59-87992 | 9/1984 |
| JP | 59087992 A2 | 9/1984 |
| JP | 62179884 A | 8/1987 |
| JP | 63157778 A | 6/1988 |
| JP | 63157780 A | 6/1988 |
| JP | 63-224891 | 9/1988 |
| JP | 63224891 A | 9/1988 |
| JP | 03081080 A | 4/1991 |
| JP | 04316000 A | 11/1992 |
| JP | 7-269130 | 10/1995 |
| JP | 07269130 A | 10/1995 |
| JP | 9-242453 | 9/1997 |
| JP | 09242453 | 9/1997 |
| JP | 10331434 A | 12/1998 |
| JP | 11019785 A | 1/1999 |
| JP | 2002-5899 | 1/2002 |
| JP | 2002-296183 | 10/2002 |
| WO | PCT/US2004/008229 | 7/1989 |
| WO | WO89/06519 A | 7/1989 |
| WO | WO 00/37208 | 12/1999 |
| WO | WO 03/028941 A1 | 4/2003 |
| WO | WO 03/028943 A1 | 4/2003 |
| WO | WO 03/061895 A1 | 7/2003 |
| WO | PCT/US2004/008070 | 3/2004 |
| WO | PCT/US2004/008219 | 3/2004 |
| WO | PCT/US2004/008312 | 3/2004 |
| WO | PCT/US2004/008314 | 3/2004 |
| WO | PCT/US2005/029027 | 8/2004 |

OTHER PUBLICATIONS

"Study on Laser Cutting of Concrete," Hiroshi Yoshizawa, Sivakumaran Wignarajeh, and Hideaki Saito, *Transactions of the Japan Welding Society*, vol. 20, No. 1, Apr. 1989, pp. 31-36.

Rümenapp, T., et al., "Laser Beam Cutting of Concrete," *Key Engineering Materials*, Fraunhofer Institute Material and Beam Technology Dresden, D-01277 Dresden, Germany, vol. 250, 2003, pp. 257-261.

U.S. Appl. No. 10/690,983, filed Oct. 22, 2003, Copending related specification, Filing Receipt, and drawings.

U.S. Appl. No. 10/690,833, filed Oct. 22, 2003, Copending related specification, Filing Receipt, and drawings.

U.S. Appl. No. 10/690,975, filed Oct. 22, 2003, Copending related specification, Filing Receipt, and drawings.

U.S. Appl. No. 10/691,481, filed Oct. 22, 2003, Copending related specification, Filing Receipt, and drawings.

U.S. Appl. No. 10/691,444, filed Oct. 22, 2003, Copending related specification, Filing Receipt, and drawings.

U.S. Appl. No. 10/803,272, filed Mar. 18, 2004, Copending related specification, Filing Receipt, and drawings.

U.S. Appl. No. 10/803,243, filed Mar. 18, 2004, Copending related specification, Filing Receipt, and drawings.

* cited by examiner

METHOD AND APPARATUS FOR DETECTING EMBEDDED REBAR WITHIN AN INTERACTION REGION OF A STRUCTURE IRRADIATED WITH LASER LIGHT

CLAIM OF PRIORITY

This application is a continuation-in-part from U.S. patent application Ser. No. 10/691,444, filed Oct. 22, 2003, which claims benefit under 35 U.S.C. § 119(e) to U.S. Provisional Patent Application No. 60/456,043, filed Mar. 18, 2003, to U.S. Provisional Patent Application No. 60/471,057, filed May 16, 2003, and to U.S. Provisional Patent Application No. 60/496,460, filed Aug. 20, 2003, each of which is incorporated in its entirety by reference herein.

RELATED APPLICATIONS

This application is related to U.S. patent application Ser. Nos. 10/690,983, 10/690,975, 10/691,481, and 10/691,444, each of which were filed on Oct. 22, 2003 and each of which is incorporated in its entirety by reference herein. This application is also related to U.S. patent applications Ser. Nos. 10/803,272 and 10/803,243 both of which were filed on Mar. 18, 2004, and both of which are incorporated in their entireties by reference herein.

STATEMENT REGARDING FEDERALLY SPONSORED RESEARCH OR DEVELOPMENT

This invention was funded, in part, by the Federal Emergency Management Agency as part of the Robert T. Stafford Disaster Relief and Emergency Assistance Act (42 U.S.C. § 5121 et seq.).

BACKGROUND OF THE INVENTION

1. Field of the Invention

The present invention relates to the field of material processing, particularly, to an apparatus and method for drilling, cutting, and surface processing of materials using energy waves.

2. Description of the Related Art

Those in the wide ranging materials processing industries have long recognized the need for non-disruptive material processing. In the past, virtually all material processing, including drilling, cutting, scabbling, and the like have included numerous disruptive aspects (e.g., noise, vibration, dust, vapors, and fumes). Material processing generally includes mechanical technologies such as drilling, hammering, and other power assisted methods, and water jet based technologies. Demonstrative of the problems of material processing, U.S. Pat. No. 5,085,026 is highly illustrative. The '026 device requires mechanical drilling of materials such as concrete or other masonry, and generates all the disruptive aspects noted above.

SUMMARY OF THE INVENTION

In certain embodiments, a detection system is used during irradiation of an interaction region of a structure with laser light. The structure comprises embedded material. The detection system comprises a focusing lens positioned to receive light emitted from the interaction region. The detection system further comprises an optical fiber optically coupled to the focusing lens to receive light from the focusing lens. The detection system further comprises a spectrometer optically coupled to the optical fiber to receive light from the optical fiber. The spectrometer is adapted for analysis of the light for indications of the embedded material within the interaction region.

In certain embodiments, a detection system is used during irradiation of an interaction region of a structure with laser light. The structure comprises embedded material. The detection system comprises means for focusing light emitted from the interaction region. The detection system further comprises means for separating the focussed light into a spectrum of wavelengths. The detection system further comprises means for analyzing at least a portion of the spectrum for indications of embedded material within the interaction region.

In certain embodiments, a method detects rebar within a laser-irradiated interaction region of a structure comprising embedded material. The method comprises focussing light from the interaction region. The method further comprises separating the light into a spectrum of wavelengths. The method further comprises analyzing at least a portion of the spectrum for indications of embedded material within the interaction region.

In certain embodiments, a detection system is used during irradiation of an interaction region of a structure with laser light. The structure comprises embedded material. The detection system comprises a collimating lens positioned to receive light emitted from the interaction region. The detection system further comprises an optical fiber optically coupled to the collimating lens to receive light from the collimating lens. The detection system further comprises a spectrometer optically coupled to the optical fiber to receive light from the optical fiber. The spectrometer is adapted for analysis of the light for indications of the embedded material within the interaction region. The spectrometer comprises an input slit adapted to receive light from the optical fiber. The input slit has a width selected to provide sufficient light transmittance and sufficient resolution. The spectrometer further comprises an optical grating adapted to receive light from the input slit and to separate the light into a spectrum of wavelengths. The spectrometer further comprises a collection lens adapted to receive a selected range of wavelengths of the separated light from the optical grating. The spectrometer further comprises a light sensor adapted to receive the selected range of wavelengths and to generate a signal corresponding to an intensity of the received light.

In certain embodiments, a detection system is used during irradiation of an interaction region of a structure with laser light. The structure comprises embedded material. The detection system comprises means for collecting light emitted from the interaction region. The detection system further comprises means for separating the collected light into a spectrum of wavelengths. The detection system further comprises means for analyzing at least a portion of the spectrum for indications of embedded material within the interaction region.

In certain embodiments, a method detects embedded material within a laser-irradiated interaction region of a structure comprising the embedded material. The method comprises collecting light from the interaction region. The method further comprises separating the collected light into a spectrum of wavelengths. The method further comprises analyzing at least a portion of the spectrum for indications of the embedded material within the interaction region.

For purposes of summarizing the present invention, certain aspects, advantages and novel features of the present invention have been described herein above. It is to be understood, however, that not necessarily all such advantages may be achieved in accordance with any particular embodiment of the present invention. Thus, the present invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Without limiting the scope of the present invention as claimed below and referring now to the drawings and figures:

DETAILED DESCRIPTION OF THE PREFERRED EMBODIMENT

Figure 1:
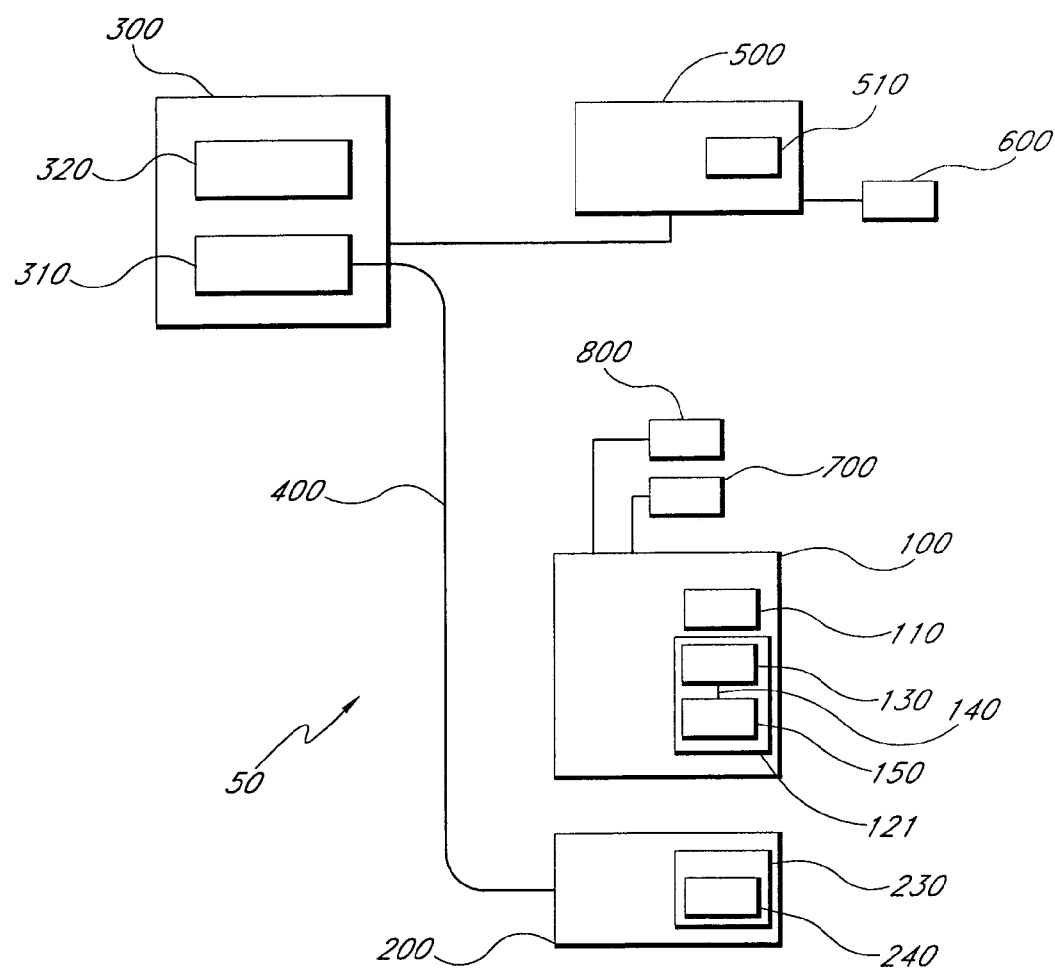
FIG. 1 schematically illustrates an embodiment of an apparatus for processing a surface of a structure.

Reducing the disruptive aspects of material processing has long been a goal of those in materials processing industries, particularly in industries that require materials processing within or near occupied structures, such as is common in renovation and many other applications. Such long-felt needs have been particularly prevalent in seismically active areas of the earth, where there is a pressing need for an effective and economical means of retrofitting occupied structures to increase the safety of these structures.

Prior technologies are plagued by disruptive characteristics, thereby making them virtually unsuitable for retrofitting occupied structures. Additionally, such material processing technologies often present dangerous and costly "cut through" dangers. "Cut through" dangers include instances such as a worker unintentionally cutting an embedded object while drilling through the subject material. For example, a construction worker drilling a hole in an existing concrete wall may accidentally encounter reinforcing steel or rebar, or embedded utilities, such as live electrical conduit and conductors. Such an incident may result in costly damage to tools or the subject material, as well as potentially deadly consequences (e.g., electrocution) for workers. Traditional drilling methods also can include "punch through" dangers of unexpectedly punching through the material drilled and damaging structures or personnel on the opposite side of the material.

In addition, traditional material processing equipment has been extremely burdensome to operate. Handheld power drilling and hammering devices commonly weigh in excess of fifty pounds and are often required to be held overhead by the operator for extended period of time. Conventional devices also typically produce jarring forces that the operator must absorb while holding the device. Besides the potentially injurious jarring forces, sustained heavy lifting, and "cut through" dangers, the operator and those in the vicinity of the device may be exposed to falling or projectile debris, as well as dust, fumes, vapors, vibration, and noise.

This level of noisome activity is unsuitable in general for occupied structures, and is entirely unsuitable for structures used as hospitals, laboratories, and the like, where noise and vibration can be completely unacceptable.

What continues to be needed but missing from this field of art is a non-disruptive material processing technology that overcomes the drawbacks illustrated above. In certain embodiments described herein, energy waves are directed toward the surface to be processed to overcome some or all of such drawbacks. The energy waves of certain embodiments are electromagnetic waves (e.g., laser light, microwaves), while in other embodiments, they are acoustic waves (e.g., ultrasonic waves). However, in certain embodiments, such cutting units can be as bulky and often are as difficult to maneuver as their mechanical counterparts. In addition, lasers can be subject to the same "cut through" dangers as described above, wherein objects hidden within the matrix of the material to be processed can be inadvertently damaged. Lasers can also pose additional dangers of "punch through" with danger to persons or objects in the path of the laser beam. Lasers can also present complexities in removing drilled material from a cut or a drilled hole. In certain embodiments, the laser system would incorporate a remote laser generator communicating with a portable processing head that incorporates numerous non-disruptive and safety features allowing the system to be utilized within or near occupied structures.

Certain embodiments of the present invention provide fast material processing while addressing many of the shortcomings of prior technologies and allowing for heretofore unavailable benefits (e.g., reduced disruption to activities within the structure). In certain embodiments, the method and apparatus utilize fiber connections between elements such that noisy, bulky, and heavy elements can operate at a significant distance from the actual work area. Certain embodiments are low in both noise and vibration during operation, and effectively remove dust and debris. Certain embodiments include a detection system to reduce the dangers of "cut through" or "punch through." Certain embodiments enhance worker safety by allowing workers to be located away from the work area during material processing. Certain embodiments are separable into man-portable pieces (e.g., less than 50 pounds) to facilitate transportation to locations in proximity to or within the structure being processed by providing easy and fast portability and set-up.

Certain embodiments of the present invention provide a method and apparatus for processing fragile structures which may be damaged by conventional processing techniques. For example, using conventional saws for processing concrete grain silos as part of a retrofit or refurbishment process may result in vibrations damaging to other portions of the silo. Using a laser to process the fragile structure can reduce the collateral damage done to the structure during processing. Furthermore, certain embodiments described herein are easily assembled/disassembled, so they can be used in otherwise inaccessible portions of the structures. While embodiments described herein are disclosed in terms of processing man-made structures, in still other embodiments, the present invention can be useful for processing natural formations (e.g., as part of a mining or drilling operation).

The method and apparatus described herein represent a significant advance in the state of the art. Various embodiments of the apparatus comprise new and novel arrangements of elements and methods that are configured in unique and novel ways and which demonstrate previously unavailable but desirable capabilities. In particular, certain embodiments of the present invention provide a material processing method that is quiet, substantially vibration-free, and less likely to exude dust, debris, or noxious fumes. Additionally, certain embodiments allow a higher rate of material processing than do conventional technologies.

The detailed description set forth below in connection with the drawings is intended merely as a description of various embodiments of the present invention, and is not intended to represent the only form in which the present invention may be constructed or utilized. The description sets forth illustrated embodiments of the designs, functions, apparatus, and methods of implementing the invention. It is to be understood, however, that the same or equivalent functions and features may be accomplished by different embodiments that are also intended to be encompassed within the spirit and scope of the invention.

FIG. 1 schematically illustrates an embodiment of an apparatus 50 for processing a structure having a surface. The apparatus 50 comprises a laser base unit 300, a laser manipulation system 100, and a controller 500. The laser base unit 300 is adapted to provide laser light to an interaction region and includes a laser generator 310 and a laser head 200 coupled to the laser generator 310. The laser head 200 is adapted to remove the material from the interaction region. The laser manipulation system 100 includes an anchoring mechanism 110 adapted to be releasably coupled to the structure and a positioning mechanism 121 coupled to the anchoring mechanism 110 and coupled to the laser head 200. The laser manipulation system 100 is adapted to controllably adjust the position of the laser head 200 relative to the structure. The controller 500 is electrically coupled to the laser base unit 300 and the laser manipulation system 100. The controller 500 is adapted to transmit control signals to the laser base unit 300 and to the laser manipulation system 100 in response to user input.

In certain embodiments, the laser head 200 is releasably coupled to the laser generator 310 and is releasably coupled to the positioning mechanism 121. In certain embodiments, the positioning mechanism 121 is releasably coupled to the anchoring mechanism 110, and the controller 500 is releasably coupled to the laser base unit 300 and the laser manipulation system 100. Such embodiments can provide an apparatus 50 which can be reversibly assembled and disassembled to facilitate transportation of the apparatus 50 to locations in proximity to or within the structure being processed.

Laser Base Unit

Certain embodiments of the laser base unit 300 are described below. While the laser base unit 300 is described below as comprising separate components, other embodiments can include combinations of two or more of these components in an integral unit.

Laser Generator

Figure 2:
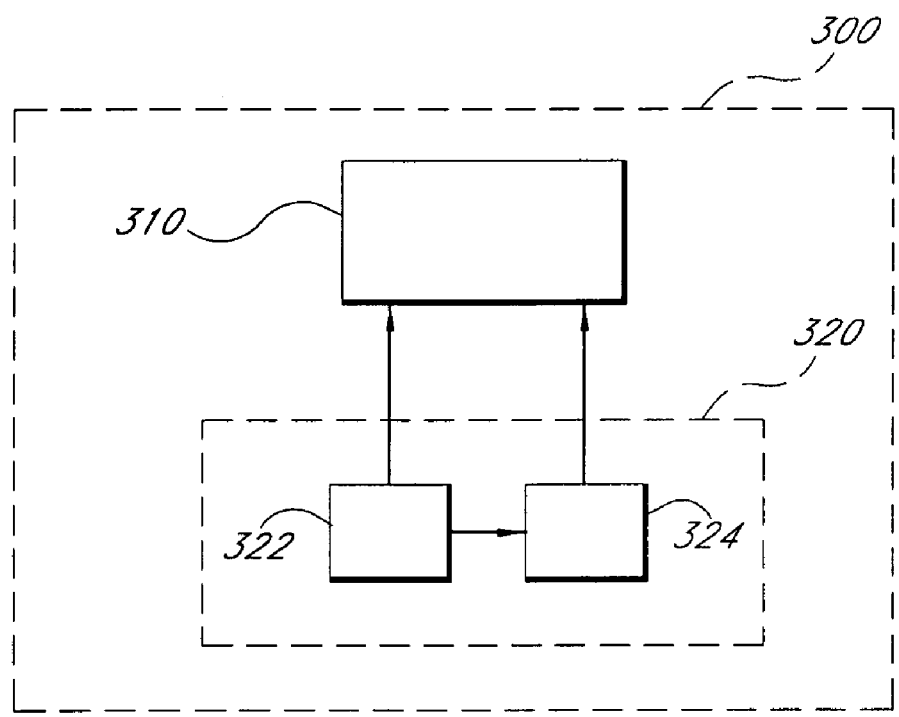
FIG. 2 schematically illustrates a laser base unit compatible with embodiments described herein.

FIG. 2 schematically illustrates a laser base unit 300 compatible with embodiments described herein. In certain embodiments, the laser base unit 300 comprises a laser generator 310 and a cooling subsystem 320. The laser generator 310 is coupled to a power source (not shown) which provides electrical power of appropriate voltage, phase, and amperage sufficient to power the laser generator 310. The power source can also be portable in certain embodiments, and can operate without cooling water, air, or power from the facility at which the apparatus 50 is operating. Exemplary power sources include, but are not limited to, diesel-powered electric generators.

In certain embodiments, the laser generator 310 preferably comprises an arc-lamp-pumped Nd:YAG laser, but may alternatively comprise a $CO_2$ laser, a diode laser, a diode-pumped Nd:YAG laser, a fiber laser, or other types of laser systems. The laser generator 310 can be operated in either a pulsed mode or a continuous-wave mode. One exemplary laser generator 310 in accordance with embodiments described herein includes a Trumpf 4006D, 4000-watt, continuous-wave laser available from Trumpf Lasertechnik GmbH of Ditzingen, Germany. In other exemplary embodiments, a Yb-doped fiber laser or an Er-doped fiber laser can be used. Other types of lasers with other power outputs (e.g., 2000-watt) are compatible with embodiments described herein. Depending on the requirements unique to a given application of the method and apparatus described herein, one skilled in the art will be able to select the optimal laser for the purposes at hand.

In certain embodiments, the laser generator 310 can be located within a shipping container for ease of transport and storage. The laser generator 310 generates laser light which is preferably delivered through a glass fiber-optic cable from the laser generator 310 to the work location.

In certain alternative embodiments, the laser generator 310 comprises a gas-based $CO_2$ laser which generates laser light by the excitation of $CO_2$ gas. Such lasers provide high power output (e.g., ~100 W-50 kW) at high efficiencies (e.g., ~5-13%), and are relatively inexpensive. The laser light generated by such gas-based $CO_2$ lasers is typically delivered by mirrors and by using a system of ducts or arms to deliver the laser light around bends or corners.

In certain alternative embodiments, the laser generator 310 comprises a diode laser. Such diode lasers are compact compared to gas and Nd:YAG lasers so they can be used in a direct delivery configuration (e.g., in close proximity to the work site). Diode lasers provide high power (e.g., ~10 W-6 kW) at high power efficiencies (e.g., ~25-40%). In certain embodiments, the laser light from a diode laser can be delivered via optical fiber, but with some corresponding losses of power.

Embodiments using a Nd:YAG laser can have certain advantages over embodiments with $CO_2$ lasers or diode lasers. There is long industrial experience with Nd:YAG lasers in the materials processing industry and they provide high power (e.g., ~100 W-6 kW). Additionally, the laser light from a Nd:YAG laser can be delivered by optical fiber with only slight power losses (e.g., ~12%) through a relatively small and long optical fiber. This permits the staging of the laser generator 310 and support equipment in locations relatively far (e.g., about 100 meters) from the work area. Maintaining the laser generator 310 at a distance from the surface being processed allows the remainder of the apparatus 50 to be smaller and more portable.

Arc-lamp-pumped Nd:YAG lasers use an arc lamp to excite a Nd:YAG crystal to generate laser light. Diode-pumped Nd:YAG lasers use diode lasers to excite the Nd:YAG crystal, resulting in an increase in power efficiency (e.g., ~10-25%, as compared to less than 5% for arc-lamp-pumped Nd:YAG lasers). This increased efficiency results in the diode-pumped laser having a better beam quality, and requiring a smaller cooling subsystem 320. An exemplary arc-lamp-pumped Nd:YAG laser is available from Trumpf Lasertechnik GmbH of Ditzingen, Germany.

Nd:YAG and other solid state lasers (e.g., Nd:YLiF$_4$, Ti:Sapphire, Yb:YAG, etc.) compatible with embodiments described herein can be configured and pumped by a number of methods. These methods include, but are not limited to, flash and arc lamps, as well as diode lasers. Various configurations of the solid state media are compatible with embodiments described herein, including, but not limited to, rod, slab, and disk configurations. The advantages of the different configurations and pumping methods will impact various aspects of the laser generator 310, including, but not limited to, the efficiency, the beam quality, and the operational mode of the laser generator 310. An exemplary diode-laser-pumped Nd:YAG disk laser is available from Trumpf Lasertechnik GmbH of Ditzingen, Germany.

Fiber lasers use a doped (e.g., doped with ytterbium or erbium) fiber to produce a laser beam. The doped fiber can be pumped by other light sources including, but not limited to, arc lamps and diodes. The fiber laser can be coupled into a delivery fiber which carries the laser beam to the interaction location. In certain embodiments, a fiber laser provides an advantageous efficiency of approximately 15% to approximately 20%. Such high efficiencies make the laser generator 310 more mobile, since they utilize smaller chiller units. In addition, such high efficiency laser generators 310 can be located closer to the processing area. An exemplary fiber laser compatible with embodiments described herein is available from IPG Photonics of Oxford, Mass.

Typically, the generation of laser light by the laser generator 310 creates excess heat which is preferably removed from the laser generator 310 by the cooling subsystem 320 coupled to the laser generator 310. The amount of cooling needed is determined by the size and type of laser used, but can be about 190 kW of cooling capacity for a 4-kW Nd:YAG laser. The cooling subsystem 320 can utilize excess cooling capability at a job site, such as an existing process water or chilled water cooling subsystem. Alternatively, a unitary cooling subsystem 320 dedicated to the laser generator 310 is preferably used. Unitary cooling subsystems 320 may be air- or liquid-cooled.

In certain embodiments, as schematically illustrated in FIG. 2, the cooling subsystem 320 comprises a heat exchanger 322 and a water chiller 324 coupled to the laser 310 to provide sufficient circulatory cooling water to the laser generator 310 to remove the excess heat. The heat exchanger 322 preferably removes a portion of the excess heat from the water, and circulates the water back to the water chiller 324. The water chiller 324 cools the water to a predetermined temperature and returns the cooling water to the laser generator 310. Exemplary heat exchangers 322 and water coolers 324 in accordance with embodiments described herein are available from Trumpf Lasertechnik GmbH of Ditzingen, Germany.

Laser Head

In certain embodiments, the laser head 200 is coupled to the laser generator 310 and serves as the interface between the apparatus 50 and the structure being irradiated. As schematically illustrated by FIG. 1, an energy conduit 400 couples the laser head 200 and the laser generator 310 and facilitates the transmission of energy from the laser generator 310 to the laser head 200. In certain embodiments, the energy conduit 400 comprises an optical fiber which transmits laser light from the laser generator 310 to the laser head 200. In other embodiments, the energy conduit 400 comprises conductors that may include fiber-optic, power, or control wiring cables.

Figure 3A:
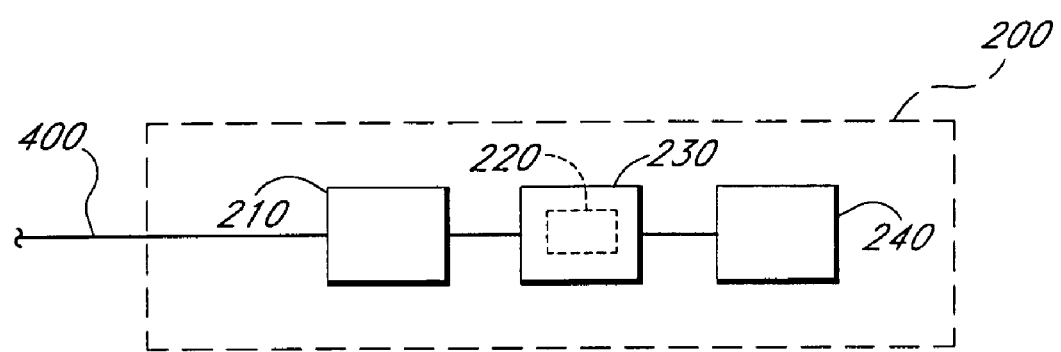
FIG. 3A schematically illustrates a laser head in accordance with embodiments described herein.

FIG. 3A schematically illustrates a laser head 200 in accordance with embodiments described herein. The laser head 200 comprises a connector 210, at least one optical element 220, a housing 230, and a containment plenum 240. In certain embodiments, the connector 210 is coupled to the housing 230, is optically coupled to the laser generator 310 via the energy conduit 400, and is adapted to transmit laser light from the laser generator 310. The optical element 220 can be located within the connector 210, the housing 230, or the containment plenum 240. FIG. 3A illustrates an embodiment in which the optical element 220 is within the housing 230. In embodiments in which the conduit 400 provides laser light to the laser head 200, the laser light is transmitted through the optical element 220 prior to impinging on the structure being irradiated.

Laser Head: Extended Configuration

Figure 3B:
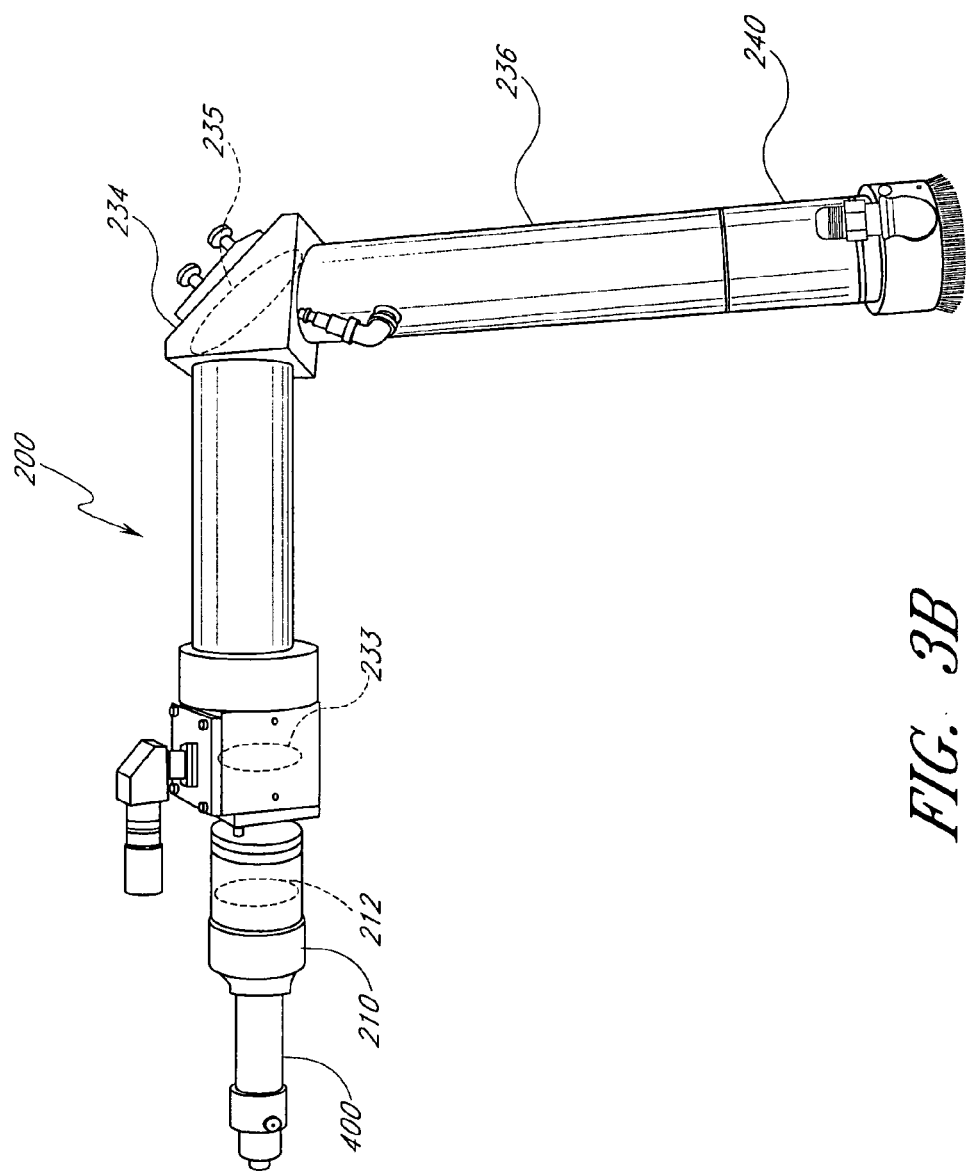
FIGS. 3B and 3C schematically illustrate two alternative embodiments of the laser head.

FIG. 3B schematically illustrates one configuration of a laser head 200 in accordance with embodiments described herein. The housing 230 comprises a distal portion 232, an angle portion 234, and a proximal portion 236. As used herein, the terms "distal" and "proximal" have their standard definitions, referring generally to the position of the portion relative to the interaction region. The connector 210 is coupled to the distal portion 232, which is coupled to the angle portion 234, which is coupled to the proximal portion 236, which is coupled to the containment plenum 240. Configurations such as that illustrated by FIG. 3B can be used for drilling and scabbling the surface of the structure (e.g., concrete wall). Various components of the laser head 200 are available from Laser Mechanisms, Inc. of Farmington Hills, Mich.

In certain embodiments in which the energy conduit 400 comprises an optical fiber, the connector 210 receives laser light transmitted from the laser generator 310 through the optical fiber to the laser head 200. In certain such embodiments, the connector 210 comprises a lens 212 which collimates the diverging laser light emitted by the conduit 400. The lens 212 can comprise various materials which are transmissive and will refract the laser light in a desired amount. Such materials include, but are not limited to, borosilicate crown glass (BK7), quartz ($SiO_2$), zinc selenide (ZnSe), and sodium chloride (NaCl). The material of the lens 212 can be selected based on the quality, cost, and stability of the material. Borosilicate crown glass is commonly used for transmissive optics with Nd:YAG lasers, and zinc selenide is commonly used for transmissive optics with $CO_2$ lasers.

The lens 212 can be mounted in a removable assembly in certain embodiments to facilitate cleaning, maintenance, and replacement of the lens 212. In addition, the mounting of the lens 212 can be adjustable (e.g., using thumbscrews or Allen hex screws) so as to optimize the alignment and focus of the light beam. In certain embodiments, the lens 212 can provide additional modification of the beam profile (e.g., focussing, beam shape).

The collimated laser light of certain embodiments is then transmitted through the laser head 200 via other optical elements within the laser head 200. In certain embodiments, the distal portion 232 comprises a generally straight first tube through which laser light propagates to the angle portion 234, and the proximal portion 236 comprises a generally straight second tube through which the laser light from the angle portion 234 propagates. In certain embodiments, the distal portion 232 contains a lens 233, and the angle portion 234 contains a mirror 235 which directs the light through the proximal portion 236 and the containment plenum 240 onto the structure. In other embodiments, other devices (e.g., a prism) can be used in the angle portion 234 to direct the light through the proximal portion 236 and the containment plenum 240 onto the structure.

The lens 233 can be mounted in a removable assembly in certain embodiments to facilitate cleaning, maintenance, and replacement of the lens 233. In addition, the mounting of the lens 233 can be adjustable (e.g., using thumbscrews or Allen hex screws) so as to optimize the alignment and focus of the light beam. In certain embodiments, the lens 233 focuses the light received from the lens 212, while in other embodiments, the lens 233 can provide additional modification of the beam profile (e.g., beam shape). Exemplary lenses 233 include, but are not limited to, a 600-mm focal length silica plano-convex lens (e.g., Part No. PLCX-50.8-309.1-UV-1064 available from CVI Laser Corp. of Albuquerque, N. Mex.). The lens 233 can comprise various materials which are transmissive and will refract the laser light in a desired amount. Such materials include, but are not limited to, borosilicate crown glass, quartz, zinc selenide, and sodium chloride. Exemplary lens mounting assemblies include, but are not limited to, Part Nos. PLALH0097 and PLFLH0119 available from Laser Mechanisms, Inc. of Farmington Hills, Mich.

In the embodiment schematically illustrated by FIG. 3B in which the distal portion 232 is substantially perpendicular to the proximal portion 236, the mirror 235 reflects the light through an angle of approximately 90 degrees. Other embodiments are configured to reflect the light through other angles. The mirror 235 can be mounted on a removable assembly in certain embodiments to facilitate cleaning, maintenance, and replacement of the mirror 235. In addition, the mounting of the mirror 235 can be adjustable (e.g., using thumbscrews or Allen hex screws) so as to optimize the alignment and focus of the light beam. In certain embodiments, the mirror 235 can also have a curvature or otherwise be configured so as to focus the light beam or otherwise modify the beam profile (e.g., beam shape). Exemplary mirrors 235 include, but are not limited to, metal mirrors such as copper mirrors (e.g., Part Nos. PLTRG19 and PLTRC0024 from Laser Mechanisms, Inc. of Farmington Hills, Mich.), and gold-coated copper mirrors (e.g., Part No. PLTRC0100 from Laser Mechanisms, Inc.). In other embodiments, dielectric-coated mirrors can be used.

Figure 3C:
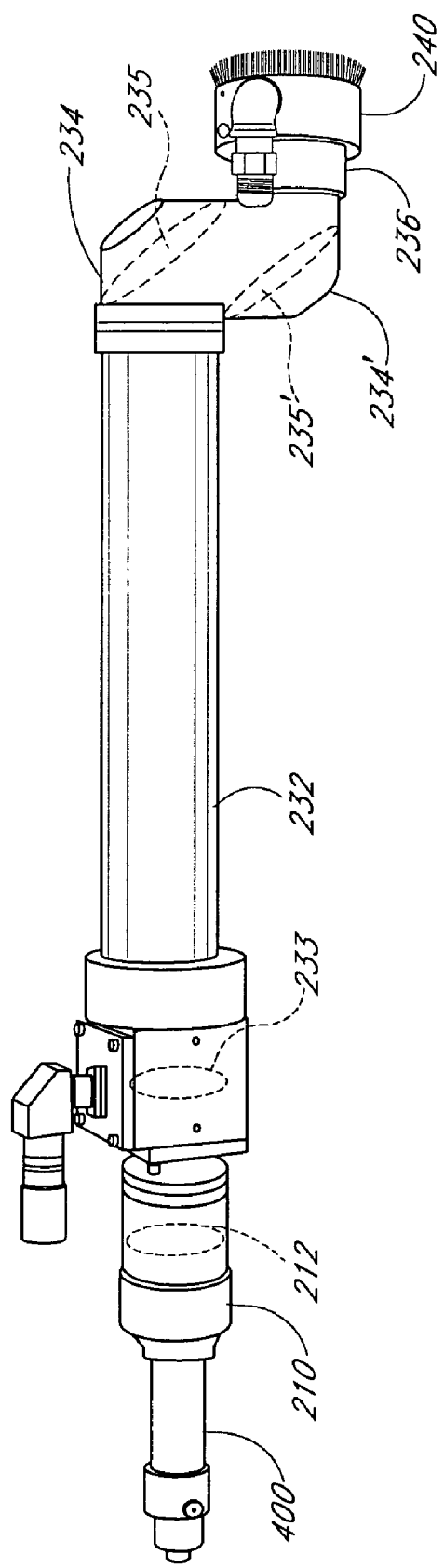

FIG. 3C schematically illustrates another configuration of a laser head 200 in accordance with embodiments described herein. The housing 230 comprises the distal portion 232, a first angle portion 234, a second angle portion 234', and the proximal portion 236. The connector 210 is coupled to the distal portion 232, which is coupled to the first angle portion 234, which is coupled to the second angle portion 234', which is coupled to the proximal portion 236, which is coupled to the containment plenum 240. Configurations such as that illustrated by FIG. 3C can be used for cutting the structure in spatially constrained regions (e.g., cutting off portions of a concrete wall near a corner or protrusion).

As described above, in certain embodiments, the connector 210 comprises a lens 212 and the distal portion 232 is tubular and contains a lens 233. The first angle portion 234 of the embodiment illustrated by FIG. 3C contains a first mirror 235 which directs the light to the second angle portion 234' which contains a second mirror 235'. The second mirror 235' directs the light through the proximal portion 236, which can be tubular, and through the containment plenum 240 onto the structure. In certain embodiments, as described more fully below with respect to the containment plenum 240, the light is transmitted through a window 243 and a nozzle 244 to the interaction region. In certain embodiments, the laser head 200 comprises the window 243 and the nozzle 244, while in other embodiments, the window 243 and the nozzle 244 are components of the containment plenum 240.

In the embodiment schematically illustrated by FIG. 3C, the first mirror 235 reflects the light through an angle of approximately 90 degrees and the second mirror 235' reflects the light through an angle of approximately −90 degrees such that the proximal portion 236 is substantially parallel to the distal portion 232. In such embodiments, the light emitted by the containment plenum 240 is substantially parallel to, but displaced from, the light propagating through the distal portion 232. Other embodiments have the first mirror 235 and the second mirror 235' configured to reflect the light through other angles. Certain embodiments comprise a straight tubular portion between the first angle portion 234 and the second angle portion 234' to provide additional displacement of the light emitted by the containment plenum 240 from the light propagating through the distal portion 232.

In certain embodiments, the coupling between the distal portion 232 and the first angle portion 234 is rotatable. In certain other embodiments, the coupling between the first angle portion 234 and the second angle portion 234' is rotatable. These rotatable couplings can comprise swivel joints which can be locked in position by thumbscrews. Such embodiments provide additional flexibility in directing the light emitted by the containment plenum 240 in a selected direction. In certain embodiments, the selected direction is non-planar with the light propagating through the distal portion 232.

As described above, one or both of the first mirror 235 and the second mirror 235' can be mounted on a removable assembly in certain embodiments to facilitate cleaning, maintenance, and replacement. In addition, the mountings of the first mirror 235 and/or the second mirror 235' can be adjustable (e.g., using thumbscrews or Allen hex screws) so as to optimize the alignment and focus of the light beam. In certain embodiments, one or both of the first mirror 235 and the second mirror 235' can also have a curvature or otherwise be configured so as to focus the light beam or otherwise modify the beam profile (e.g., beam shape).

In certain embodiments, one or more of the optical elements 220 within the laser head 200 (e.g., lens 212, lens 233, mirror 235, mirror 235') are water-cooled or air-cooled. Cooling water can be supplied by a heat exchanger located near the laser head 200 and dedicated to providing sufficient water flow to the laser head 200. In certain such embodiments, the conduits for the cooling water for each of the optical elements 220 can be connected in series so that the cooling water flows sequentially in proximity to the optical elements 220. In other embodiments, the conduits are connected in parallel so that separate portions of the cooling water flow in proximity to the various optical elements 220. Exemplary heat exchangers include, but are not limited to a Miller Coolmate™ 4, available from Miller Electric Manufacturing Co. of Appleton, Wis. The flow rate of the cooling water is preferably at least approximately 0.5 gallons per minute.

Laser Head: Compact Configuration

Figure 20:
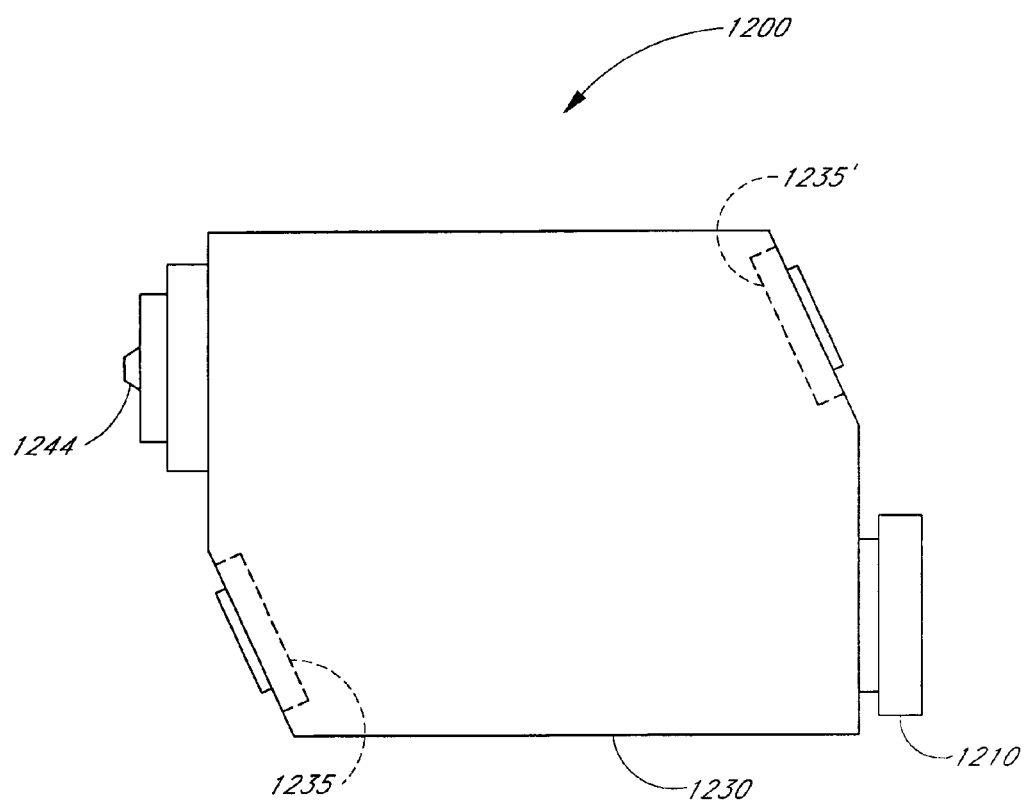
FIG. 20 schematically illustrates another configuration of a laser head in accordance with embodiments described herein.

FIG. 20 schematically illustrates another configuration of a laser head 1200 in accordance with embodiments described herein. Certain embodiments of the laser head 1200 are adapted to be movable and placed in position relative to the surface to be irradiated by a single person. In certain such embodiments, the combination of the laser head 1200 and certain embodiments of the anchoring mechanism 1110, discussed below, weighs less than fifty pounds.

The embodiment illustrated by FIG. 20 is generally adapted for drilling holes in the surface to be irradiated, and is generally of smaller size and weight than the embodiments of FIGS. 3B and 3C, thereby providing an apparatus which is adapted to access more constrained spaces. In addition, the embodiment of FIG. 20 is generally more simple and more robust than the embodiments of FIGS. 3B and 3C, thereby providing an apparatus which is adapted to withstand rough handling and non-ideal operating conditions.

The laser head 1200 in certain embodiments comprises a generally rectangular housing 1230. The other components of the laser head 1200 are positioned on the housing 1230 or within the housing 1230. The housing 1230 of certain embodiments comprises a connection structure (not shown) which is adapted to be releasably coupled to an anchoring mechanism 1110 which, as described further below, is adapted to position the laser head 1200 relative to the surface to be irradiated. In an exemplary embodiment, the housing 1230 has a length of approximately 12 inches, a height of approximately, 8 inches, and a width of approximately 4 inches. Other shapes and dimensions of the housing 1230 are compatible with embodiments described herein.

In certain embodiments, the laser head 1200 further comprises a connector 1210 which is adapted to be coupled to the conduit 400 carrying laser light from the laser generator 310 to the laser head 1200. In certain embodiments, the connector 1210 comprises a lens (not shown) which collimates the diverging laser light emitted by the conduit 400. As described above in relation to the extended configuration, the lens of various embodiments can comprise various materials, can be removably mounted to the housing 1230, can be adjustably mounted to the housing 1230, and can provide additional modification of the beam profile.

In certain embodiments, the laser head 1200 further comprises a first mirror 1235 adapted to reflect light from the connector 1210 through a first non-zero angle, and a second mirror 1235' adapted to reflect light from the first mirror 1235 through a second non-zero angle to a nozzle 1244 which is adapted to be coupled to the containment plenum 240. In certain embodiments, as schematically illustrated in FIG. 20, the first non-zero angle is approximately equal to the negative of the second non-zero angle. Such two-mirror configurations are sometimes called "folded optics" configurations since reflecting the light between the mirrors effectively "folds" a propagation path having a length into a smaller space. Certain embodiments of the laser head 1200 comprise additional optical components adapted to modify the beam profile of the laser light.

As described above in relation to the extended configuration, at least one of the first mirror 1235 and the second mirror 1235' is mounted in the housing 1230 on a removable and adjustable assembly. In addition, at least one of the first mirror 1235 and the second mirror 1235' of certain embodiments has a curvature or is otherwise configured to modify the beam profile. At least one of the first mirror 1235 and the second mirror 1235' of certain embodiments is cooled by either air or water provided by cooling conduits. In certain embodiments, the cooling conduits are contained within the housing 1230, thereby facilitating transport and placement of the laser head 1200 by making the laser head 1200 less unwieldy and making the laser head 1200 more robust.

Figure 21A:
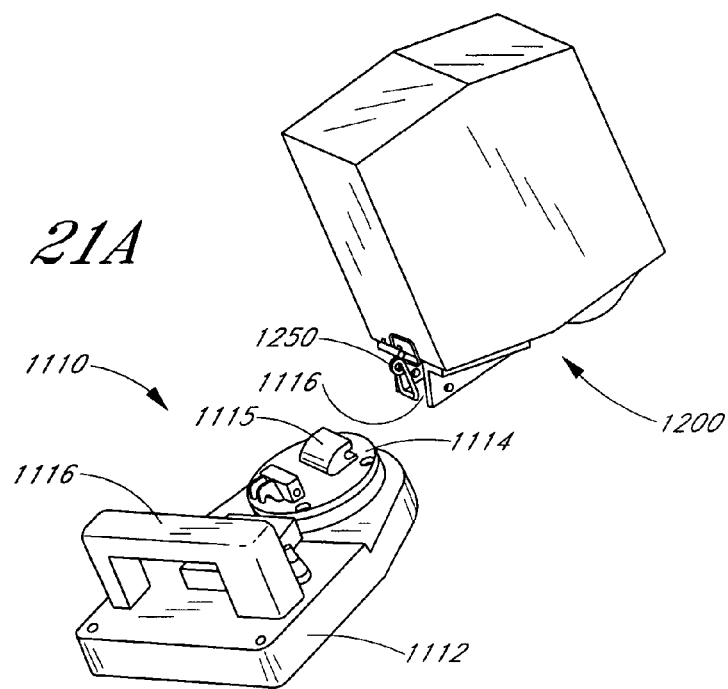
FIGS. 21A-21D schematically illustrate other anchoring mechanisms in accordance with embodiments described herein.
Figure 21B:
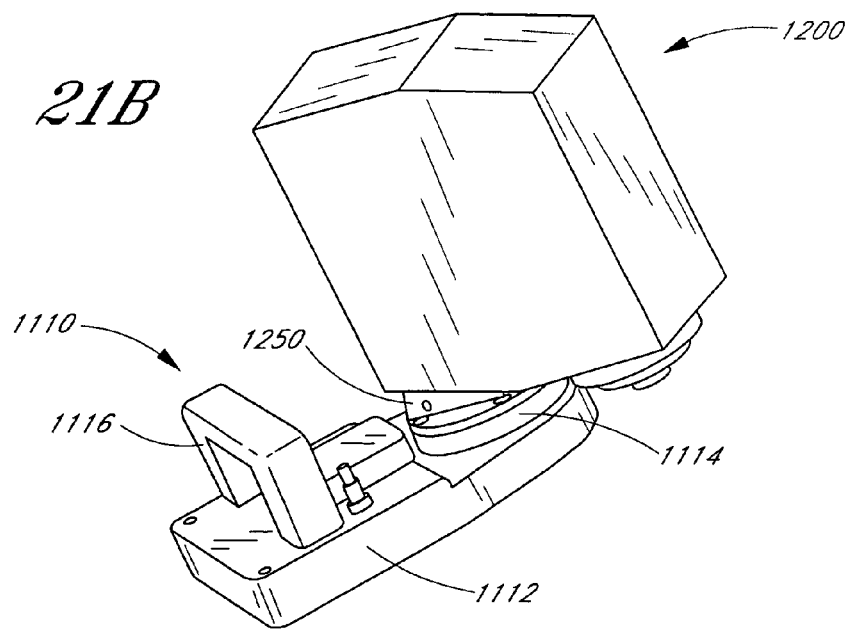
Figure 21C:
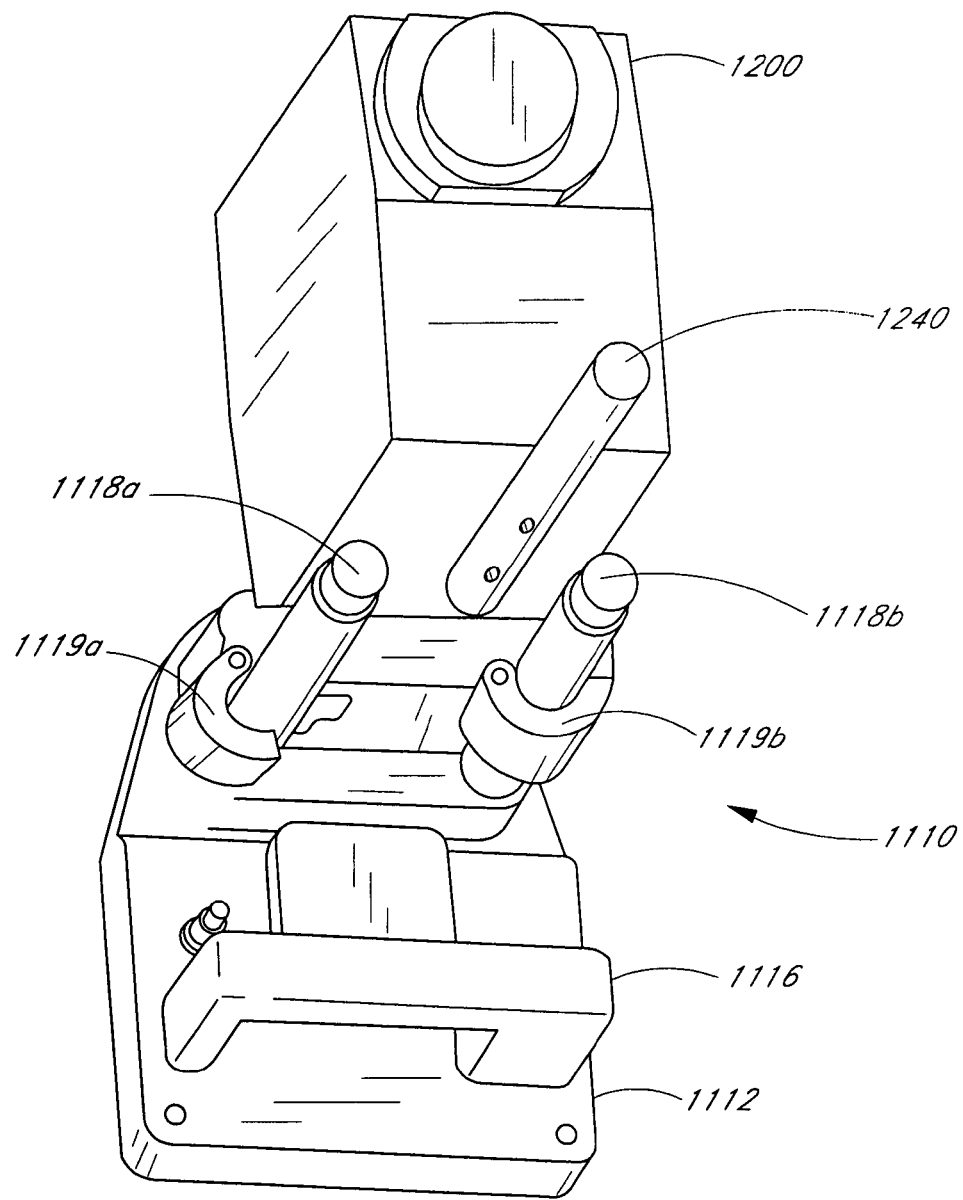

In certain embodiments, as shown in FIG. 21C, the laser head 1200 comprises a laser head handle 1240 coupled to the housing 1230. The laser head handle 1240 is adapted to facilitate transporting and positioning the laser head 1200 at a selected location. Other configurations of the laser head handle 1240 are compatible with other embodiments described herein. The laser head 1200 of certain embodiments further comprises a coupler 1250 adapted to releasably couple the laser head 1200 to the anchoring mechanism 1110. Other configurations of the laser head 1200 are compatible with embodiments described herein.

In certain embodiments, the compact configuration of the laser head ("compact laser head") 1200, such as shown in FIGS. 21A-21C, is advantageously used in certain applications rather than the extended configuration of the laser head ("extended laser head") 200 as shown in FIGS. 3B and 3C. For example, when drilling holes in the structure, there may be areas in which the extended laser head 200 may not have access due to its length or other constraints (e.g., rigidity of the coupling between the energy conduit 400 and the connector 210). The compact laser head 1200 has a smaller volume, thereby allowing access to smaller areas.

In addition, in certain embodiments, the compact laser head 1200 is used in conjunction with an energy conduit 400 comprising a pivoting collimator head (not shown) adapted to provide a rotational coupling between the energy conduit 400 and the laser head 1200. In such embodiments, the pivoting collimator head provides additional flexibility by allowing the laser head 1200 to access smaller areas. The collimator head can be straight, or can have an angle (e.g., 90 degrees). Using collimator heads with different orientations advantageously permits various orientations of the energy conduit 400 for providing access to constrained areas. Exemplary collimator heads compatible with embodiments described herein are available from Trumpf Lasertechnik GmbH of Ditzingen, Germany.

Furthermore, in certain embodiments, the compact laser head 1200 also incorporates the various sensors, proximity switches, and flow meters of the laser head 1200 within the housing 1230. Such embodiments are generally more simple and more robust than the extended laser head 200, thereby providing an apparatus which is adapted to withstand rough handling and non-ideal operating conditions, and is less likely to be damaged.

Laser Head: Lightweight Configuration

Figure 21D:
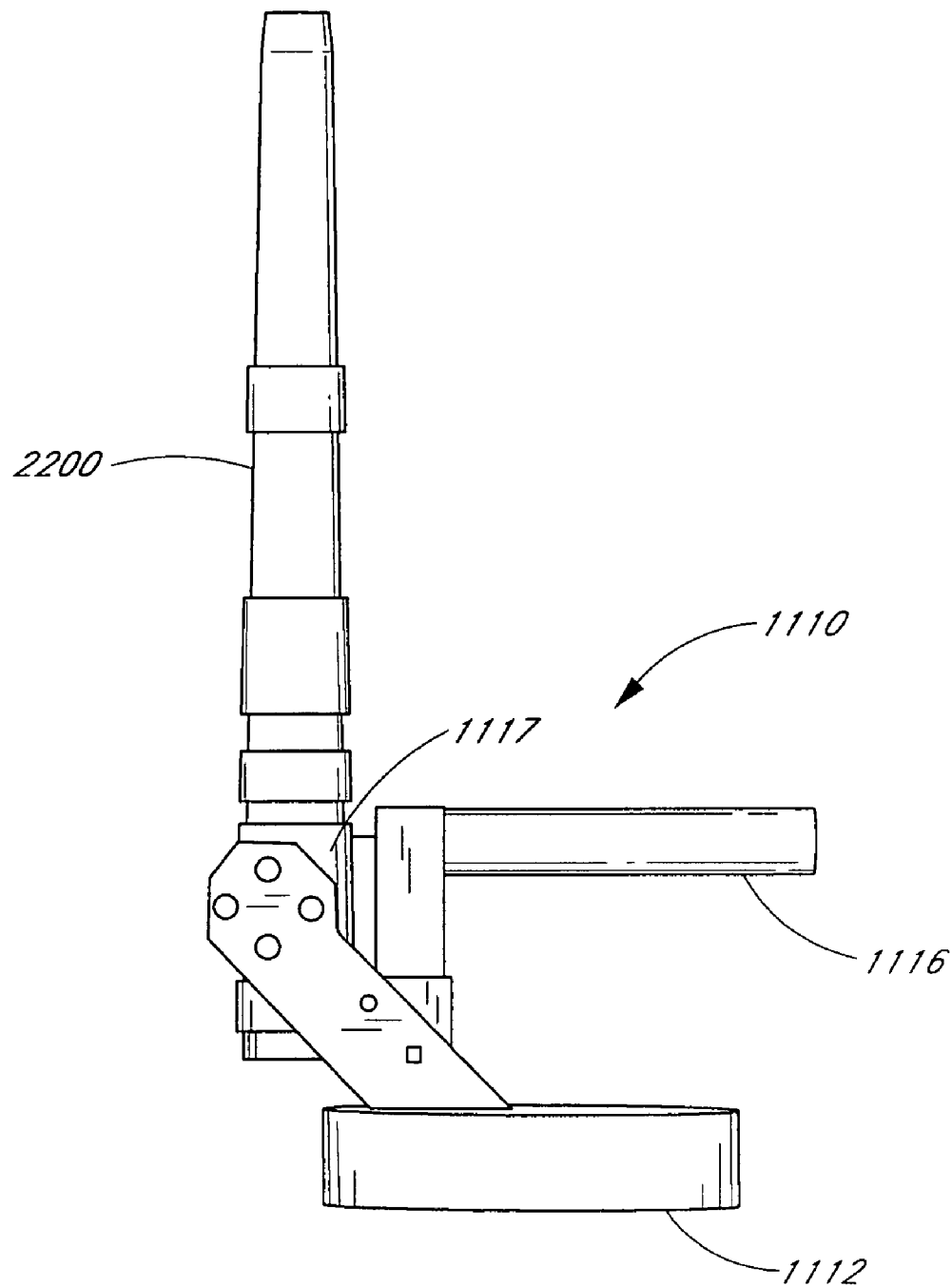

FIG. 21D schematically illustrates a combination of a lightweight laser head 2200 with an anchoring mechanism 1110. In certain embodiments, the laser head 2200 has a 140-millimeter focal length and is commercially available, e.g., a D35 90-degree focus head with cooling and observation port available from Trumpf Lasertechnik GmbH of Ditzingen, Germany (Catalog No. 35902090). The laser head 2200 of certain embodiments is adapted for drilling relatively shallow holes. In certain embodiments, the laser head/anchoring mechanism combination weighs less than 10 pounds, while in other embodiments, the combination weighs approximately 8 pounds.

Laser Head: Containment Plenum

In certain embodiments, the laser head 200 comprises a containment plenum 240 coupled to the proximal portion 236 and which interfaces with the structure. In certain embodiments, the containment plenum 240 is adapted to confine material (e.g., debris and fumes generated during laser processing) removed from the structure and remove the material from the interaction region. The containment plenum 240 can also be further adapted to reduce noise and light emitted from the interaction region out of the containment plenum 240 (e.g., into the nominal hazard zone ("NHZ") of the laser). One goal of the containment plenum 240 can be to ensure that no laser radiation in excess of the accessible emission limit ("AEL") or maximum-permissible exposure ("MPE") limit reaches the eye or skin of any personnel.

Figure 4:
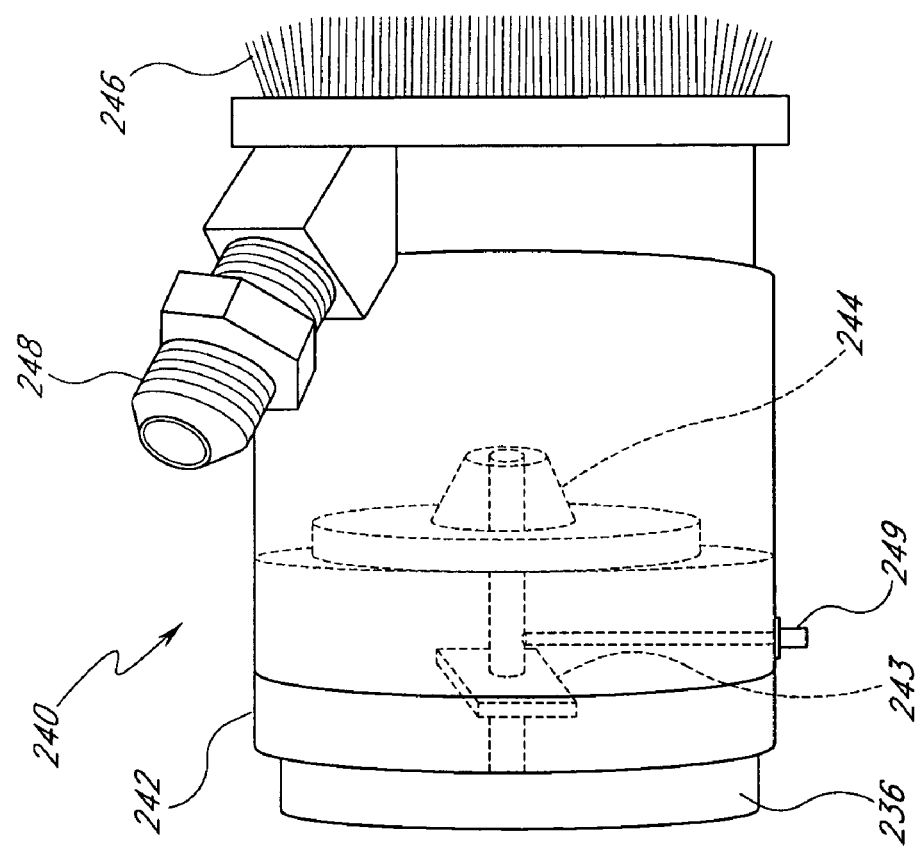
FIG. 4 schematically illustrates a cross-sectional view of a containment plenum in accordance with embodiments described herein.

FIG. 4 schematically illustrates a cross-sectional view of a containment plenum 240 in accordance with embodiments described herein. The containment plenum 240 of FIG. 4 comprises a plenum housing 242, a window 243, a nozzle 244, a resilient interface 246, an extraction port 248, and a compressed gas inlet 249. The plenum housing 242 can be coupled to a source of laser light (e.g., the proximal portion 236 of the laser head 200) and can provide structural support for the other components of the containment plenum 240. Exemplary materials for the plenum housing 242 include, but are not limited to, metals (e.g., aluminum, steel) which can be in the form of thin flexible sheets, ceramic materials, glass or graphite fibers, and fabric made from glass or graphite fibers. In certain embodiments, the plenum housing 242 is either air-cooled or water-cooled to reduce heating of the plenum housing 242. Coolant conduits for the plenum housing 242 can be coupled in series or in parallel with the coolant conduits for other components of the laser head 200.

The window 243 of certain embodiments is positioned upstream of the nozzle 244 and within the propagation path of the laser light from the proximal portion 236 to the structure. As used herein, the terms "downstream" and "upstream" have their ordinary meanings referring to the propagation direction of the laser light and to the direction opposite to the propagation direction of the laser light, respectively. In such embodiments, the light propagating through the containment plenum 240 reaches the window 243 prior to reaching the nozzle 244. In such embodiments in which the light propagates downstream through the window 243, the window 243 is substantially transparent to the laser light. The window 243 can be mounted within the plenum housing 242 to transmit the laser light in the downstream direction. The window 243 can have a number of shapes, including, but not limited to, square and circular. Exemplary windows 243 include, but are not limited to, a silica window (e.g., Part No. W2-PW-2037-UV-1064-0 available from CVI Laser Corp. of Albuquerque, N. Mex.).

Dust and/or dirt on the optical elements of the laser head 200 can absorb an appreciable fraction of the laser light, resulting in nonuniform heating which can damage the optical elements. In certain embodiments, the window 243 is mounted within the plenum housing 242 to provide a barrier to the upstream transport of dust, smoke, or other particulate matter generated by the interaction of the laser light and the structure. In this way, the window 243 can facilitate protection of the upstream optical elements within the other portions of the laser head 200.

The window 243 can be mounted in a removable assembly in certain embodiments to facilitate cleaning, maintenance, and replacement of the window 243. In certain embodiments, the window 243 focuses the light received from the proximal portion 236, while in other embodiments, the window 243 can provide additional modification of the beam profile (e.g., beam shape). In such embodiments, the mounting of the window 243 can be adjustable (e.g., using thumbscrews or Allen hex screws) so as to optimize the alignment and focus of the light beam. Exemplary window mounting assemblies include, but are not limited to, Part Nos. PLALH0097 and PLFLH0119 available from Laser Mechanisms, Inc. of Farmington Hills, Mich. In certain embodiments, the window 243 is either air-cooled or water-cooled.

The laser light transmitted through the window 243 is emitted through the nozzle 244 towards the interaction region of the structure. The laser light can be focussed near the opening of the nozzle 244. Exemplary materials for the nozzle 244 include, but are not limited to metals (e.g., copper). In certain embodiments, the nozzle 244 is either air-cooled or water-cooled to reduce heating of the nozzle 244. Coolant conduits for the nozzle 244 can be coupled in series or in parallel with the coolant conduits for other components of the laser head 200.

The laser light propagating through the nozzle 244 preferably does not impinge the nozzle 244 (termed "clipping") to avoid excessively heating and damaging the nozzle 244. Improper alignment of the laser light through the laser head 200 can cause clipping. The opening of the nozzle 244 can be sufficiently large so that the laser light does not appreciably interact with the nozzle 244. In certain embodiments, the nozzle 244 is approximately 0.3 inches in diameter.

In certain embodiments, the resilient interface 246 of the containment plenum 240 is adapted to contact the structure and to substantially surround the interaction region, thereby facilitating confinement and removal of material from the interaction region. In addition, the resilient interface 246 can facilitate blocking light and/or sound from escaping outside the containment plenum 240. Exemplary resilient interfaces 246 include, but are not limited to, a wire brush.

In certain embodiments, the extraction port 248 of the containment plenum 240 is adapted to extract an appreciable portion of the material (e.g., gas, vapor, dust, and debris) generated within the interaction region during operation. The extraction port 248 can be coupled to a vacuum generator (not shown) which creates a vacuum to pull material (e.g., airborne particulates, gases, and vapors) from the interaction region. In this way, the extraction port 248 can provide a pathway for removal of the material from the containment plenum 240.

In certain embodiments, the compressed gas inlet 249 is adapted to provide compressed gas (e.g., air) to the containment plenum 240. In certain embodiments, the compressed gas inlet 249 is fluidly coupled to the nozzle 244 which is adapted to direct a compressed gas stream to the interaction region. In certain embodiments, compressed gas flows coaxially with the laser light through the nozzle 244. The window 243 of certain embodiments provides a surface against which the compressed gas exerts pressure. In this way, the compressed gas can flow through the nozzle 244 to the interaction region at a selected pressure and velocity.

The compressed gas flowing from the compressed gas inlet 249 through the nozzle 244 can be used to deter dust, debris, smoke, and other particulate matter from entering the nozzle 244. In this way, the compressed gas can facilitate protection of the window 243 from such particulate matter. In addition, the compressed gas can be directed by the nozzle 244 to the interaction region so as to facilitate removal of material from the interaction region. The nozzle 244 can be used in this manner in embodiments in which the structure includes concrete with a high percentage of Si, so that the resultant glassy slag is sufficiently viscous and more difficult to remove from the interaction region.

In certain embodiments, the compressed air is substantially free of oil, moisture, or other contaminants to avoid contaminating the surface of the window 243 and potentially damaging the window 243 by nonuniform heating. An exemplary source of instrument quality ("IQ") compressed air is the 300-IQ air compressor available from Ingersoll-Rand Air Solutions Group of Davidson, N.C. The source of compressed air preferably provides air at a sufficient flow rate determined in part by the length of the hose delivering the air, and the number of components using the air and their requirements.

In certain embodiments, the air compressor can be located hundreds of feet away from the laser head 200. In such embodiments, the source of compressed air can comprise an air dryer to reduce the amount of moisture condensing in the air conduits or hoses between the air compressor and the laser head 200. An exemplary air dryer in accordance with embodiments described herein is the 400 HSB air dryer available from Zeks Compressed Air Solutions of West Chester, Pa.

Figure 5:
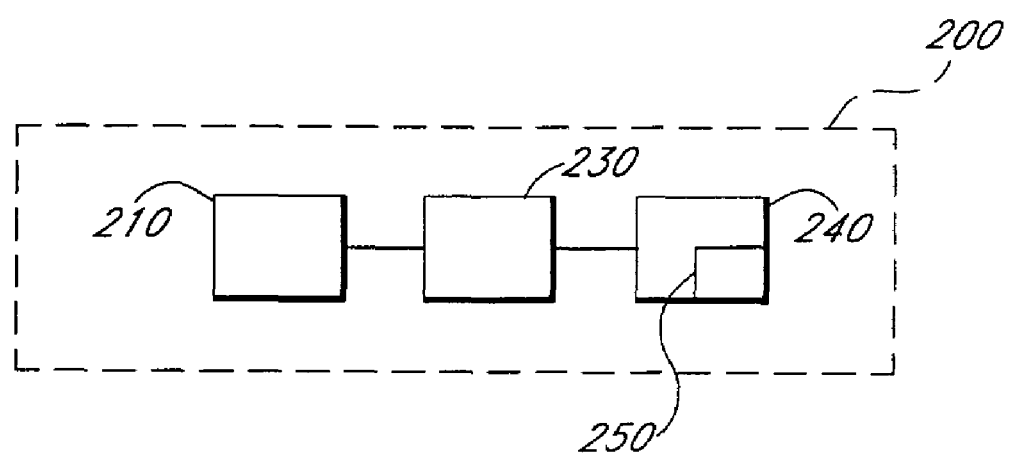
FIG. 5 schematically illustrates a laser head comprising a sensor adapted to measure the relative distance between the laser head and the interaction region.

In certain embodiments, as schematically illustrated in FIG. 5, the laser head 200 comprises a sensor 250 adapted to measure the relative distance between the laser head 200 and the interaction region. FIG. 5 schematically illustrates an embodiment in which the containment plenum 240 comprises the sensor 250, although other locations of the sensor 250 are also compatible with embodiments described herein. As material is removed from the structure, the interaction region extends into the structure. The sensor 250 then provides a measure of the depth of the interaction region from the surface of the structure. The sensor 250 can use various technologies to determine this distance, including, but not limited to, acoustic sensors, infrared sensors, tactile sensors, and imaging sensors. In certain embodiments in which laser scabbling or machining is performed, a sensor 250 comprising a diode laser and utilizing triangulation could be used to determine the distance between the laser head 200 and the surface being processed. Such a sensor 250 can also provide a measure of the amount of material removed from the surface.

In certain embodiments, the sensor 250 is coupled to the controller 500, and the controller 500 is adapted to transmit control signals to the laser base unit 300 in response to signals from the sensor 250. The laser base unit 300 can be adapted to adjust one or more parameters of the laser light in response to the control signals. In this way, the depth information from the sensor 250 can be used in real-time to adjust the focus or other parameters of the laser light.

In other embodiments, the controller 500 is adapted to transmit control signals to the laser manipulation system 100 in response to signals from the sensor 250. The laser manipulation system 100 is adapted to adjust the relative distance between the laser head 200 and the interaction region in response to the control signals. In addition, the laser manipulation system 100 can be adapted to adjust the position of the laser head 200 along the surface of the structure in response to the control signals. In this way, the depth information from the sensor 250 at a first location can be used in real-time to move the laser light to another location along the surface once a desired depth at the first location is achieved.

In other embodiments, the sensor 250 is used in conjunction with statistical methods to determine the depth of the interaction region. In such embodiments, the sensor 250 is first used in a measurement phase to develop statistical data which correlates penetration depths with certain processing parameters (e.g., material being processed, light intensity). During the measurement phase, selected processing parameters are systematically varied for processing a test or sample surfaces indicative of the surfaces of the structure to be processed. The sensor 250 is used in the measurement phase to determine the depth of the interaction region corresponding to these processing parameters. In certain such embodiments, the sensor 250 can be separate from the laser head 200, and can be used during the processing of the structure or during periods when the processing has been temporarily halted in order to measure the depth of the interaction region. Exemplary sensors 250 compatible with such embodiments include, but are not limited to, calipers or other manual measuring devices which are inserted into the resultant hole to determine the depth of the interaction region.

In certain embodiments, the controller 500 contains this resulting statistical data regarding the correlation between the processing parameters and the depth of the interaction region. During a subsequent processing phase, the structure is processed, but rather than using the sensor 250 at this time, the controller 500 can be adapted to determine the relative distance by accessing the statistical data corresponding to the particular processing parameters being used. Such an approach represents a reliable and cost-effective approach for determining the depth of the interaction region while processing the structure.

In alternative embodiments, the sensor 250 is adapted to provide a measure of the distance between the laser head 200 and the surface of the structure. In such embodiments, the sensor 250 can be adapted to provide a fail condition signal to the controller 500 upon detection of the relative distance between the laser head 200 and the structure exceeding a predetermined distance. Such a fail condition may result from the apparatus 50 inadvertently becoming detached from the structure. The controller 500 can be adapted to respond to the fail condition signal by sending appropriate signals to the laser base unit 300 to halt the transmission of energy between the laser base unit 300 and the laser head 200. In certain embodiments, the transmission is preferably halted when the laser head 200 is further than one centimeter from the surface of the structure. In this way, the apparatus 50 can utilize the sensor 250 to insure that laser light is not emitted unless the containment plenum 240 is in contact with the structure. In certain embodiments, the sensor 250 comprises a proximity switch which contacts the surface of the structure while the apparatus 50 is attached to the structure.

Laser Manipulation System (LMS)

LMS: Combined Anchoring Mechanism and Positioning Mechanism

Figure 6A:
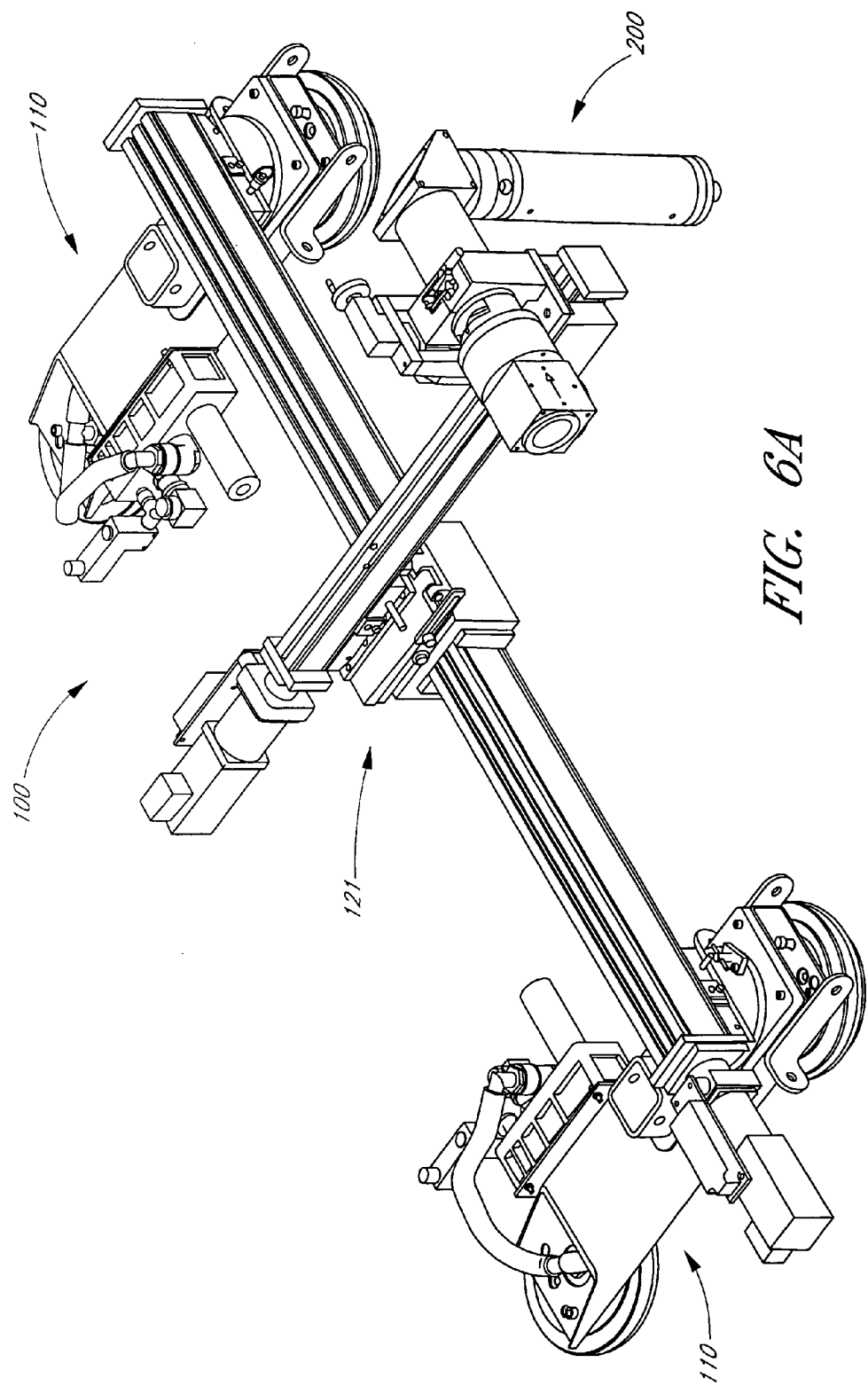
FIGS. 6A and 6B schematically illustrate two opposite elevated perspectives of an embodiment in which the laser manipulation system comprises an anchoring mechanism adapted to be releasably coupled to the structure and a positioning mechanism coupled to the anchoring mechanism and coupled to the laser head.
Figure 6B:
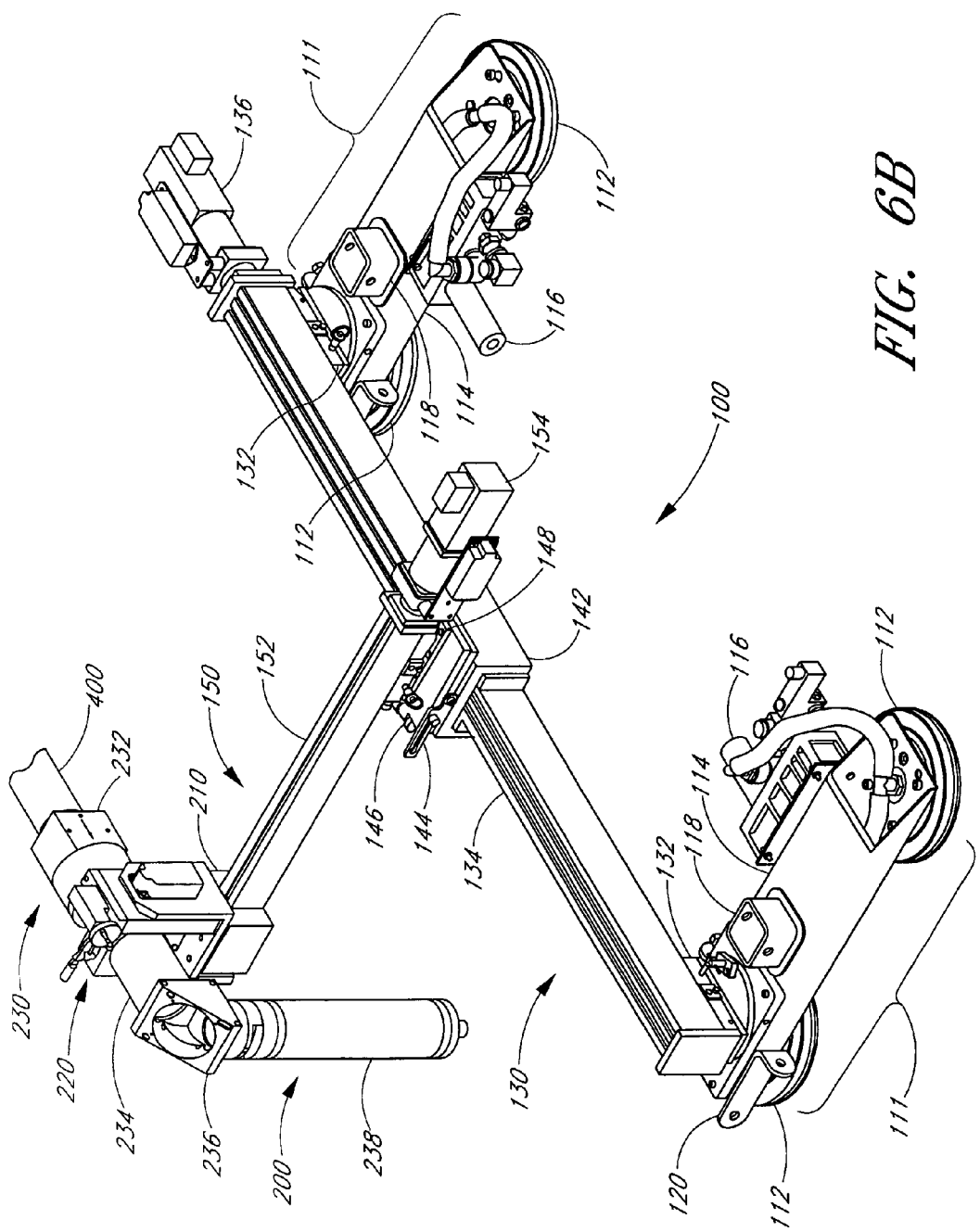

In certain embodiments, the laser manipulation system 100 serves to accurately and repeatedly position the laser head 200 in relation to the structure so as to provide articulated robotic motion generally parallel to the surface to be processed. To do so, the laser manipulation system 100 can be releasably affixed to the structure to be processed, and can then accurately move the laser head 200 in proximity to that surface. FIGS. 6A and 6B schematically illustrate two opposite elevated perspectives of an embodiment in which the laser manipulation system 100 comprises an anchoring mechanism 110 adapted to be releasably coupled to the structure and a positioning mechanism 121 coupled to the anchoring mechanism 110 and coupled to the laser head 200. In certain embodiments, the laser manipulation system 100 can be advantageously disassembled and reassembled for transport, storage, or maintenance.

Anchoring Mechanism

Certain embodiments of the laser manipulation system 100 comprise an anchoring mechanism 110 to releasably affix the laser manipulation system 100 to the structure to be processed. The anchoring mechanism 110 can be adapted to be releasably coupled to the structure and can comprise one or more attachment interfaces 111.

In the embodiment schematically illustrated in FIG. 6B, the anchoring mechanism 110 comprises a pair of attachment interfaces 111. Each attachment interface 111 comprises at least one resilient vacuum pad 112, at least one interface mounting device 114, at least one vacuum conduit 116, at least one mounting connector 118, and a coupler 119 adapted to couple the attachment interface 111 of the anchoring mechanism 110 to the positioning mechanism 121. While the embodiment schematically illustrated in FIGS. 6A and 6B have two vacuum pads 112 for each of the two attachment interfaces 111, other embodiments utilize any configuration or number of attachment interfaces 111 and vacuum pads 112.

Figure 7:
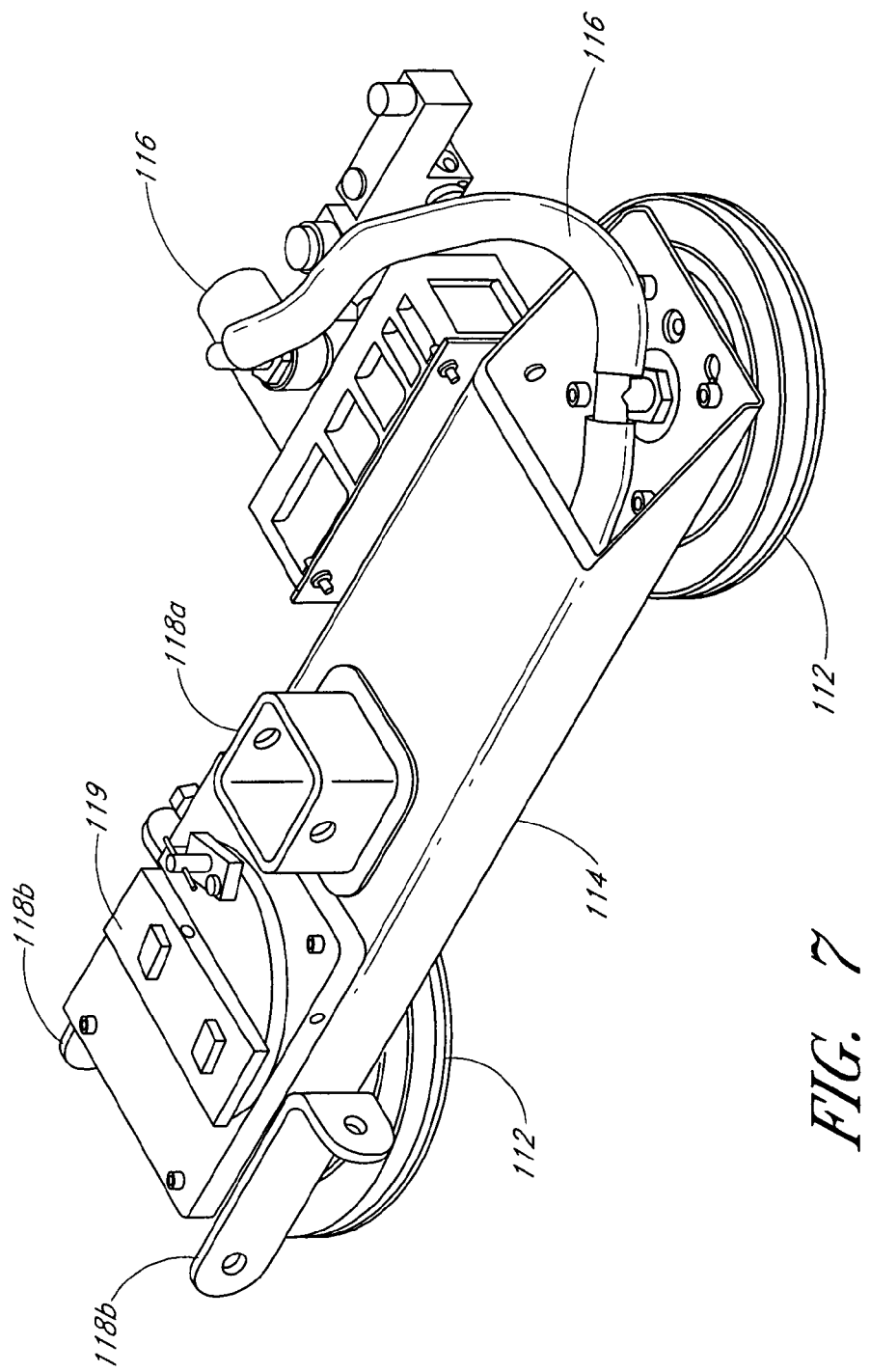
FIG. 7 schematically illustrates an embodiment of an attachment interface of the anchoring mechanism.

In the embodiment illustrated by FIG. 7, two vacuum pads 112 are coupled to the interface mounting device 114. In certain embodiments, each vacuum pad 112 comprises a circular rubber pad which forms an effectively air-tight region when placed on the structure. Each vacuum pad 112 is fluidly coupled to at least one vacuum generator (not shown) via a vacuum conduit 116 (e.g., a flexible hose). The vacuum generator may use fluid power (e.g., compressed air) to generate the vacuum, or it may use an external vacuum source. The vacuum generator draws air out from the air-tight region between the vacuum pad 112 and the structure via the vacuum conduit 116, thereby creating a vacuum within the air-tight region. Atmospheric pressure provides a force which reversibly affixes the vacuum pad 112 to the structure.

The interface mounting device 114 comprises a rigid metal support upon which is mounted the vacuum pads 112, the mounting connector 118, and the coupler 119. In certain embodiments, the mounting connector 118 can comprise a ground-based support connector 118a adapted to be releasably attached to a ground-based support system 700, as described more fully below. In other embodiments, the mounting connector 118 can comprise at least one suspension-based support connector 118b adapted to be releasably attached to a suspension-based support system 800, as described more fully below. The coupler 119 is adapted to releasably couple the interface mounting device 114 to the positioning mechanism 121. In certain embodiments, the coupler 119 comprises at least one protrusion which is connectable to at least one corresponding recess in the positioning mechanism 121.

In alternative embodiments, the anchoring mechanism 110 can comprise other technologies for anchoring the apparatus 50 to the structure to be processed. These other technologies include, but are not limited to, a winch, suction devices (e.g., cups, gekkomats, or skirts) affixed to the apparatus 50 or on quasi-tank treads, mobile scaffolding suspended from the structure, and a rigid ladder. These technologies can also be used in combination with one another in certain embodiments of the anchoring mechanism 110.

Positioning Mechanism

Figure 8:
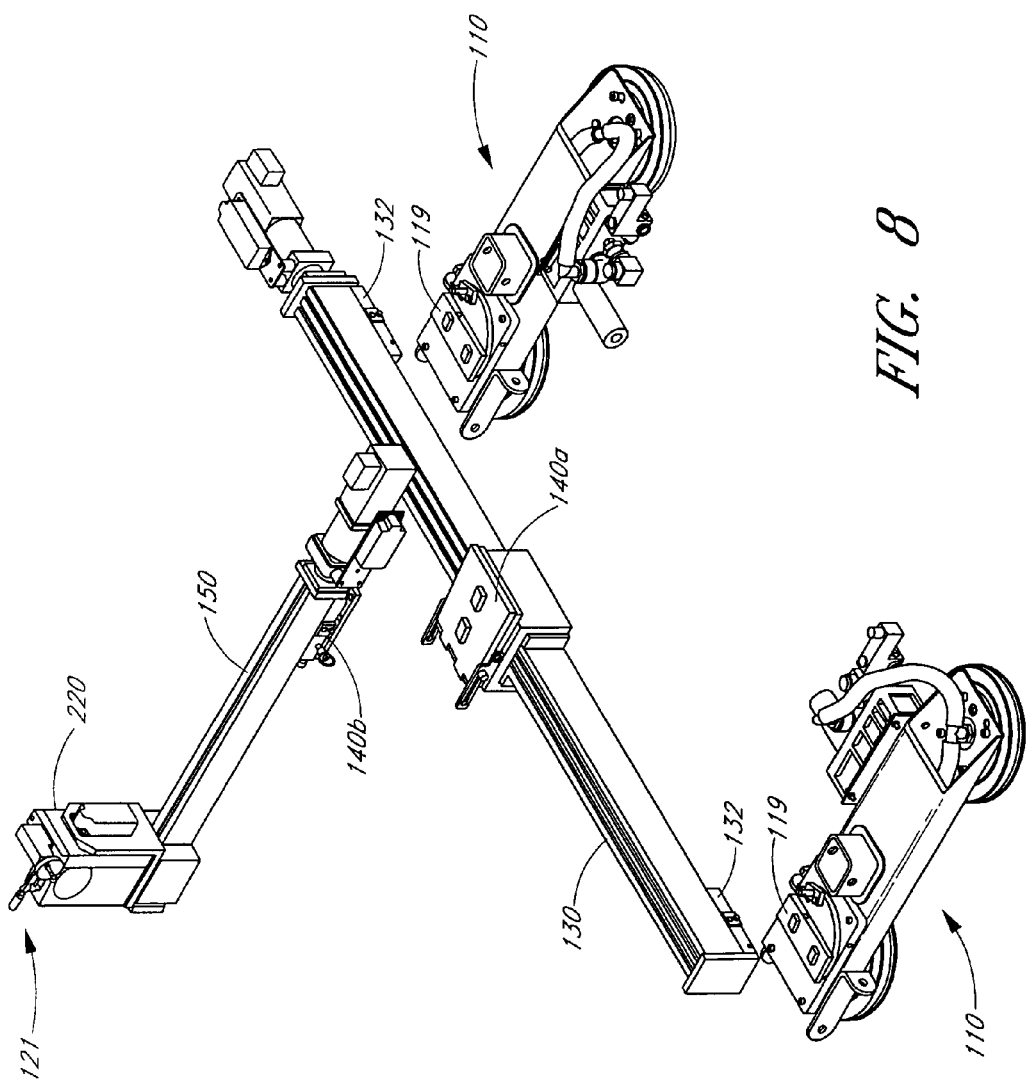
FIG. 8 schematically illustrates an exploded view of one embodiment of the positioning mechanism along with the attachment interfaces of the anchoring mechanism.

Certain embodiments of the laser manipulation system 100 comprise a positioning mechanism 121 to accurately move the laser head 200 while in proximity to the structure to be processed. FIG. 8 schematically illustrates an exploded view of one embodiment of the positioning mechanism 121 along with the attachment interfaces 111 of the anchoring mechanism 110. The positioning mechanism 121 of FIG. 8 comprises a first-axis position system 130, a second-axis position system 150, an interface 140, and a laser head receiver 220. The first-axis position system 130 is releasably coupled to the attachment interfaces 111 of the anchoring mechanism 110 by at least one coupler 132. The interface 140 (comprising a first piece 140a and a second piece 140b in the embodiment of FIG. 8) releasably couples the second-axis position system 150 to the first-axis position system 130. The laser head receiver 220 is releasably coupled to the second-axis position system 150, and is adapted to be releasably coupled to the housing 230 of the laser head 200.

In certain embodiments, the first-axis position system 130 comprises at least one coupler 132 having a recess which is releasably connectable to at least one corresponding protrusion of the coupler 119 of the anchoring mechanism 110.

Such embodiments are advantageously disassembled and reassembled for transport, storage, or maintenance of the positioning mechanism 121. Other embodiments can have the first-axis position system 130 fixedly coupled to the anchoring mechanism 110.

Figure 9:
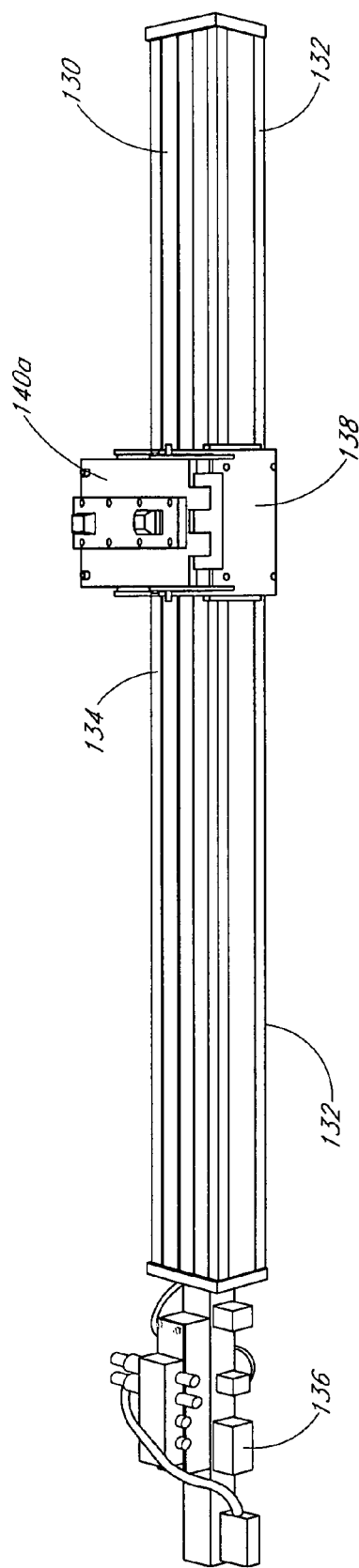
FIG. 9 schematically illustrates an embodiment of a first-axis position system.

In certain embodiments, the first-axis position system 130 moves the laser head 200 in a first direction substantially parallel to the surface of the structure. In the embodiment schematically illustrated by FIG. 9, the first-axis position system 130 further comprises a first rail 134, a first drive 136, and a first stage 138. The first stage 138 is movably coupled to the first rail 134 under the influence of the first drive 136. The first piece 140a of the interface 140 is fixedly coupled to the first stage 138 so that the first drive 136 can be used to move the interface 140 along the first rail 134. In certain embodiments, the first-axis position system 130 further comprises sensors, limit switches, or other devices which provide information regarding the position of the first stage 138 along the first rail 134. This information can be provided to the controller 500, which is adapted to transmit control signals to the first drive 136 or other components of the laser manipulation system 100 in response to this information.

Exemplary first drives 136 include, but are not limited to, hydraulic drives, pneumatic drives, electromechanical drives, screw drives, and belt drives. First rails 134, first drives 136, and first stages 138 compatible with embodiments described herein are available from Tol-O-Matic, Inc. of Hamel, Minn. Other types and configurations of first rails 134, first drives 136, and first stages 138 are also compatible with embodiments described herein.

Figure 10:
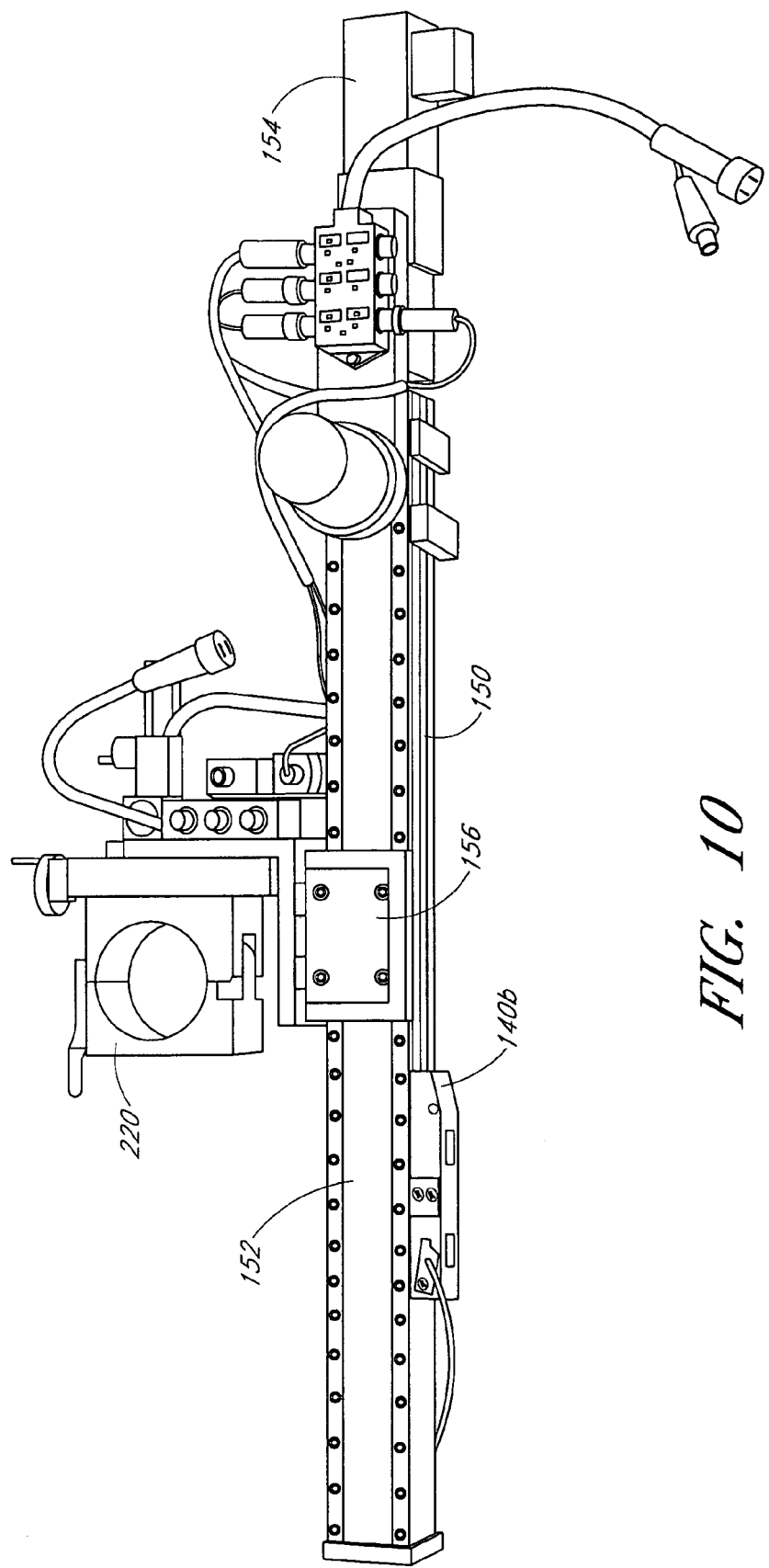
FIG. 10 schematically illustrates an embodiment of a second-axis position system.

In certain embodiments, the second-axis position system 150 moves the laser head 200 in a second direction substantially parallel to the surface of the structure. The second direction in certain embodiments is substantially perpendicular to the first direction of the first-axis position system 130. In the embodiment schematically illustrated by FIG. 10, the second-axis position system 150 comprises a second rail 152, a second drive 154, and a second stage 156. In certain embodiments, the first-axis position system 130 and the second-axis position system 150 provide linear movements of the laser head 200. In other embodiments, the first-axis position system 130 and the second-axis position system 150 provide circular and axial movements of the laser head 200, respectively.

In certain embodiments, the second stage 156 is movably coupled to the second rail 152 under the influence of the second drive 154. The laser head receiver 220 is releasably coupled to the second stage 156 so that the second drive 154 can be used to move the laser head receiver 220 along the second rail 152. In certain embodiments, the second-axis position system 150 further comprises sensors, limit switches, or other devices which provide information regarding the position of the second stage 156 along the second rail 152. This information can be provided to the controller 500, which is adapted to transmit control signals to the second drive 154 or other components of the laser manipulation system 100 in response to this information.

Exemplary second drives 154 include, but are not limited to, hydraulic drives, pneumatic drives, electromechanical drives, screw drives, and belt drives. Second rails 152, second drives 154, and second stages 156 compatible with embodiments described herein are available from Tol-O-Matic, Inc. of Hamel, Minn. Other types and configurations of second rails 152, second drives 154, and second stages 156 are also compatible with embodiments described herein.

In certain embodiments, the second rail 152 is fixedly coupled to the second piece 140b of the interface 140. The second piece 140b can comprise at least one recess which is releasably connectable to at least one corresponding protrusion of the first piece 140a of the interface 140. Such embodiments are advantageously disassembled and reassembled for transport, storage, or maintenance of the positioning mechanism 121. In other embodiments, the interface 140 can be made of a single piece which is releasably coupled to one or both of the first stage 138 and the second rail 152. Other embodiments are not configured for convenient disassembly (e.g., having an interface 140 made of a single piece and that is fixedly coupled to both the first stage 138 and the second rail 152).

Figure 11A:
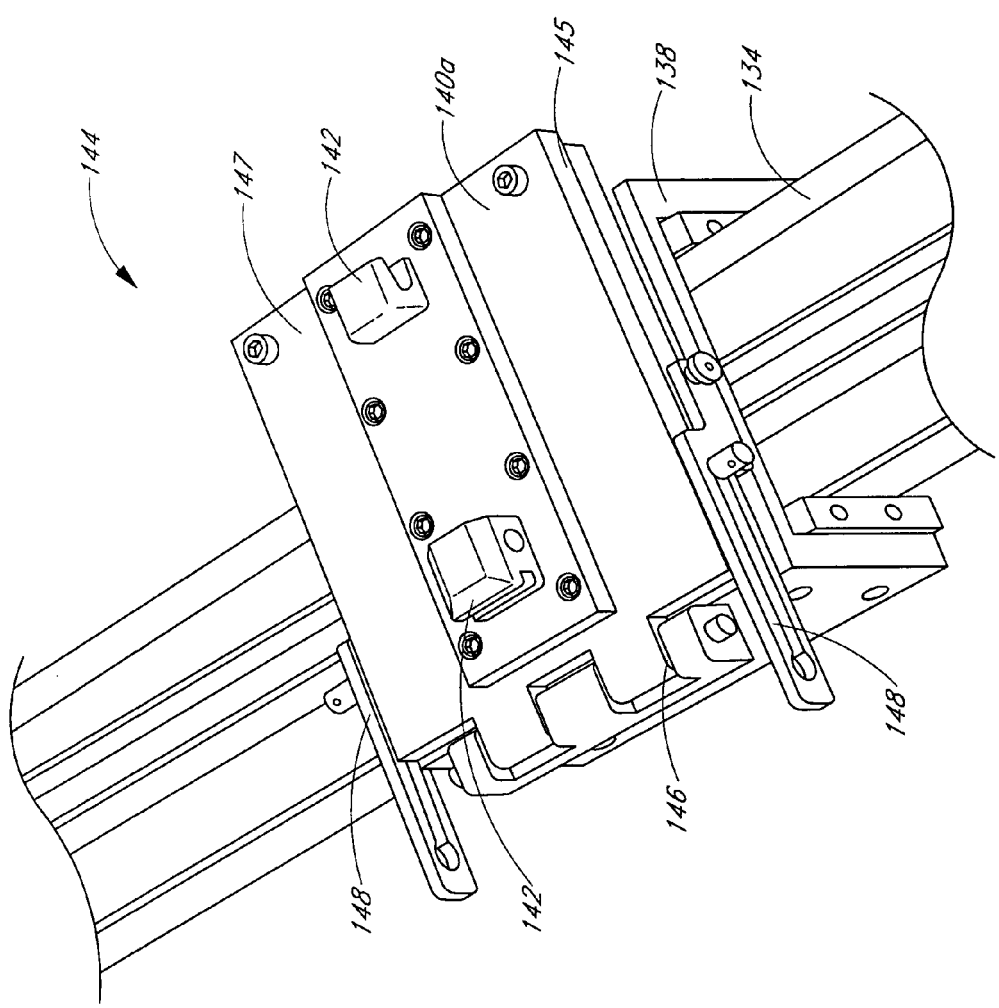
FIGS. 11A and 11B schematically illustrate an embodiment of an interface in two alternative configurations.

In certain embodiments, the interface 140 comprises a tilt mechanism 144 to adjust the relative orientation between the first rail 134 and the second rail 152. As schematically illustrated in FIG. 11A, the first piece 140a of the interface 140 is coupled to the first stage 138 on the first rail 134, and comprises a pair of protuberances 142 adapted to couple with corresponding recesses of the second piece 140b of the interface 140. The tilt mechanism 144 comprises a first plate 145, a hinge 146, a second plate 147, and a pair of support braces 148. The first plate 145 is fixedly mounted to the first stage 138 and is substantially parallel to the surface upon which the anchoring mechanism 110 is mounted. The second plate 147 is pivotally coupled to the first plate 145 by the hinge 146, and can be locked in place by the support braces 148.

Figure 11B:
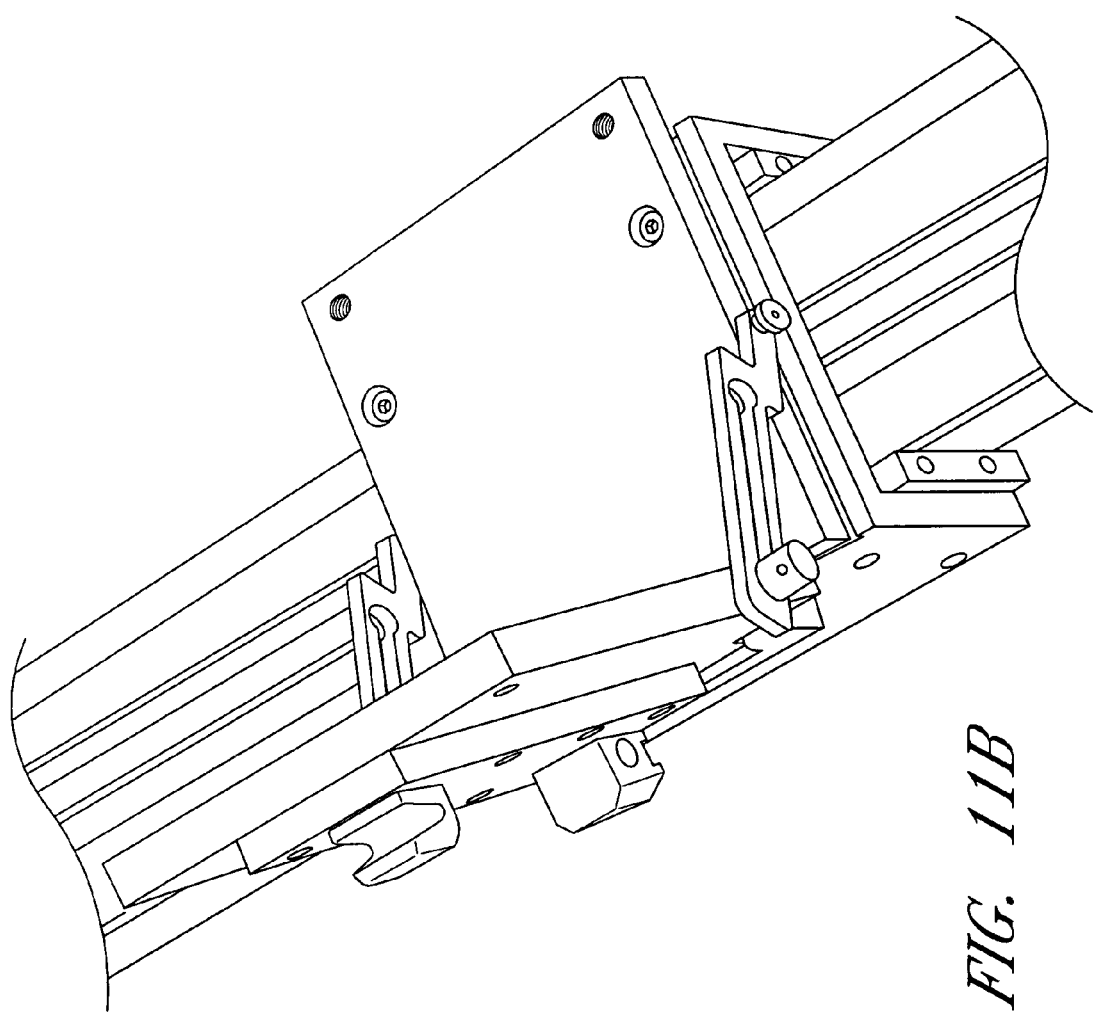

In FIG. 11A, the tilt mechanism 144 is configured so that the first plate 145 and the second plate 147 are substantially parallel to one another. In this configuration, the plane of movement defined by the first direction and the second direction of the laser head 200 is substantially parallel to the surface upon which the anchoring mechanism 110 is coupled. In FIG. 11B, the tilt mechanism 144 is configured so that the second plate 147 is at a non-zero angle (e.g., 90 degrees) relative to the first plate 145. In this configuration, the plane of movement defined by the first direction and the second direction of the laser head 200 is at a non-zero angle relative to the surface upon which the anchoring mechanism 110 is coupled.

Figure 12:
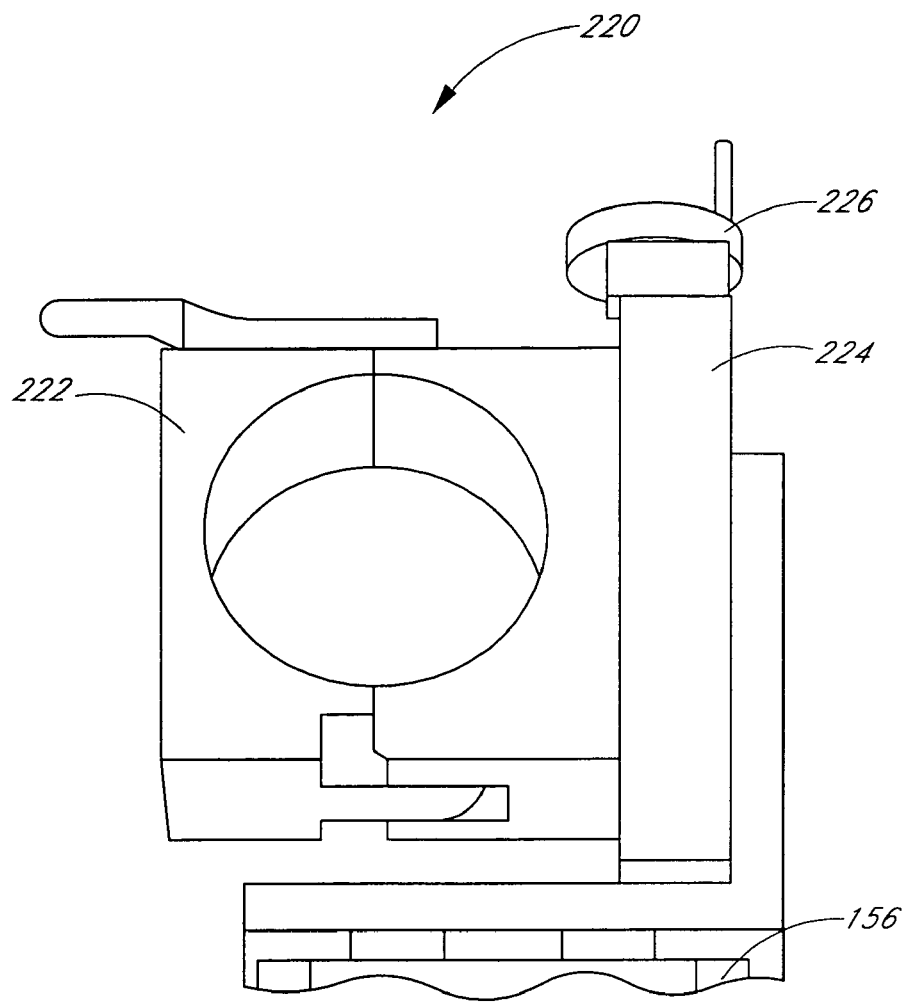
FIG. 12 schematically illustrates an embodiment of a laser head receiver.

In certain embodiments, the laser head receiver 220 is releasably coupled the housing 230 of the laser head 200. FIG. 12 schematically illustrates a laser head receiver 220 compatible with embodiments described herein. The laser head receiver 220 is coupled to the second stage 156 and comprises a releasable clamp 222 and a third-axis position system 224. The clamp 222 is adapted to hold the housing 230 of the laser head 200. The third-axis position system 224 is adapted to adjust the relative distance between the laser head 200 and the structure being processed. In certain embodiments, the third-axis position system 224 comprises a screw drive which moves the clamp 222 substantially perpendicularly to the second rail 152. In certain embodiments, as schematically illustrated by FIG. 12, the screw drive is manually actuated by a handle 226, which can be rotated to move the clamp 222. In other embodiments, the screw drive is automatically controlled by equipment responsive to control signals from the controller 500.

Ground-Based Support System

In certain embodiments, the apparatus 50 can be utilized with a ground-based support system 700 which is releasably coupled to the apparatus 50. The interface mounting devices 114 can each comprise a ground-based support connector 118a adapted to releasably couple to the ground-based support system 700. The ground-based support system 700 advantageously attaches to various types of external boom systems, such as commercially-available lifting- or positioning-type systems, which can support some of the weight of the apparatus 50, thereby reducing the weight load supported by the anchoring mechanism 110. The ground-based support system 700 can be used to facilitate use of the apparatus 50 on substantially vertical surfaces (e.g., walls) or on substantially horizontal surfaces (e.g., ceilings).

Figure 13:
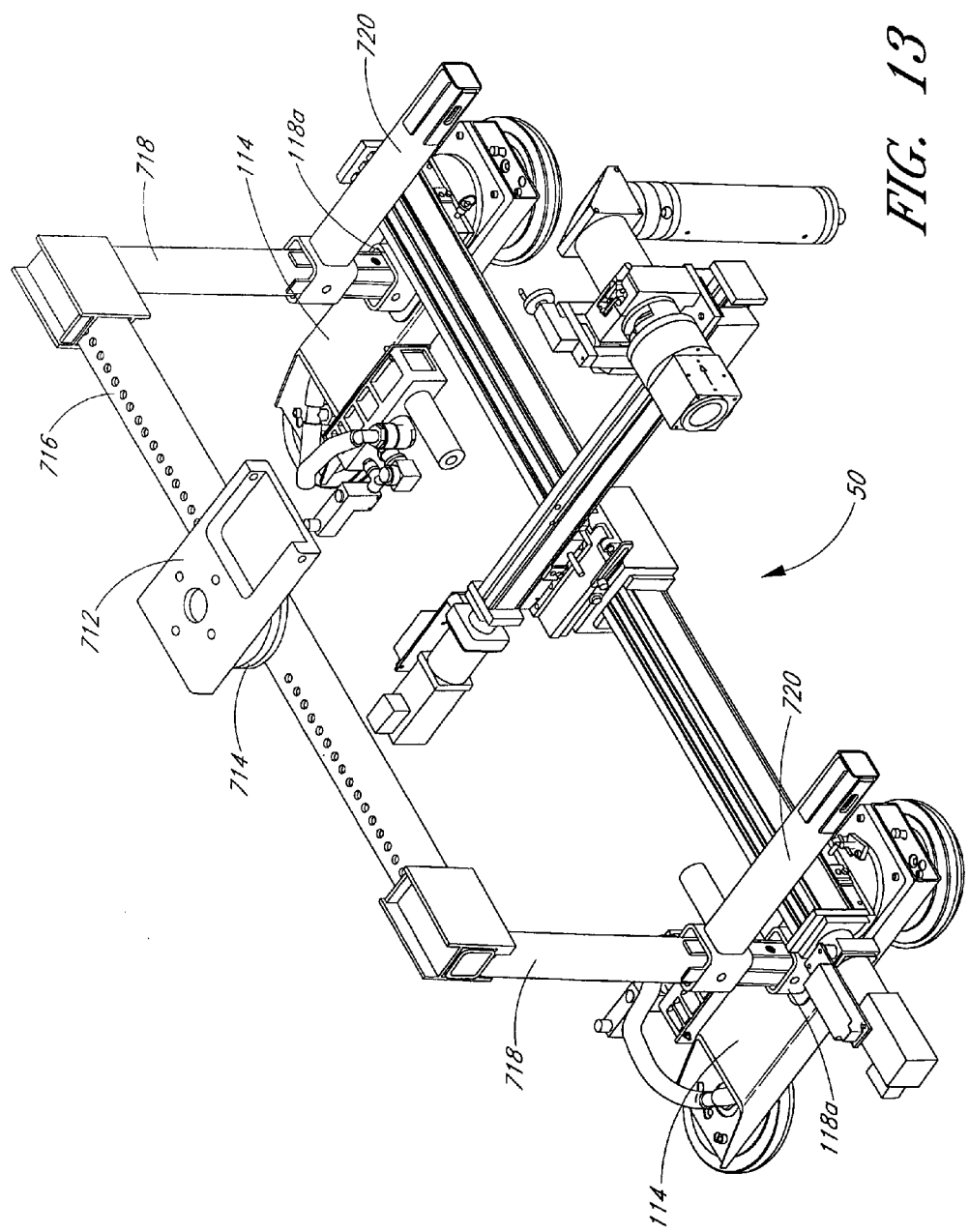
FIG. 13 schematically illustrates an embodiment of a support structure coupled to the other components of the apparatus.

In certain embodiments, the ground-based support system 700 includes a support structure 710 such as that schematically illustrated in FIG. 13. The support structure 710 of FIG. 13 comprises a boom connector 712, a rotational mount 714, a spreader member 716, a pair of primary posts 718, and a pair of auxiliary posts 720. The boom connector 712 is adapted to attach to a selected external boom system. The rotational mount 714 is adapted to be rotatably coupled to the boom connector 712 and fixedly coupled to the spreader member 716 so that the boom connector 712 can be advantageously rotated relative to the support structure 710.

The primary posts 718 are coupled to the spreader member 716 and are substantially parallel to one another. Each of the primary posts 718 is adapted to be coupled to one of the ground-based support connectors 118*a* of the interface mounting devices 114. The primary posts 718 can each be coupled to the spreader member 716 at various positions so that they are aligned with the ground-based support connectors 118*a*. Each primary post 718 is also coupled to, and is substantially perpendicular to, an auxiliary post 720. In such embodiments, rather than having the primary posts 718 coupled to the ground-based support connectors 118*a*, the auxiliary posts 720 can be coupled to the ground-based support connectors 118*a*, thereby effectively rotating the support structure 710 by 90 degrees relative to the anchoring mechanism 110. Such embodiments advantageously provide adjustability for processing various configurations of structures and to permit alternative configurations best suited for particular applications.

Suspension-Based Support System

Alternatively, the apparatus 50 can be utilized with a suspension-based support system 800 which is releasably coupled to the apparatus 50. The interface mounting devices 114 can each comprise at least one suspension-based support connector 118*b* adapted to releasably couple to the suspension-based support system 800. The suspension-based support system 800 advantageously supports some of the weight of the apparatus 50, thereby reducing the weight load supported by the anchoring mechanism 110. The suspension-based support system 800 can be used to facilitate use of the apparatus 50 on substantially vertical surfaces (e.g., outside walls).

Figure 14A:
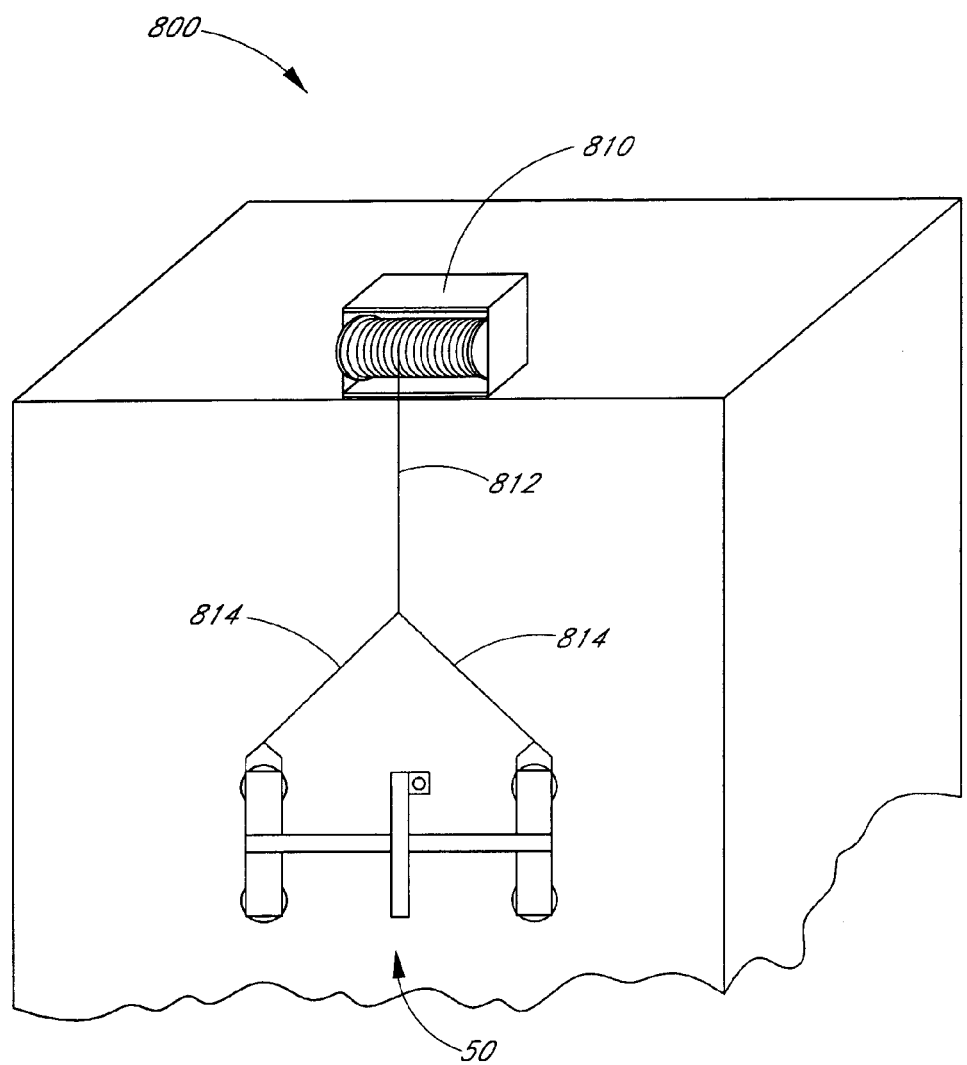
FIG. 14A schematically illustrates an embodiment of a suspension-based support system coupled to the apparatus.
Figure 14B:
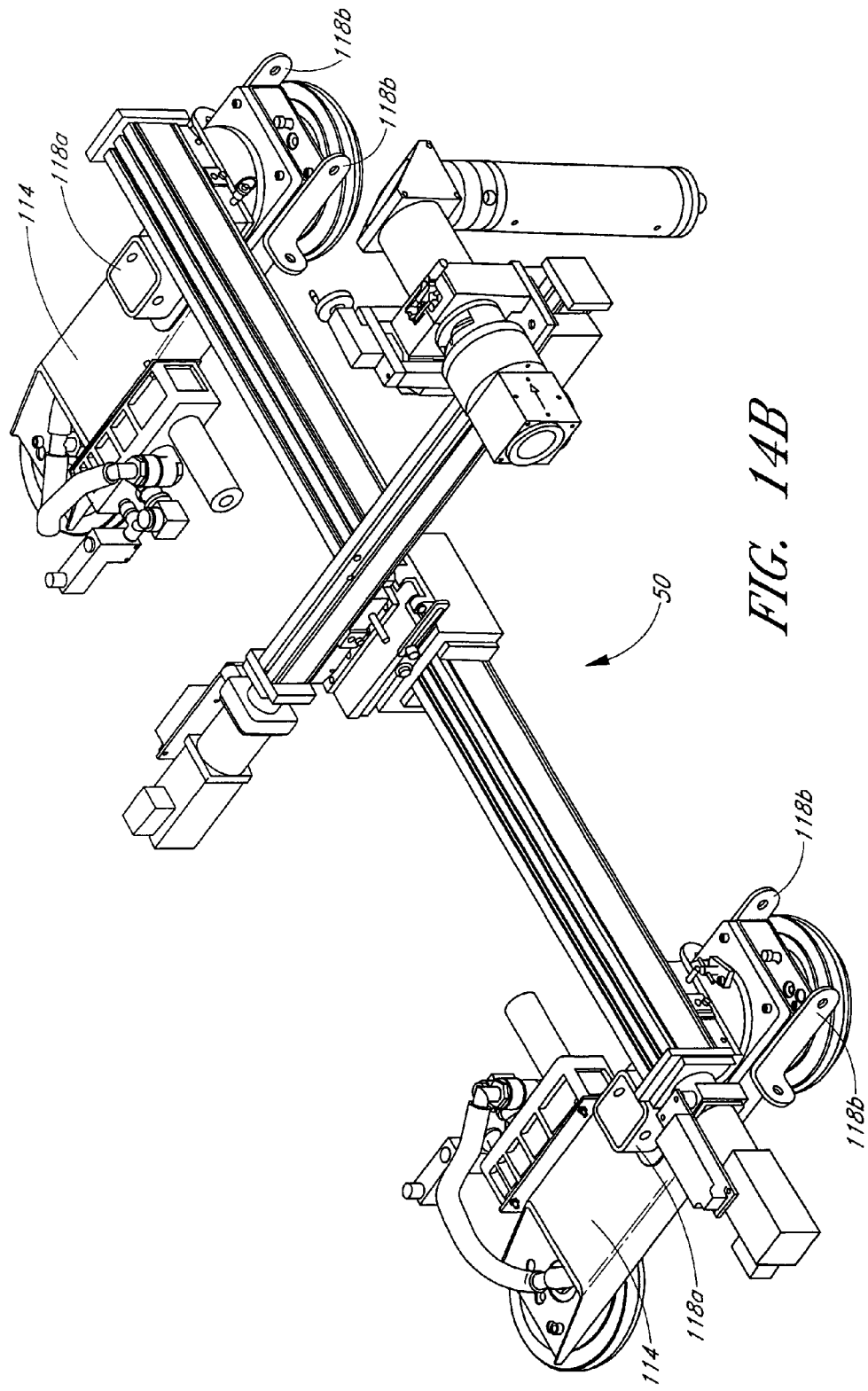
FIG. 14B schematically illustrates an embodiment of the apparatus comprising suspension-based support connectors.

In certain embodiments, as schematically illustrated in FIG. 14A, the suspension-based support system 800 comprises a winch 810, a primary cable 812, and a pair of secondary cables 814. The winch 810 is positioned on the roof or other portion of a structure to be processed. The winch 810 is coupled to the primary cable 812, which is coupled to the secondary cables 814. The secondary cables 814 are each coupled to a suspension-based support connector 118*b* of the interface mounting device 114 of the anchoring mechanism 110. FIG. 14B schematically illustrates one embodiment of the apparatus having the suspension-based support connectors 118*b*. The apparatus 50 can then be lowered or raised by utilizing the winch 810 to shorten or lengthen the working length of the primary cable 814. In alternative embodiments, the ground-based support connectors 118*a* can be configured to serve also as the suspension-based support connectors 118*b*.

LMS: Simplified Anchoring Mechanism

FIGS. 21A-21D schematically illustrate other anchoring mechanisms 1110 in accordance with embodiments described herein. The anchoring mechanism 1110 comprises a resilient vacuum pad 1112 adapted to be releasably coupled to the structure, a coupler 1114 adapted to be releasably attached to the laser head 1200, and a handle 1116. Rather than the above-described laser manipulation system 100 which comprises a four-vacuum-pad anchoring mechanism 110 and a multiple-axis positioning mechanism 121, the anchoring mechanism 1110 provides a simplified mechanism to releasably hold the laser head 1200 of FIG. 20 at a selected position in relation to the structure being irradiated.

In certain embodiments, the vacuum pad 1112 comprises a circular rubber membrane (not shown) which forms an effectively air-tight region when placed on the structure. The vacuum pad 1112 is fluidly coupled to at least one vacuum generator (not shown) via a vacuum conduit (not shown), such as flexible rubber hose. By drawing air out from the air-tight region between the rubber membrane and the structure via the vacuum conduit, the vacuum generator creates a vacuum within the air-tight region. Atmospheric pressure provides a force which reversibly affixes the anchoring mechanism 1110 to the structure. Removal of the anchoring mechanism 1110 from the surface is achieved by allowing air back into the air-tight region between the rubber membrane and the structure. Vacuum pads 1112 compatible with embodiments described herein are available from a variety of sources. An exemplary vacuum pad 1112 is provided by the 376281-DD-CR-1 Complete Core Rig Stand from Hilti Corporation of Schaan in the Principality of Liechtenstein.

In certain embodiments, the coupler 1114 comprises a structure which mates with a corresponding laser head coupler 1250 of the laser head 1200. For the anchoring mechanism 1110 schematically illustrated by FIG. 21A, the coupler 1114 comprises at least one protrusion 1115 which is attached to the vacuum pad 1112. The coupler 1114 is connectable to the laser head coupler 1250 which comprises at least one corresponding recess 1116. In other embodiments, the coupler 1114 comprises a recess and the laser head coupler 1250 comprises a corresponding protrusion. In still other embodiments, the coupler 1114 comprises a collar 1117 which is adapted to hold the laser head 2200, as schematically illustrated by FIG. 21D.

As schematically illustrated by FIG. 21C, in still other embodiments, the connector 1114 comprises at least one rod 1118 and the coupler 1250 of the laser head 1200 comprises at least one collar 1119. In the exemplary embodiment of FIG. 21C, the coupler 1114 comprises two rods 1118*a*, 1118*b* and the laser head coupler 1250 comprises two collars 1119*a*, 1119*b*. Each collar 1119 is releasably coupled to the corresponding rod 1118 such that the laser head 1200 can be adjustably positioned at various locations along the length of the rod 1118. In certain such embodiments, the collar 1119 can be adjustably rotated with respect to the rod 1118 to allow the laser head 1200 to be rotated about the rod 1118. For example, in the embodiment schematically illustrated by FIG. 21C, one collar 1119*a* can be detached from its corresponding rod 1118*a*, and the other collar 1119*b* can be rotated about its corresponding rod 1118*b*. Such embodiments provide the capability to rotate the laser head 1200 away from its drilling position so that visual inspection can be made of the hole being drilled. Once visual inspection has been made, the laser head 1200 can then be replaced back into the drilling position by rotating the laser head 1200 back and recoupling the collar 1119*a* to its corresponding rod 1118*a*.

In certain embodiments, the handle 1116 is adapted to facilitate transporting and positioning the anchoring mechanism 1110 at a desired location. Other configurations of the handle 1116 besides that schematically illustrated by FIGS. 21A-21D are compatible with other embodiments described herein.

Such simplified anchoring mechanisms 1110, as described above, can be used when the apparatus is used to only drill or pierce holes into the structure. In certain such embodiments, the anchoring mechanism 1110 can be releasably affixed to the structure so that the laser head 1200 is positioned to irradiate the structure to drill a hole at a selected location. To drill a second hole at a second selected location in such embodiments, the anchoring mechanism 1110 is removed from the structure and moved so that the laser head 1200 is repositioned to irradiate the structure at the second selected location. By simplifying the anchoring mechanism 1110 (as compared to the anchoring mechanism 110 of FIGS. 6A, 6B, 7, and 8) and avoiding the use of a positioning mechanism 121, such simplified embodiments provide a lighter weight alternative which is movable and positionable by a single person. In addition, such simplified embodiments are more robust than those described in relation to FIGS. 6A, 6B, 7, and 8.

Controller

Figure 15:
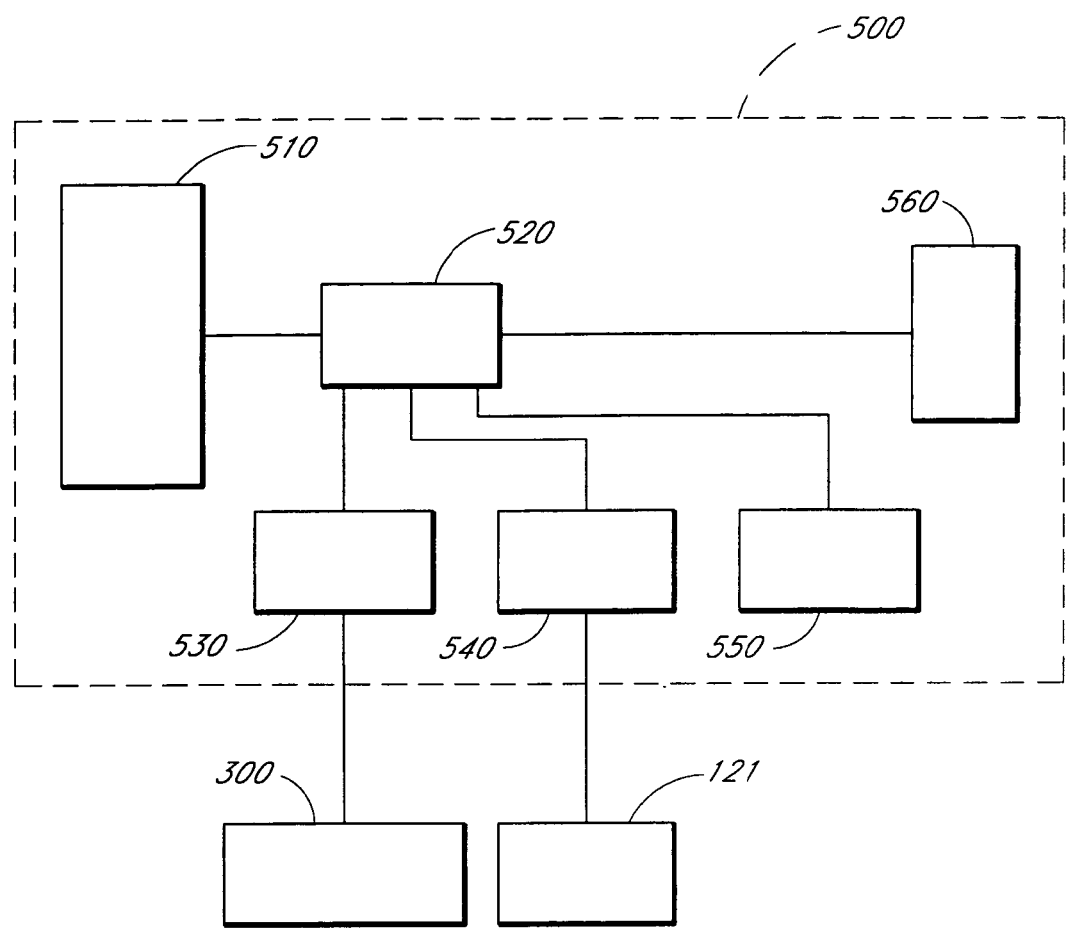
FIG. 15 schematically illustrates an embodiment of a controller comprising a control panel, a microprocessor, a laser generator interface, a positioning system interface, a sensor interface, and a user interface.

In certain embodiments, the controller 500 is electrically coupled to the laser base unit 300 and is adapted to transmit control signals to the laser base unit 300. In other embodiments, the controller 500 is electrically coupled to both the laser base unit 300 and the laser manipulation system 100, and is adapted to transmit control signals to both the laser base unit 300 and the laser manipulation system 100. FIG. 15 schematically illustrates an embodiment of a controller 500 in accordance with embodiments described herein. The controller 500 comprises a control panel 510, a microprocessor 520, a laser generator interface 530, a positioning system interface 540, a sensor interface 550, and a user interface 560.

In certain embodiments, the control panel 510 includes a main power supply, main power switch, emergency power off switch, and various electrical connectors adapted to couple to other components of the controller 500. The control panel 510 is adapted to be coupled to an external power source (not shown in FIG. 15) and to provide power to various components of the apparatus 50.

In certain embodiments, the microprocessor 520 can comprise a Programmable Logic Controller microprocessor (PLC). PLCs are rugged, reliable, and easy-to-configure, and exemplary PLCs are available from Rockwell Automation of Milwaukee, Wis., Schneider Electric of Palatine, Ill., and Siemens AG of Munich, Germany. In alternative embodiments, the microprocessor 520 comprises a personal computer microprocessor, or PC/104 embedded PC modules which provide easy and flexible implementation. The microprocessor 520 can be adapted to respond to input signals from the user (via the user interface 560), as well as from various sensors of the apparatus 50 (via the sensor interface 550), by transmitting control signals to the other components of the apparatus 50 (via the laser generator interface 530 and the positioning system interface 540) to achieve the desired cutting or drilling pattern.

The microprocessor 520 can be implemented in hardware, software, or a combination of the two. When implemented in a combination of hardware and software, the software can reside on a processor-readable storage medium. In addition, the microprocessor 520 of certain embodiments comprises memory to hold information used during operation.

In certain embodiments, the laser generator interface 530 is coupled to the laser base unit 300 and is adapted to transmit control signals from the microprocessor 520 to various components of the laser base unit 300. For example, the laser generator interface 530 can transmit control signals to the laser generator 310 to set desired operational parameters, including, but not limited to, laser power output levels and laser pulse profiles and timing. In addition, the laser generator interface 530 can transmit control signals to the cooling subsystem 320 to set appropriate cooling levels, the source of compressed gas coupled to the compressed gas inlet 249 of the containment plenum 240, or to the vacuum generator coupled to the extraction port 248.

In certain embodiments, the positioning system interface 540 is coupled to the positioning mechanism 121 of the laser manipulation system 100 and is compatible with the first-axis position system 130 and second-axis position system 150, as described above. In certain such embodiments, the positioning system interface 540 comprises servo-drivers for the first-axis position system 130 and the second-axis position system 150. The servo-drivers are preferably responsive to control signals from the microprocessor 520 to generate driving voltages and currents for the first drive 136 and the second drive 154. In this way, the controller 500 can determine how the laser head 200 is scanned across the surface of the structure. In certain embodiments, the servo-drivers receive their power from the control panel 510 of the controller 500. In embodiments in which the positioning mechanism 121 further comprises a third-axis position system, the positioning system interface 540 further comprises an appropriate servo-driver so that the controller 500 can determine the relative distance between the laser head 200 and the structure surface being processed.

In certain embodiments, the sensor interface 550 is coupled to various sensors (not shown in FIG. 15) of the apparatus 50 which provide data upon which operation parameters can be selected or modified. For example, as described above, the laser head 200 can comprise a sensor 250 adapted to measure the relative distance between the laser head 200 and the interaction region. The sensor interface 550 of such embodiments receives data from the sensor 250 and provide this data to the microprocessor 520. The microprocessor 520 can then adjust various operational parameters of the laser base unit 300 and/or the laser manipulation system 100, as appropriate, in real-time. Other sensors which can be coupled to the controller 500 via the sensor interface 550 include, but are not limited to, proximity sensors to confirm that the laser head 200 is in position relative to the surface being processed, temperature or flow sensors for the various cooling, compressed air, and vacuum systems, and rebar detectors (as described more fully below).

Figure 16:
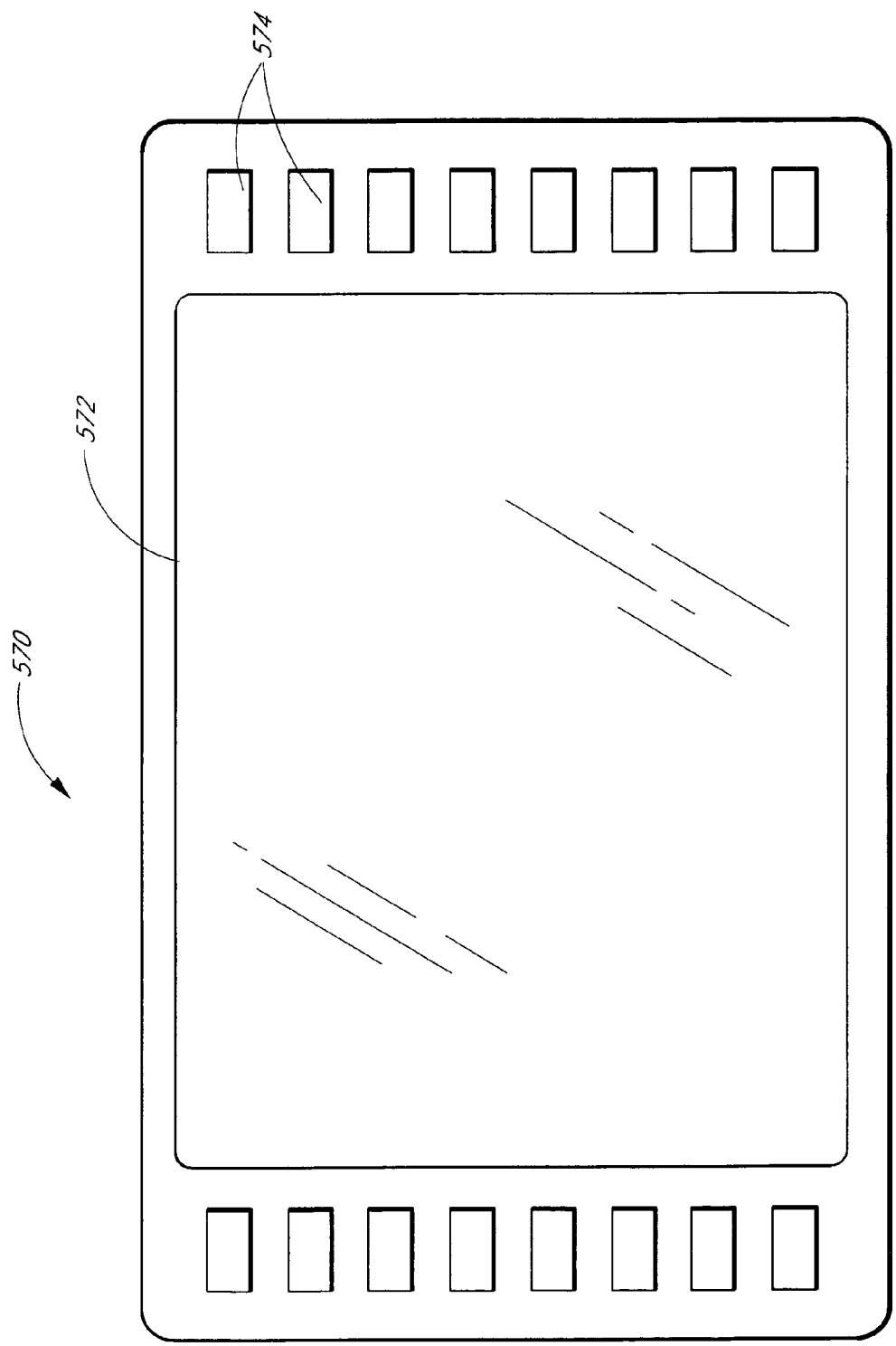
FIG. 16 schematically illustrates a control pendant comprising a screen and a plurality of buttons.

In certain embodiments, the user interface 560 adapted to provide information regarding the apparatus 50 to the user and to receive user input which is transmitted to the microprocessor 520. In certain embodiments, the user interface 560 comprises a control pendant 570 which is electrically coupled to the microprocessor 520. As schematically illustrated in FIG. 16, in certain embodiments, the control pendant 570 comprises a screen 572 and a plurality of buttons 574.

The screen 572 can be used to display status information and operational parameter information to the user. Exemplary screens 572 include, but are not limited to, liquid-crystal displays. The buttons 574 can be used to allow a user to input data which is used by the microprocessor 520 to set operational parameters of the apparatus 50. Other embodiments can use other technologies for communicating user input to the apparatus 50, including, but not limited to, keyboard, mouse, touchpad, and potentiometer knobs and/or dials. In certain embodiments, the control pendant 570 is hard-wired to the apparatus 50, while in other embodiments, the control pendant 570 communicates remotely (e.g., wirelessly) with the apparatus 50.

In certain embodiments, the control pendant 570 further comprises an emergency stop button and a cycle stop button. Upon pressing the emergency stop button, the apparatus 50 immediately ceases all movement and the laser irradiation is immediately halted. Upon pressing the cycle stop button, the apparatus 50 similarly ceases all movement and halts laser irradiation corresponding to the cutting sequence being performed, but the user is then provided with the option to return to the beginning of the cutting sequence or to re-start cutting at the spot where the cutting sequence was stopped. In certain embodiments, the control pendant 570 further comprises a "dead man switch," which must be manually actuated by the user for the apparatus 50 to perform. Such a switch provides a measure of safety by ensuring that the apparatus 50 is not run without someone actively using the control pendant 570.

FIGS. 17A-17H illustrate a set of exemplary screen displays of the control pendant 570. The function of each of the buttons 574 along the left and right sides of the screen 572 is dependent on the operation mode of the apparatus 50. Each of the screen displays provides information regarding system status along with relevant information regarding the current operation mode.

Figure 17A:
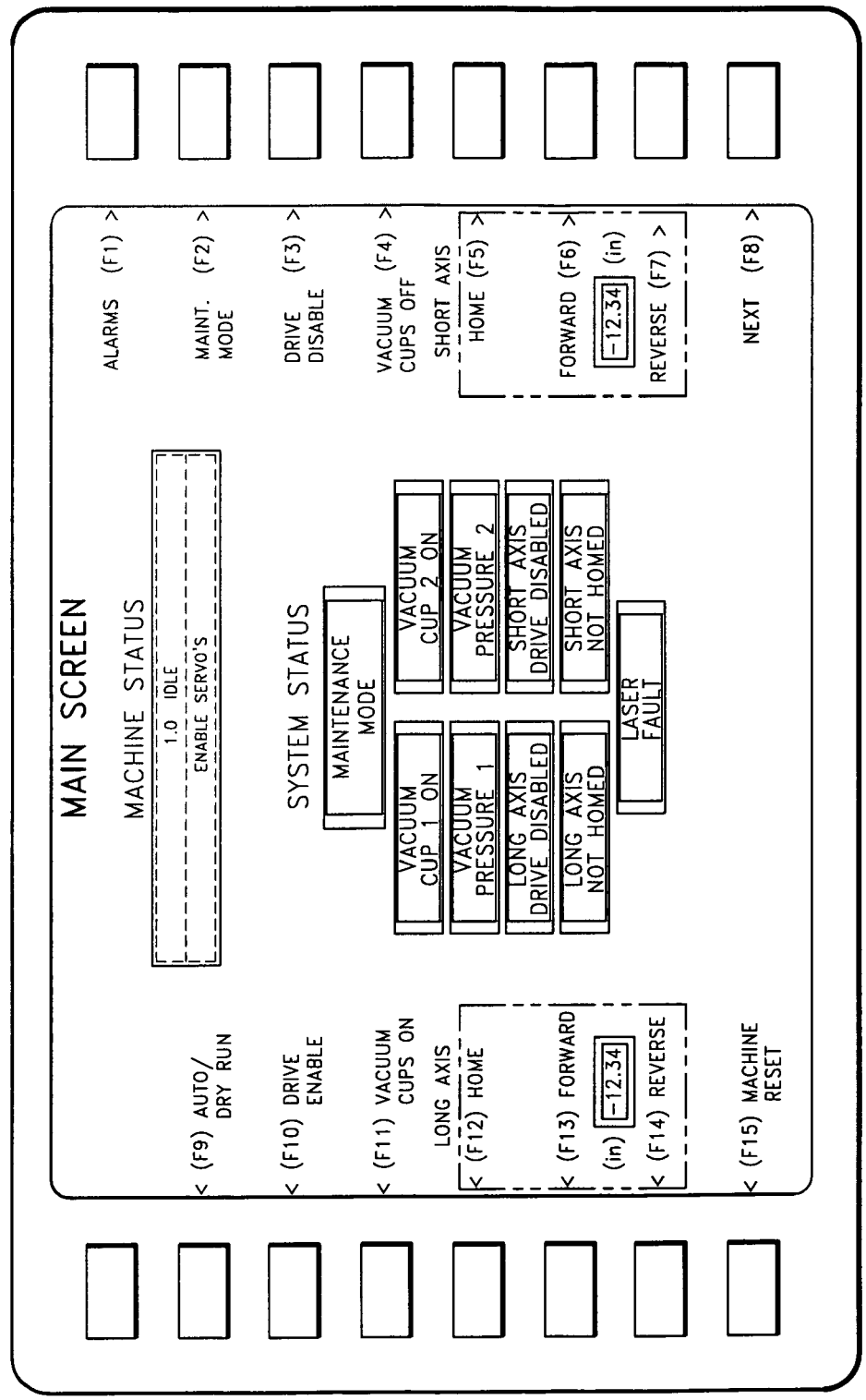
FIG. 17A illustrates an exemplary "MAIN SCREEN" display of the control pendant.

The "MAIN SCREEN" display of FIG. 17A comprises a "Machine Status" field, a "System Status" field, and label fields corresponding to the functions of some or all of the buttons 574 of the control pendant 570. The "Machine Status" field includes a text message which describes what the apparatus 50 is doing and what the user may do next. The "System Status" field includes a box which shows the operational mode of the apparatus 50. In the example illustrated by FIG. 17A, the apparatus is in "maintenance mode." The "System Status" field also includes a plurality of status boxes which indicate the status of various components of the apparatus 50, including, but not limited to, the vacuum pads 112 of the anchoring system 110, the air or vacuum pressure, the first-axis position system 130, and the second-axis position system 150. The "System Status" field also indicates whether there are any faults sensed with the laser base unit 300. In certain embodiments, nominal status of a component is shown with the corresponding status box as green. The ready state of the apparatus 50 is illustrated by having all the system status boxes appear as green. If the status of one of these components is outside operational parameters, the corresponding status box is shown as red, and the system interlocks are enabled, preventing operation of the apparatus 50. Upon startup, the system interlocks are enabled and must be cleared prior to operation of the apparatus 50. The text messages of the "Machine Status" field provide information regarding the actions to be performed to place the apparatus 50 within operational parameters and to clear the system interlocks. Upon clearing all the system interlocks, the "Machine Status" field will indicate that the apparatus 50 is ready to be used.

Figure 17B:
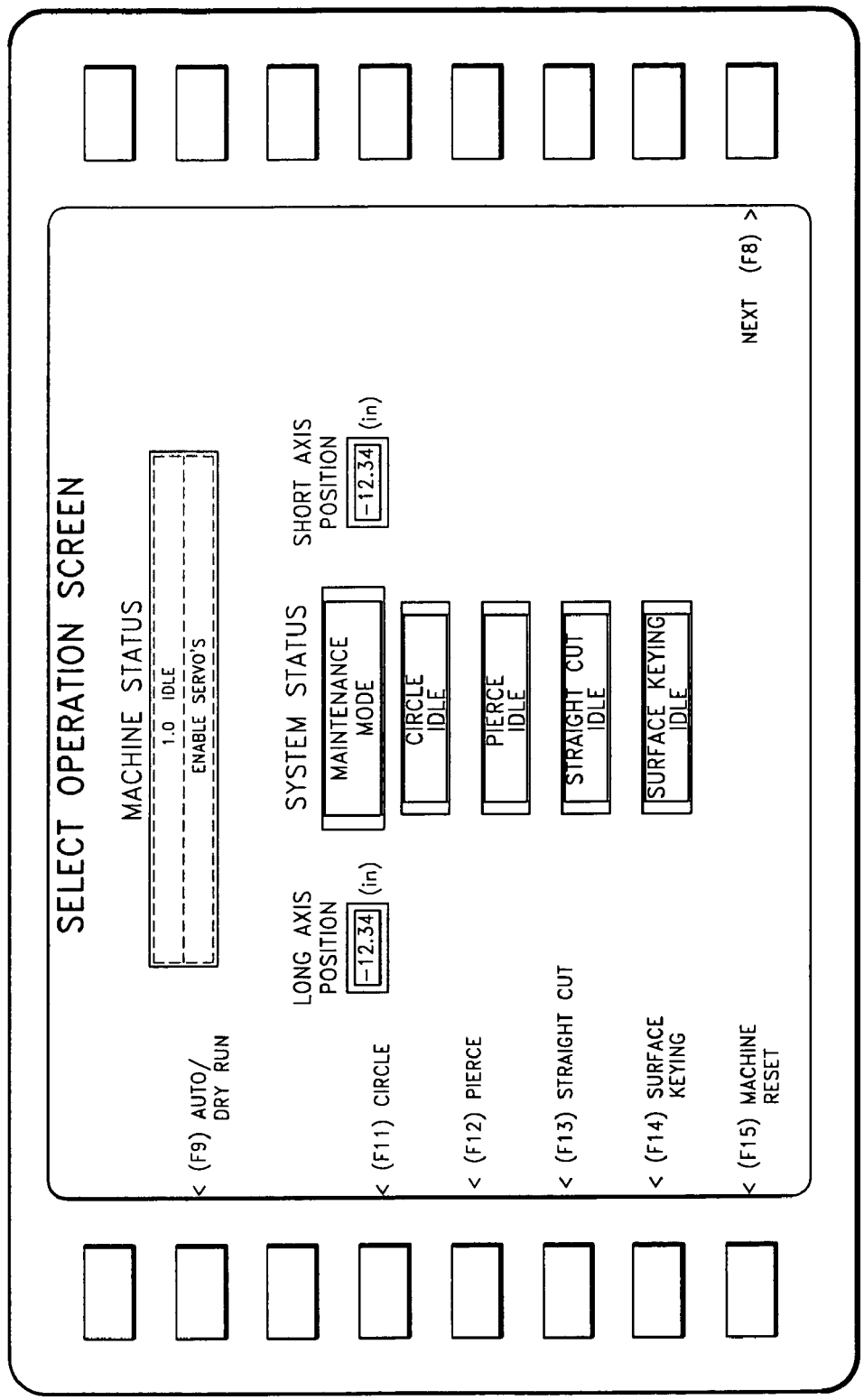
FIG. 17B illustrates an exemplary "SELECT OPERATION SCREEN" display of the control pendant.

The "SELECT OPERATION SCREEN" display of FIG. 17B comprises the "Machine Status" field, the "System Status" field, and the label fields corresponding to the functions of some or all of the buttons 574. The "System Status" field includes information regarding the position of the laser head 200 along the first-axis position system 130 (referred to as the long axis) and the second-axis position system 150 (referred to as the short axis). Some of the buttons 574 are configured to enable various operations. For example, four buttons 574 are configured to enable four different operations: circle, pierce, straight cut, and surface keying, as illustrated in FIG. 17B.

Figure 17C:
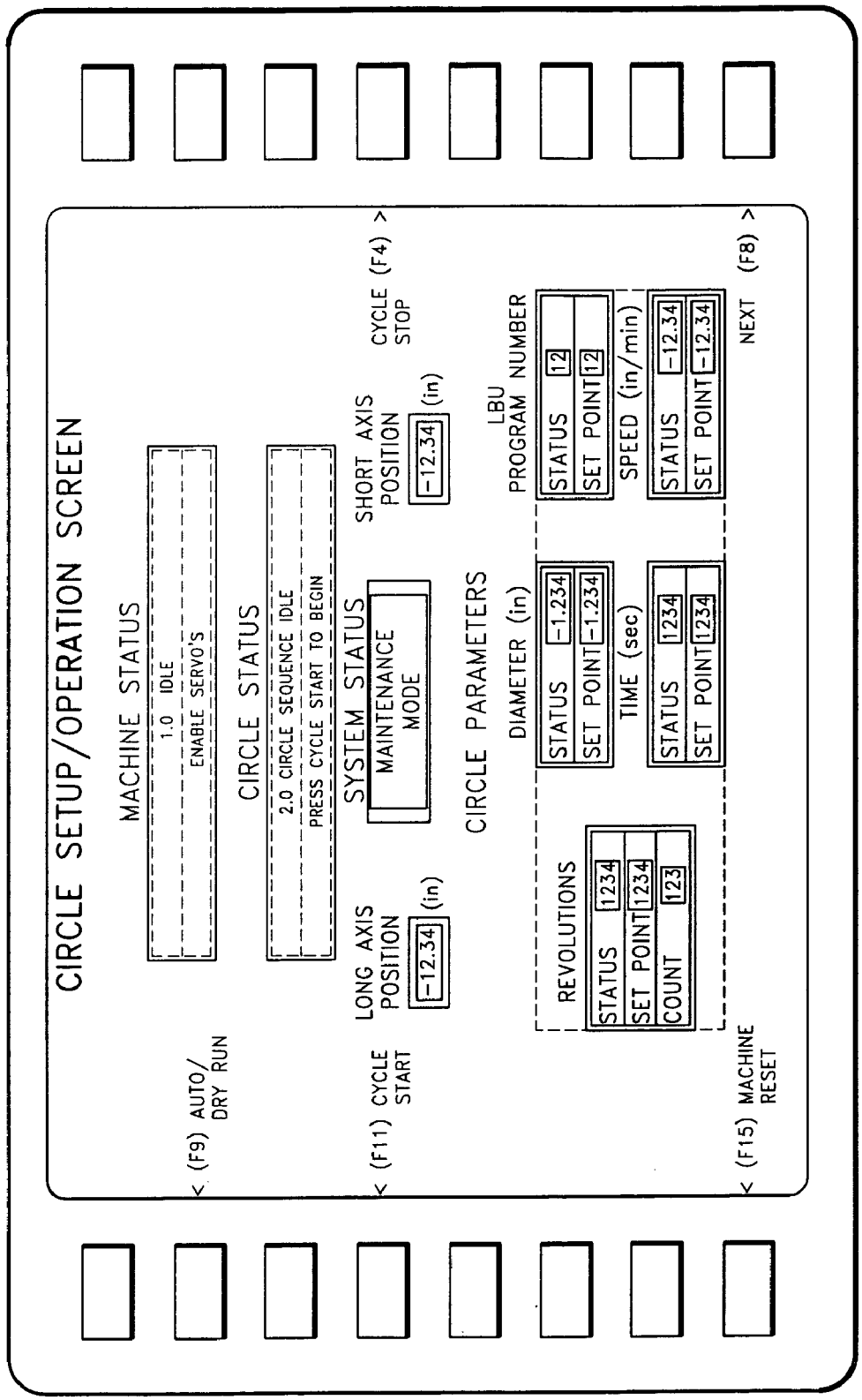
FIG. 17C illustrates an exemplary "CIRCLE SETUP/OPERATION SCREEN" display of the control pendant.

FIG. 17C shows a "CIRCLE SETUP/OPERATION SCREEN" display which provides information regarding the circle operation of the apparatus 50 in which the laser head 200 moves circularly to cut a circular pattern to a desired depth into the surface of the structure to be processed. In certain embodiments, the circle operation can be used for "trepanning," whereby a solid circular core is cut and removed from the surface, leaving a circular hole.

A "Circle Status" field provides information regarding the status of the circle operation and corresponding instructions to the user. The starting position of the laser head 200 along the first-axis position system 130 and the second-axis position system 150 are provided in the "System Status" field. A "Circle Parameters" field provides information regarding various parameters associated with the cutting of a circular pattern, including, but not limited to, the number of revolutions around the circular pattern, the diameter, time period that the cutting will be performed, the speed of motion of the laser head 200 around the circle, and the laser base unit (LBU) program number. In certain embodiments, the LBU program number corresponds to operational parameters of the laser head 200 including, but not limited to, beam focus and intensity.

In certain embodiments, the various parameters can be changed by touching the parameter on the screen 572, upon which a numerical keypad will pop up on the screen 572 so that a new value can be entered. For each parameter, the "set point" value corresponds to the value currently in memory and the last value that was entered. The "status" value corresponds to the current value being selected. Upon saving the new parameter value, the "status" and "set point" values are the same. Pressing the button 574a labeled "Auto/Dry Run" will initiate the circular movement of the laser head 200 without activating the laser beam, to ensure the desired motion. Pressing the button 574b labeled "Cycle Start" will initiate the cutting of the circular pattern, including both the movement of the laser head 200 and the activation of the laser beam. Pressing the button 574c labeled "Cycle Stop" will halt or pause the cutting and movement, with the option to re-start the cutting and movement where it was halted. Pressing the button 574d labeled "Machine Reset" will place the apparatus 50 in a neutral condition. Pressing the button 574e labeled "Next" upon completion of the cutting will return to the "SELECT OPERATION SCREEN."

Figure 17D:
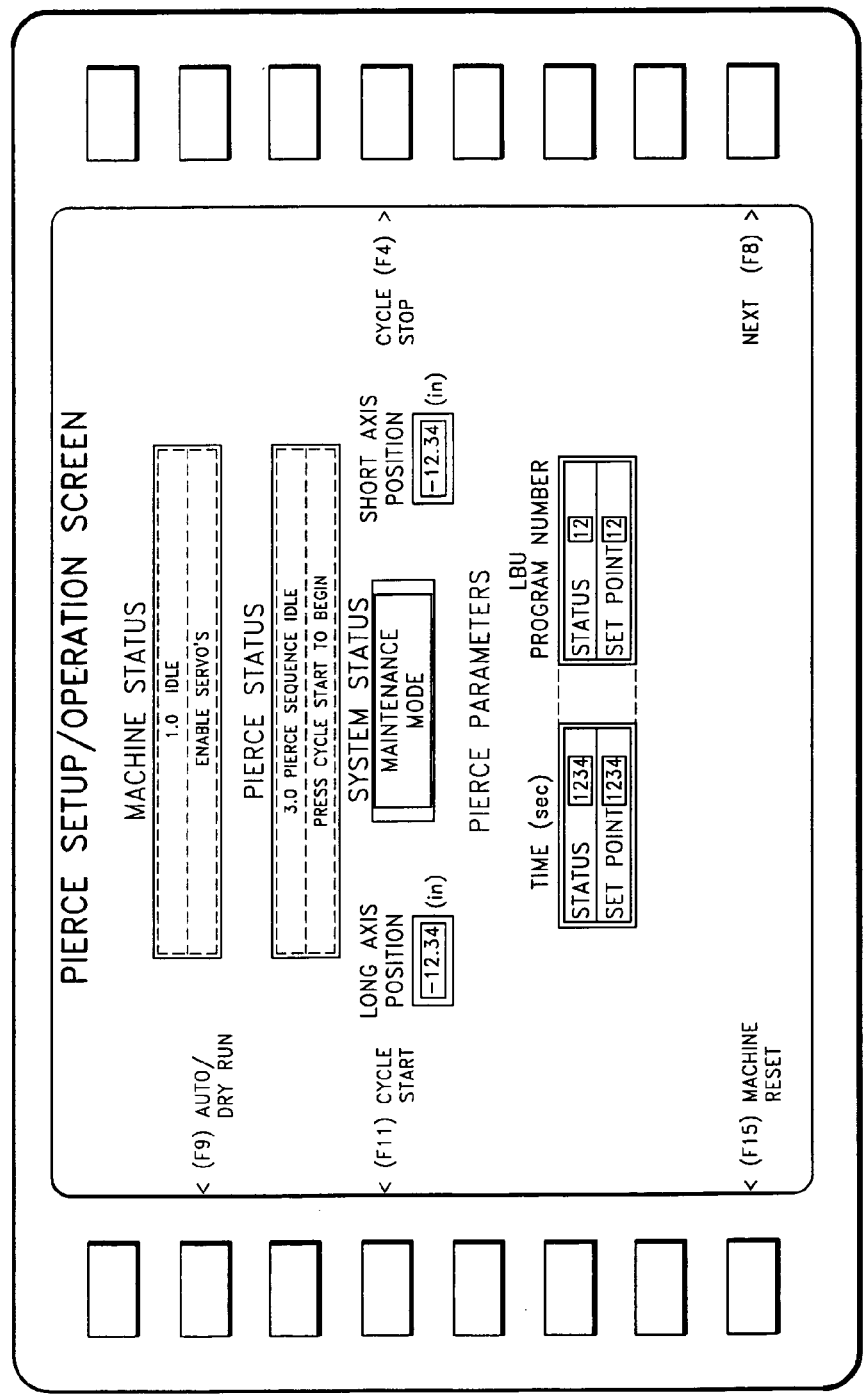
FIG. 17D illustrates an exemplary "PIERCE SETUP/OPERATION SCREEN" display of the control pendant.

FIG. 17D shows a "PIERCE SETUP/OPERATION SCREEN" display which provides information regarding the pierce operation of the apparatus 50 in which the laser head 200 drills a hole to a desired depth into the surface of the structure to be processed. A "Pierce Status" field provides information regarding the status of the pierce operation and corresponding instructions to the user. The starting position of the laser head 200 along the first-axis position system 130 and the second-axis position system 150 are provided in the "System Status" field. A "Pierce Parameters" field provides information regarding various parameters associated with the drilling of a hole. The laser parameters can include, but are not limited to, the laser power, the laser spot size, and the time period for drilling (each of which can influence the diameter of the resultant hole which is formed in the structure), and the LBU program number. The parameters can be changed as described above. The buttons 574 labeled "Auto/Dry Run," "Cycle Start," "Cycle Stop," "Machine Reset," and "Next" operate as described above.

Figure 17E:
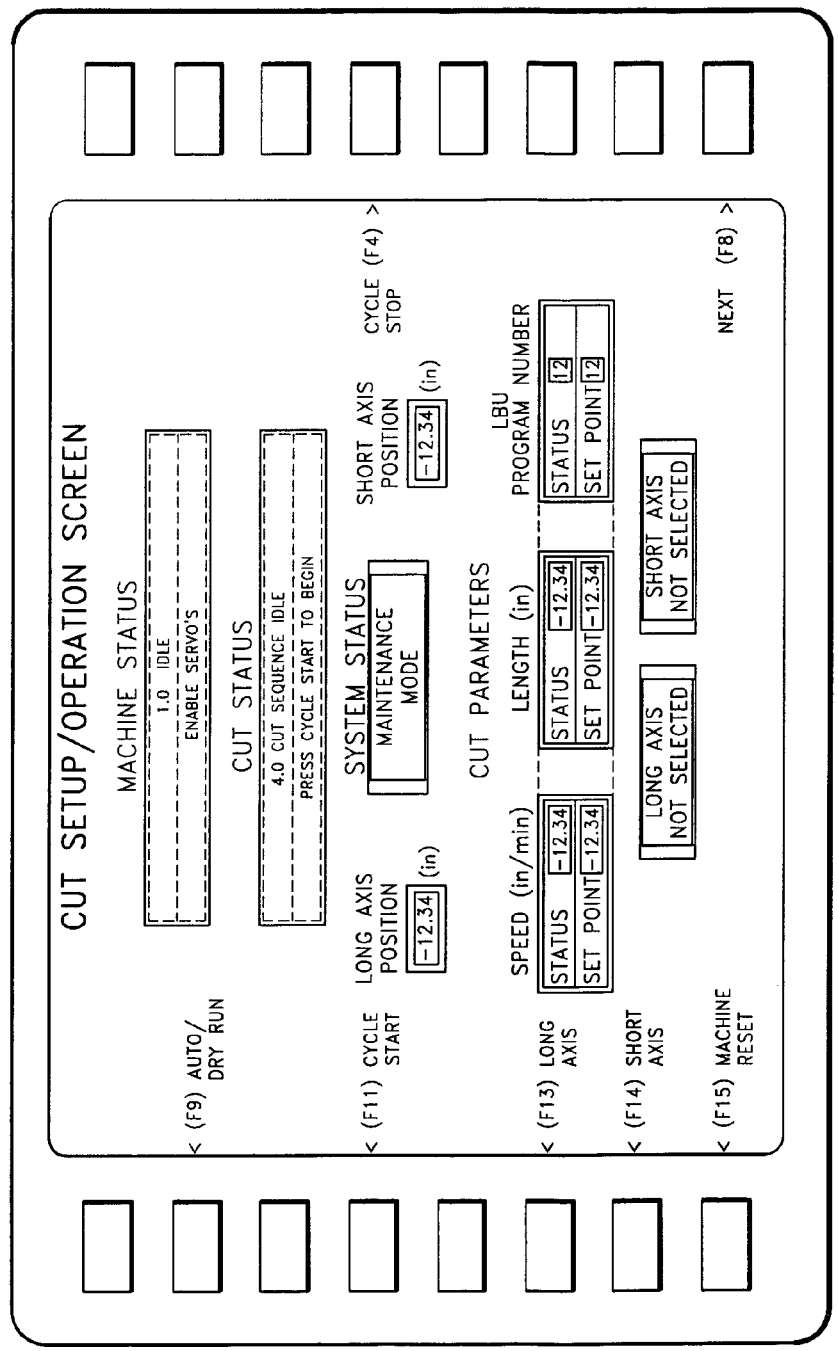
FIG. 17E illustrates an exemplary "CUT SETUP/OPERATION SCREEN" display of the control pendant.

FIG. 17E shows a "CUT SETUP/OPERATION SCREEN" display which provides information regarding the straight cutting operation of the apparatus 50 in which the laser head 200 makes a straight cut to a desired depth in the surface of the structure to be processed. The straight cut is preferably along one of the axes of the apparatus 50. A "Cut Status" field provides information regarding the status of the cut operation and corresponding instructions to the user. The starting position of the laser head 200 along the first-axis position system 130 and the second-axis position system 150 are provided in the "System Status" field. A "Cut Parameters" field provides information regarding various parameters associated with the cutting, including, but not limited to, the speed of motion of the laser head 200, the length of the cut to be made, and the LBU program number. The parameters can be changed as described above. The buttons 574f, 574g labeled "Long Axis" and "Short Axis" are used to select either the first axis or the second axis respectively as the axis of motion of the laser head 200. The buttons 574 labeled "Auto/Dry Run," "Cycle Start," "Cycle Stop," "Machine Reset," and "Next" operate as described above.

Figure 17F:
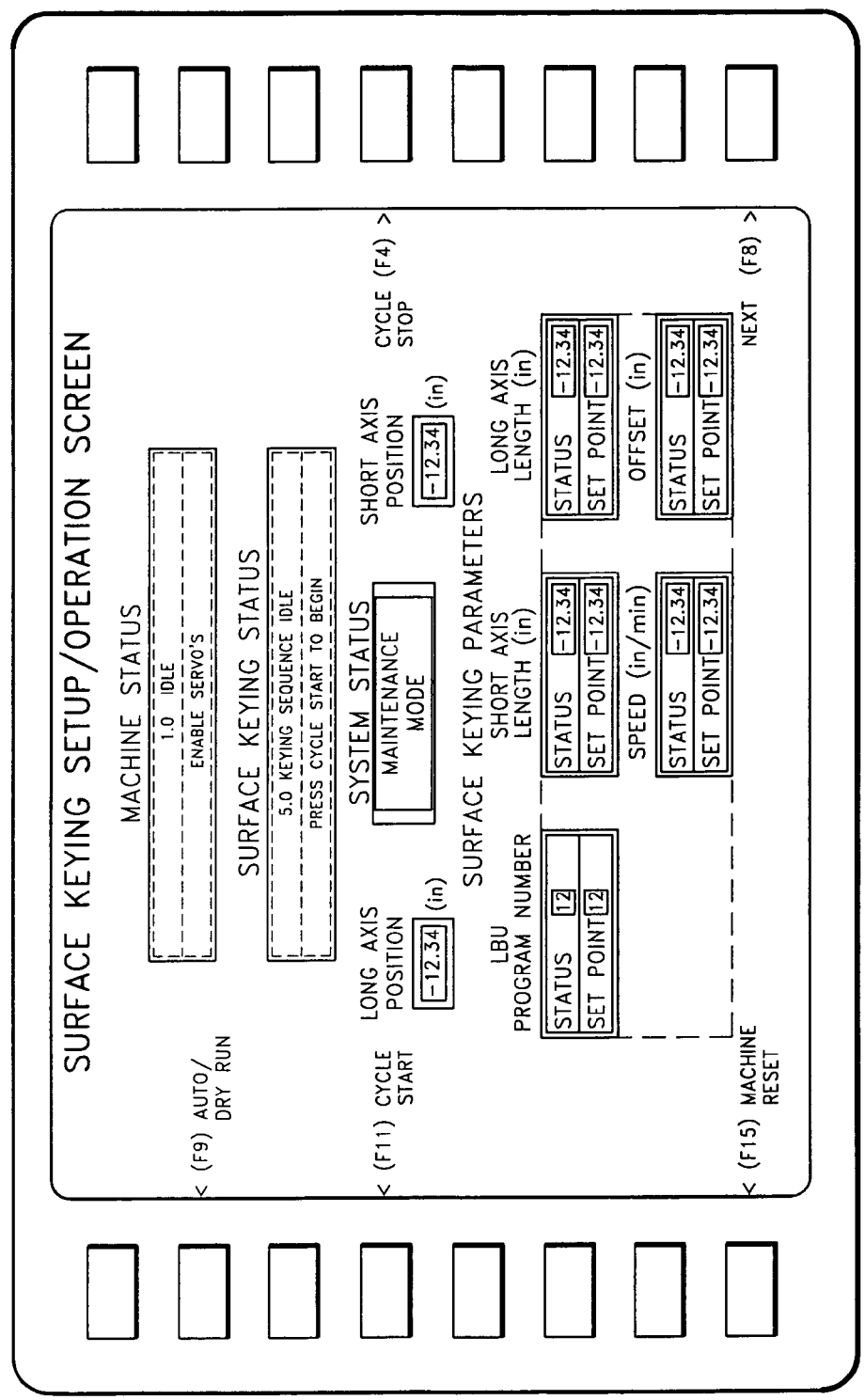
FIG. 17F illustrates an exemplary "SURFACE KEYING SETUP/OPERATION SCREEN" display of the control pendant.

FIG. 17F shows a "SURFACE KEYING SETUP/OPERATION SCREEN" display which provides information regarding the surface keying operation of the apparatus 50 in which the laser head 200 cuts an indentation or key into the surface of the structure to be processed. The surface keying operation includes scanning the laser beam across the surface to create an indentation or "key" in the surface with a desired depth and with a generally rectangular area. In certain embodiments, the surface keying operation can be used to perform "scabbling" of the surface, whereby the surface is roughened by interaction with the laser beam across an area (e.g., rectangular).

A "Surface Keying Status" field provides information regarding the status of the surface keying operation and corresponding instructions to the user. The starting position of the laser head 200 along the first-axis position system 130 and the second-axis position system 150 are provided in the "System Status" field. A "Surface Keying Parameters" field provides information regarding various parameters associated with the cutting, including, but not limited to, the speed of motion of the laser head 200, the length of the key to be made along the first axis and along the second axis, the offset length that the apparatus 50 will increment between movement along the first axis and the second axis, and the LBU program number. The parameters can be changed as described above. The buttons 574f, 574g labeled "Long Axis" and "Short Axis" are used to select either the first axis or the second axis respectively as the axis of motion of the laser head 200. The buttons 574 labeled "Auto/Dry Run," "Cycle Start," "Cycle Stop," "Machine Reset," and "Next" operate as described above.

Figure 17G:
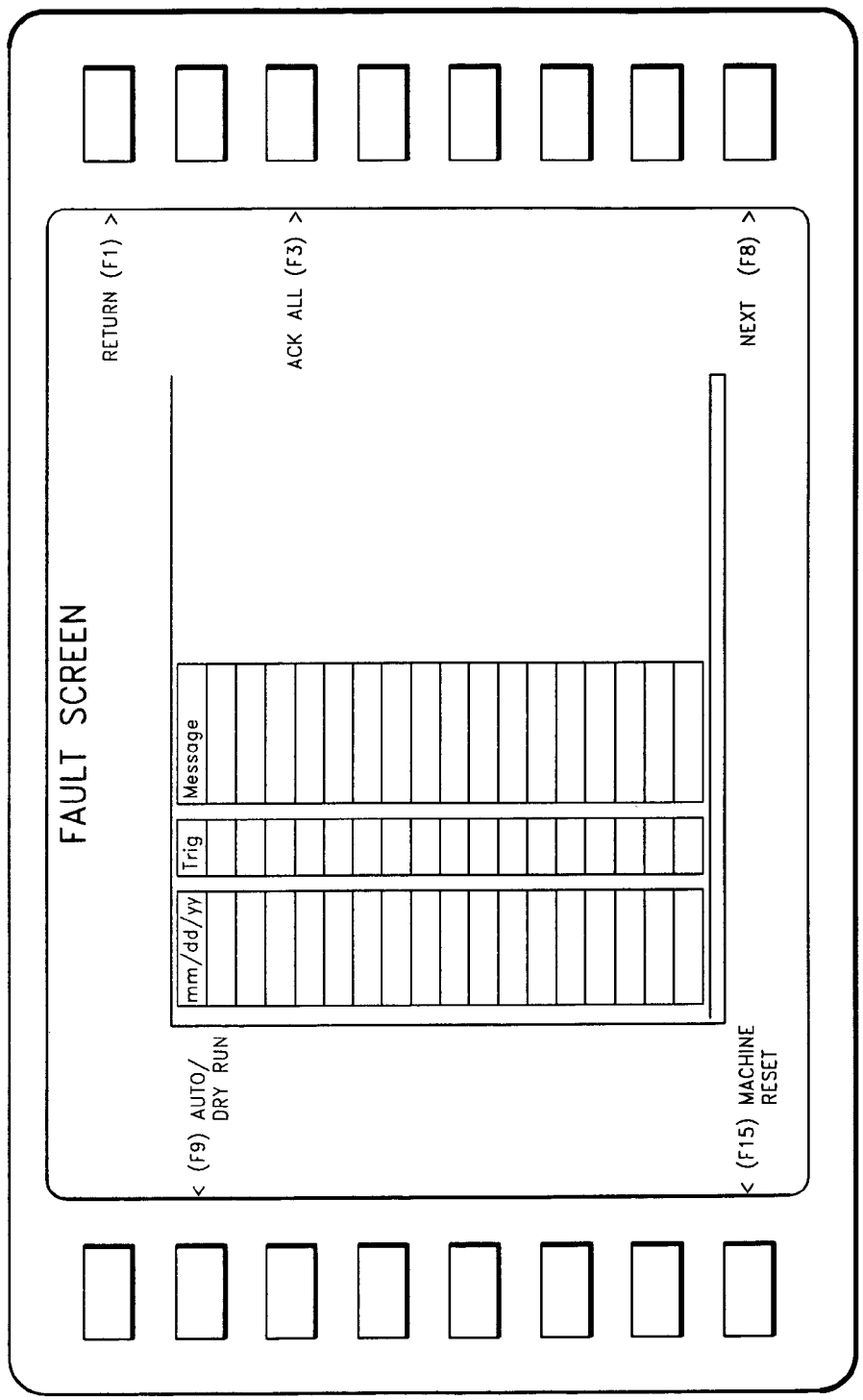
FIG. 17G illustrates an exemplary "FAULT SCREEN" display of the control pendant.

FIG. 17G shows a "FAULT SCREEN" display which provides information regarding detected operation faults. A fault occurs when a sensor (e.g., flowmeters, temperature sensors, safety switches, emergencies stops) of the monitored systems detects a non-operational condition, and can occur while the apparatus 50 is any of the operational modes and while any of the screens are being displayed. When a fault occurs, a scrolling message indicating the fault is preferably provided at the bottom of the current screen being displayed. In addition, the "Machine Status" field will indicate to the user to clear the faults. The "FAULT SCREEN" can be accessed from any of the other screens by pressing an appropriate button 574. As illustrated in FIG. 17G, in certain embodiments, the "FAULT SCREEN" displays the detected faults in a table with the relevant data, including, but not limited to, the date and the type of fault. To prepare the apparatus 50 for operation, the detected faults are preferably cleared by the user. After clearing the detected faults, the user can press an appropriate button 574 (e.g., "Acknowledge All") to acknowledge the faults. If the faults are not cleared, the user can press an appropriate button 574 (e.g., "Machine Reset") to return to the screen being displayed when the fault occurred. Pressing the "Machine Reset" button 574 again will return the user to the "MAIN SCREEN" from where the apparatus 50 can be reset.

Figure 17H:
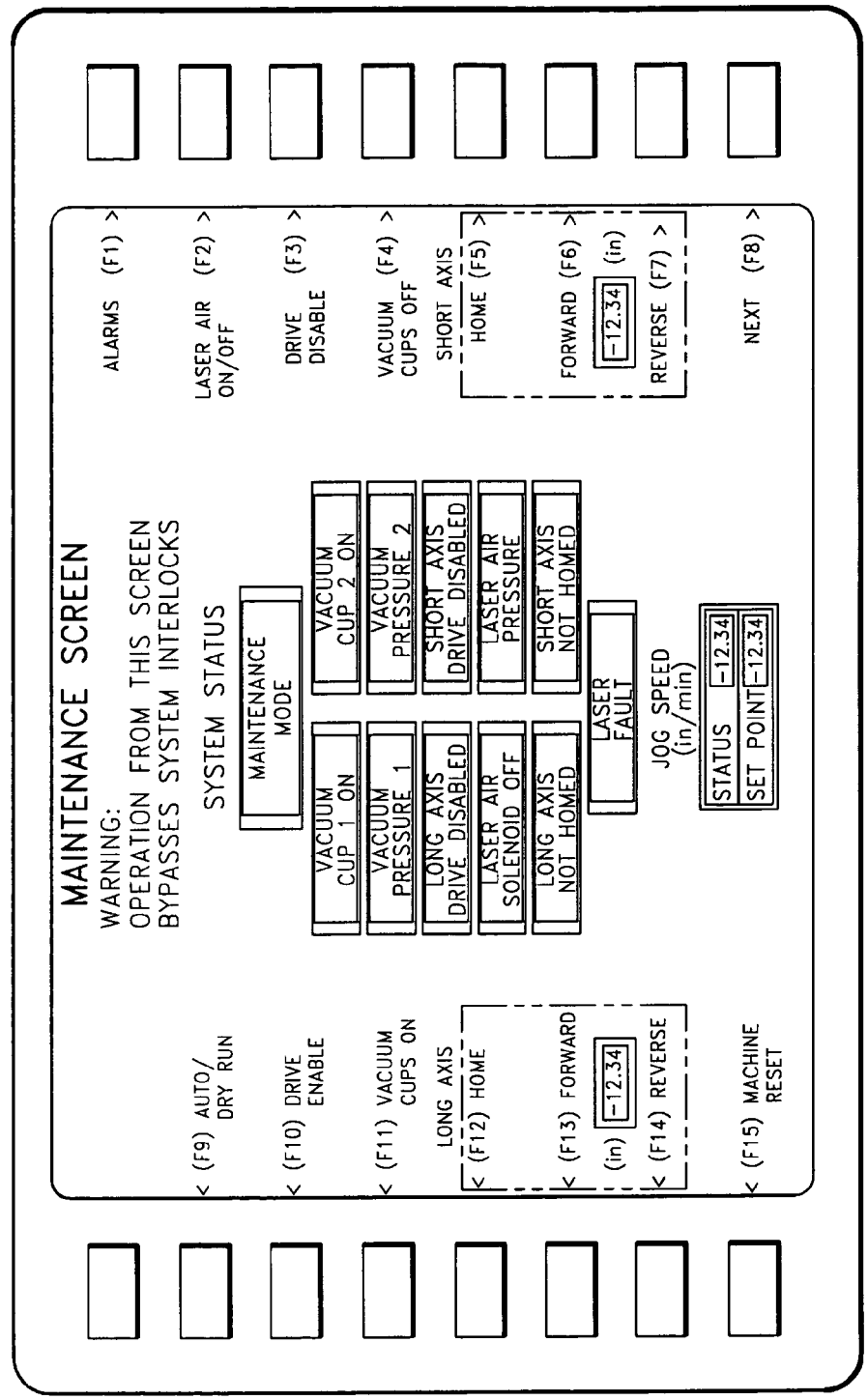
FIG. 17H illustrates an exemplary "MAINTENANCE SCREEN" display of the control pendant.

FIG. 17H shows a "MAINTENANCE SCREEN" display which provides information regarding the apparatus 50. The maintenance mode can be accessed from the "MAIN SCREEN" display by pressing an appropriate button 574. In the maintenance mode, the system interlocks are bypassed, therefore the user preferably practices particular care to avoid damaging the apparatus 50 or people or materials in proximity to the apparatus 50. The "MAINTENANCE SCREEN" can display an appropriate warning to the user.

The maintenance mode provides an opportunity for the user to check the operation of various components of the apparatus 50 independent of the fault status of the apparatus 50. For example, by pressing appropriate buttons 574 in the maintenance mode, the vacuum system can be turned on and off, the compressed air can be turned on and off via a solenoid valve, and the first drive 136 and second drive 154 can be turned on and off. In addition, the default jog speed of the first axis and second axis can be changed by pressing the screen 572 to pop up a numerical keypad display, as described above.

The "System Status" field also includes a plurality of status boxes which indicate the status of various components of the apparatus 50, including, but not limited to, the vacuum pads 112 of the anchoring system 110, the air or vacuum pressure, the first-axis position system 130, and the second-axis position system 150. The "System Status" field also indicates whether there are any faults sensed with the laser base unit 300. In certain embodiments, nominal status of a component is shown with the corresponding status box as green. The ready state of the apparatus 50 is illustrated by having all the system status boxes appear as green. If the status of one of these components is outside operational parameters, the corresponding status box is shown as red.

The "MAINTENANCE SCREEN" can also provide the capability to move the laser head 200 along the first axis and second axis, as desired. A set of three buttons 574 are configured to move the laser head 200 along the first axis to a home position, in a forward direction, or in a backward direction, respectively. Similarly, another set of three buttons 574 are configured for similar movement of the laser head 200 along the second axis. The label field for these sets of buttons can include information regarding the position of the laser head 200 along these two axes.

Detector

In certain embodiments, the controller 500 is coupled to a detector 600 adapted to detect embedded material in the structure while processing the structure, and to transmit detection signals to the controller 500. In certain embodiments, the controller 500 is adapted to avoid substantially damaging the embedded material by transmitting appropriate control signals to the laser base unit 300 or to both the laser base unit 300 and the laser manipulation system 100. In certain embodiments, the detector 600 is adapted to utilize light emitted by the interaction region during processing to detect embedded material.

Various technologies for detecting embedded material are compatible with embodiments of the present invention. Spectral analysis of the light emitted by the interaction region during processing can provide information regarding the chemical constituents of the material in the interaction region. By analyzing the wavelength and/or the intensity of the light, it is possible to determine the composition of the material being heated and its temperature. Using spectroscopic information, the detection of embedded materials in certain embodiments relies on monitoring changes in the light spectrum during processing. With the differences in composition of embedded materials, by way of example and not limitation, such as rebar (e.g., steel) embedded in concrete, variations in the melting and boiling temperatures for the diverse materials will produce noticeable changes in the amount of light, and/or the wavelength of the light when the laser light impinges and heats the embedded material.

Figure 18A:
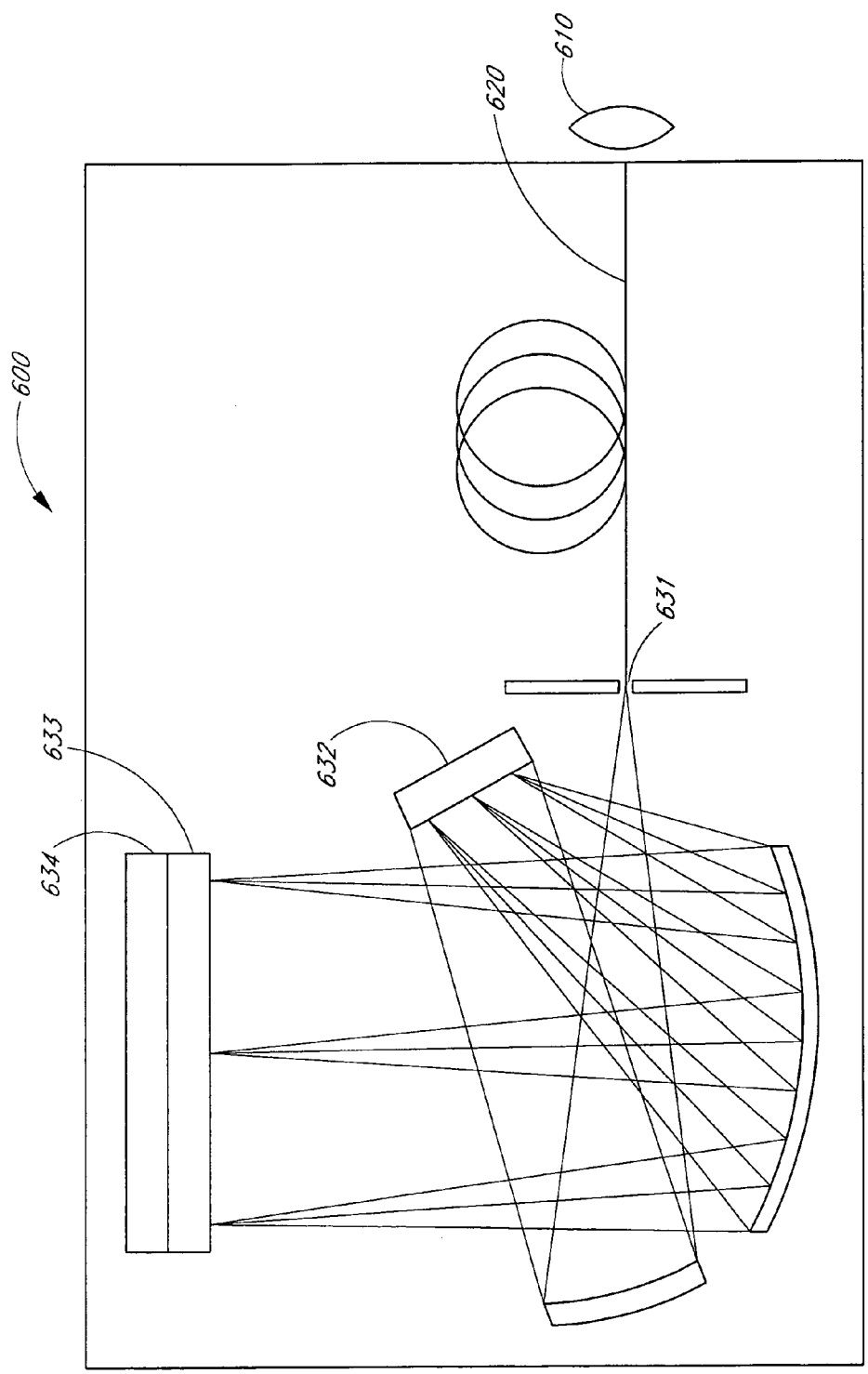
FIG. 18A schematically illustrates a detector compatible with embodiments described herein.

FIG. 18A schematically illustrates an exemplary detector 600 compatible with embodiments described herein. The detector 600 comprises a collimating lens 610, an optical fiber 620, and a spectrometer 630. The spectrometer 630 of certain embodiments comprises an input slit 631, an optical grating 632, a collection lens 633, and a light sensor 634. The collimating lens 610 is positioned to receive light emitted from the interaction region, and to direct the light onto the optical fiber 620. The optical fiber 620 then delivers the light to the spectrometer 630, and the light is transmitted through the input slit 631 to the optical grating 632 of the spectrometer 630. The optical grating 632 separates the light into a spectrum of wavelengths. The separated light having a selected range of wavelengths can then be directed through the collection lens 633 onto the light sensor 634 which generates a signal corresponding to the intensity of the light in the range of wavelengths.

In certain embodiments, at least a portion of the detector 600 is mounted onto the laser head 200. In embodiments in which the collimating lens 610 is part of the laser head 200, the collimating lens 610 can be positioned close to the axis of the emitted laser light so as to receive light from the interaction region. In such embodiments, the collimating lens 610 can be behind the nozzle 244 and protected by the compressed air from the compressed air inlet 249, as is the window 243. In certain embodiments, the collimating lens 610 is coaxial with the laser beam, while in other embodiments, the collimating lens 610 is located off-axis. Exemplary collimating lenses 610 include, but are not limited to, UV-74 from Ocean Optics of Dunedin, Fla.

In certain embodiments, the optical fiber 620 comprises a material selected to provide sufficiently low attenuation of the light intensity transmitted from the laser head 200 to the spectrometer 630. Exemplary materials for the optical fiber 620 include, but are not limited to, silica and fused silica. In certain embodiments, the optical fiber 620 comprises a pure fused silica core, a doped fused silica cladding, and a polyimide buffer coating. In addition, the optical fiber 620 of certain embodiments is protected by an outer jacket (e.g., Teflon®, Tefzel®, Kevlar®, and combinations thereof) and a stainless steel sheath. In addition, the optical fiber 620 of certain embodiments is connectable to the laser head 200 using a right-angle fiber mount. Other types of optical fibers 620 and mounting configurations are compatible with embodiments described herein. Exemplary optical fibers 620 include, but are not limited to, P400-2-UV/VIS from Ocean Optics of Dunedin, Fla.

In certain embodiments, the spectrometer 630 comprises an adjustable input slit 631. The input slit 631 of certain embodiments has a height of approximately 1 millimeter and a width in a range between approximately 5 microns and approximately 200 microns. The input slit 631 determines the amount of light entering the spectrometer 630. The width of the input slit 631 affects the resolution of the light sensor 634. For example, in certain embodiments, an input slit width of approximately 5 microns corresponds to a resolution of approximately 3 pixels, while an input slit width of approximately 200 microns corresponds to a resolution of approximately 24 pixels. The width of the input slit 631 is advantageously selected to provide sufficient light transmittance as well as sufficient resolution.

The optical grating 632 of certain embodiments receives light from the input slit 631 and diffracts the various wavelength components of the light by corresponding angles dependent on the wavelength of the light. In this way, the optical grating 632 separates the various wavelength components of the light. In certain embodiments, the angle between the optical grating 632 and the light from the input slit 631 is scanned (e.g., by moving the optical grating 632), thereby scanning the wavelength components which reach the light sensor 634. Exemplary spectrometers 630 utilizing an optical grating 632 include, but are not limited to, USB2000(VIS/UV) from Ocean Optics of Dunedin, Fla.

In certain embodiments, the collection lens 633 of the spectrometer 630 is adapted to increase the light reception efficiency of the light sensor 634. In certain embodiments, the collection lens 633 comprises a cylindrical lens affixed onto the light sensor 634. Such embodiments of the collection lens 633 are advantageously useful with large diameter entrance apertures (limited by the width of the input slit 631 or the size of the optical fiber 620) and with low-light-level applications. In addition, in certain embodiments, the collection lens 633 improves the efficiency of the spectrometer 630 by reducing the amount of stray light which reaches the light sensor 634. Other spectrometers 630 with other configurations of the input slit 631, the optical grating 632, and the collection lens 633 are compatible with embodiments described herein.

Figure 18B:
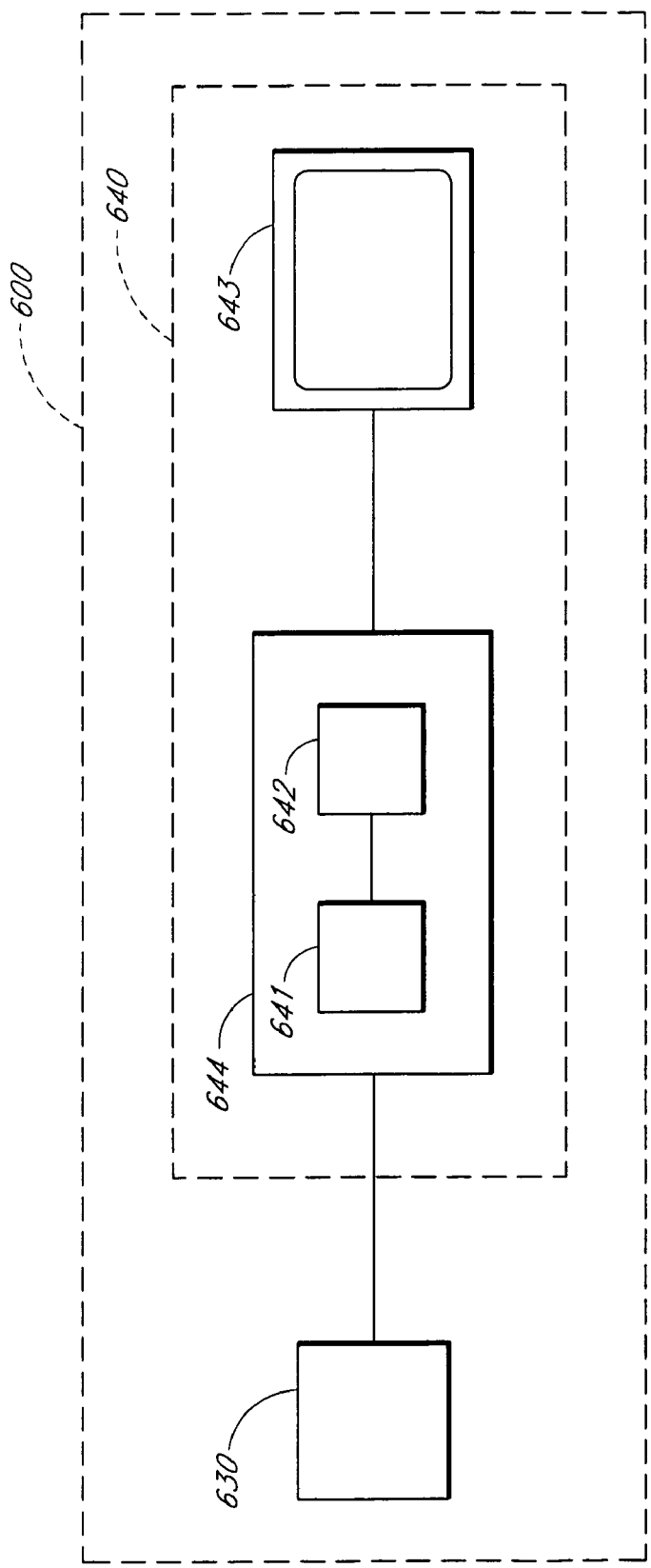
FIG. 18B schematically illustrates a computer system adapted to analyze the resulting spectroscopic data.

In certain embodiments, the detection system 600 comprises a computer system 640 coupled to the spectrometer 630, as schematically illustrated by FIG. 18B. The computer system 640 is adapted to analyze the resulting spectroscopic data. The computer system 640 of certain embodiments comprises a microprocessor 641, a memory subsystem 642, and a display 643. To provide more robustness to the computer system 640, the microprocessor 641 and the memory subsystem 642 can be mounted within a National Electrical Manufacturers Association (NEMA)-rated enclosure 644 with input and output power and signal connections on one or more side panels of the enclosure for easy access. In certain embodiments, the computer system 640 is powered by 110 V from a wall outlet, while in certain embodiments, the computer system 630 further comprises a battery backup power supply (not shown) to ensure functionality in the event of power loss.

In certain embodiments, the microprocessor 641 comprises a Pentium-200 microprocessor chip, while in other embodiments, the microprocessor 641 comprises a Pentium-III 850-MHz microprocessor chip. In certain embodiments, the memory subsystem 642 comprises a hard disk drive.

Other types of microprocessors 641 and memory subsystems 642 are compatible with embodiments described herein.

In certain embodiments, the display 643 comprises a thin-film-transistor (TFT) touch screen display. Besides being used to display spectroscopic results to a user, such a touch screen display can be used to provide user input to the detector 600 to modify various operation parameters.

The spectrometer 630 can monitor specific wavelengths that are associated with various embedded materials in the structure. In certain embodiments, the spectrometer 630 can monitor the relative intensity of the light at, or in spectral regions in proximity to, these wavelengths. Additionally, at least one neutral density filter may be employed to decrease the light reaching the spectrometer 630 to improve spectral analysis performance.

Figure 19:
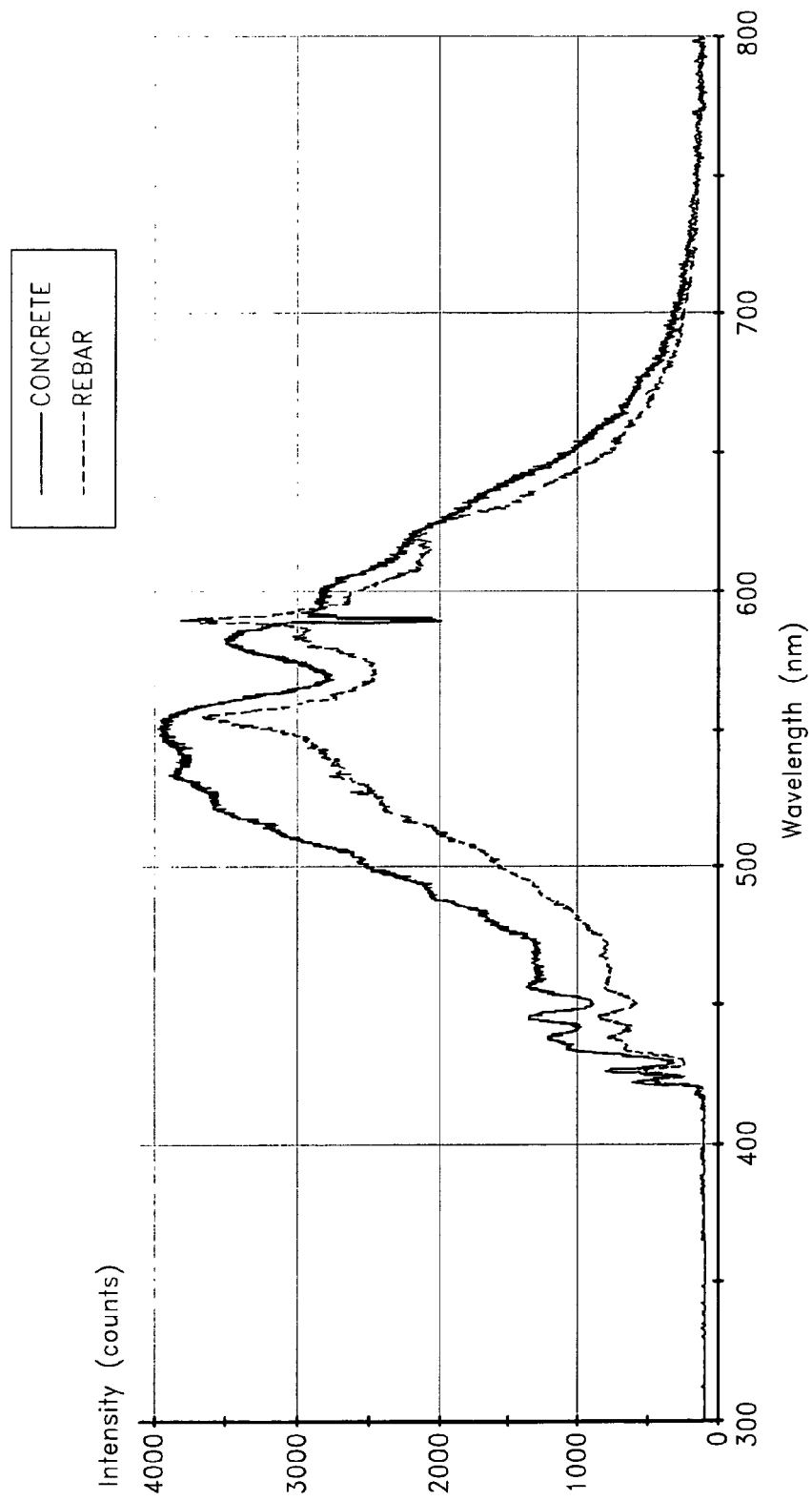
FIG. 19 shows a graph of the light spectrum of wavelengths detected upon irradiating concrete with laser light and the light spectrum detected upon irradiating concrete with embedded rebar.

In certain embodiments, the spectrometer 630 monitors the intensity at a specific wavelength and the intensities on both sides of this wavelength. The spectrometer 630 of certain embodiments also monitors the reduction of the intensities resulting from the increased depth of the hole being drilled. FIG. 19 shows an exemplary graph of the light spectrum detected upon irradiating concrete with laser light and the light spectrum detected upon irradiating an embedded rebar. The spectrum from concrete shows an emission peak at a wavelength of approximately 592 nanometers. The spectrum from rebar does not have this emission peak, but instead shows an absorption dip at approximately the same wavelength. Thus, the emission spectrum at about 592 nanometers can be used to provide a real-time indication of whether an embedded rebar is being cut by the laser light. For example, in certain embodiments in which the detector 600 assumes that either a valley or a peak exists in the spectrum at 592 nanometers, by sampling the emission spectrum at about 588.5 nanometers, 592 nanometers, and 593 nanometers, and calculating the ratio: $(2 \times I_{592})/(I_{593} + I_{588.5})$, the detector 600 can determine whether the emission spectrum has a dip corresponding to concrete or a peak corresponding to embedded rebar. Other spectroscopic data can be used in other embodiments.

Figure 22:
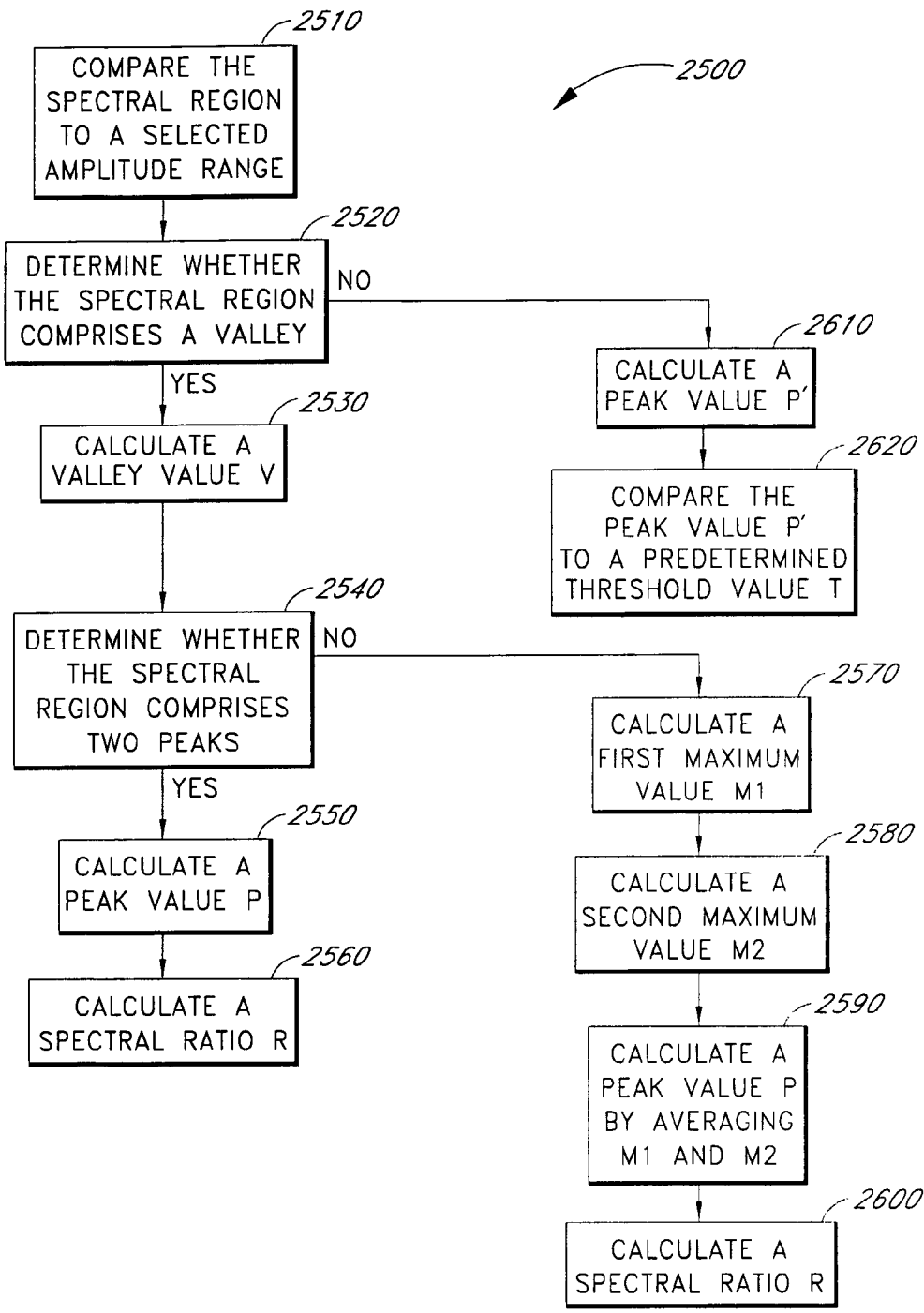
FIG. 22 is a flowchart of an exemplary method for determining a spectral ratio in accordance with embodiments described herein.

In certain embodiments, the detector 600 examines a spectral region defined by an upper cutoff wavelength (e.g., 582 nanometers) and a lower cutoff wavelength (e.g., 600 nanometers) and determines a spectral ratio R characteristic of the detection or non-detection of embedded rebar. FIG. 22 is a flowchart of an exemplary method 2500 for determining the spectral ratio R in accordance with embodiments described herein. The method 2500 does not address changes in the light from the interaction region as the hole becomes deeper.

In certain embodiments, the method 2500 comprises an operational block 2510 in which the data within the spectral region is compared to a selected amplitude range. If any of the data fall outside the amplitude range, the spectrum is deemed to correspond to non-detection of embedded rebar.

In certain embodiments, the method 2500 further comprises analyzing the data of the spectral region to determine the existence of a valley and two peaks. In certain embodiments, this analysis comprises determining whether the data of the spectral region comprises a valley in an operational block 2520. If a valley is determined to exist, then a valley value V is calculated in an operational block 2530 and the spectral region is analyzed to determine whether the data of the spectral region comprises two peaks in an operational block 2540. In certain embodiments, the valley value V corresponds to the amplitude of the data at the valley. In certain other embodiments, calculating the valley value V comprises determining a minimum value of the data in a first portion of the spectral region. In certain embodiments, the first portion of the spectral region corresponds to a range of wavelengths between approximately 588 nanometers and approximately 594 nanometers.

If the data of the spectral region is determined to contain two peaks, then a peak value P is calculated in the operational block 2550 and the spectral ratio R is calculated by dividing the valley value V by the peak value P in an operational block 2560. In certain embodiments, the peak value P is calculated by averaging the values of the two peaks. If the spectral ratio R is greater than or equal to one, then the spectrum is deemed to correspond to detection of embedded rebar.

If the data of the spectral region is determined to not contain two peaks, then in certain embodiments, a first maximum value M1 is calculated from the data of a second portion of the spectral region in an operational block 2570 and a second maximum value M2 is calculated from the data of a third portion of the spectral region in an operational block 2580. In certain embodiments, the second portion of the spectral region corresponds to a range of wavelengths from approximately 582 nanometers to approximately 588 nanometers, and the third portion of the spectral region corresponds to a range of wavelengths from approximately 594 nanometers to approximately 600 nanometers. In certain embodiments, the first maximum value M1 corresponds to a maximum data amplitude in the second portion of the spectral region and the second maximum value M2 corresponds to a maximum data amplitude in the third portion of the spectral region. In certain embodiments, the peak value P is calculated by averaging the first maximum value M1 and the second maximum value M2 in an operational block 2590. In such embodiments, the spectral ratio R is calculated by dividing the valley value V by the peak value P in an operational block 2600. If the spectral ratio R is greater than or equal to one, then the spectrum is deemed to correspond to detection of embedded rebar.

If a valley is determined to not exist in the data of the spectral region, a peak value P' is calculated in an operational block 2610 and the peak value P' is compared to a predetermined threshold value T in an operational block 2620. In certain embodiments in which the spectral region comprises one or more peaks, calculating the peak value P' comprises averaging the intensity values of any peaks detected in the spectral region. If the peak value P' is less than the threshold value T, then the spectrum is deemed to correspond to detection of embedded rebar.

An alternative technology for detecting embedded materials uses high speed shutter monitoring. This approach utilizes advances in Coupled Capacitance Discharge (CCD) camera systems to monitor discrete changes in the interactions between the material to be processed and the laser light. Newer CCD cameras have systems that can decrease the time the shutter is open to about 0.0001 second. At this speed, it is possible to see many features of the interaction between the laser light and the material being processed. Additionally, neutral density filters may be employed to decrease the glare observed from the incandescent interaction of the laser light and the material to be processed and to better image the interaction region.

Numerous alterations, modifications, and variations of the various embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and/or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

The corresponding structures, materials, acts, and equivalents of all means or step plus function elements in the claims below are intended to include any structure, material, or acts for performing the functions in combination with other claimed elements as specifically claimed.

What is claimed is:

1. A detection system for use during irradiation of an interaction region of a structure with laser light, the structure comprising embedded material, the detection system comprising:
    an optical system adapted to drill a hole having a depth in a portion of the structure by irradiating the interaction region with the laser light, thereby exposing a portion of the embedded material;
    a collimating lens positioned to receive light emitted from the interaction region during drilling;
    an optical fiber optically coupled to the collimating lens to receive light from the collimating lens; and
    a spectrometer optically coupled to the optical fiber to receive light from the optical fiber, the spectrometer adapted for analysis of the light for indications of the embedded material within the interaction region, the spectrometer comprising:
        an input slit adapted to receive light from the optical fiber, the input slit having a width selected to provide sufficient light transmittance and sufficient resolution;
        an optical grating adapted to receive light from the input slit and to separate the light into a spectrum of wavelengths;
        a collection lens adapted to receive a selected range of wavelengths of the separated light from the optical grating; and
        a light sensor adapted to receive the selected range of wavelengths and to generate a signal corresponding to an intensity of the received light, wherein the detection system is responsive to the signal by avoiding damage to the irradiated embedded material.

2. The detection system of claim 1, wherein the structure comprises concrete and the embedded material comprises rebar.

3. The detection system of claim 1, wherein the width of the input slit is in a range between approximately 5 microns and approximately 200 microns.

4. The detection system of claim 1, wherein the height of the input slit is approximately 1 millimeter.

5. The detection system of claim 1, wherein the light sensor comprises a coupled-capacitance discharge camera system.

6. The detection system of claim 1, further comprising at least one neutral density filter adapted to reduce the light received by the spectrometer.

7. The detection system of claim 1, wherein the collimating lens is coaxial with the laser light impinging on the interaction region.

8. The detection system of claim 1, wherein the collimating lens is off-axis with the laser light impinging on the interaction region.

9. The detection system of claim 1, wherein the structure comprises concrete and the embedded material comprises rebar, and the detection system is adapted to analyze light in a spectral region having an upper cutoff wavelength of approximately 582 nanometers and a lower cutoff wavelength of approximately 600 nanometers.

10. The detection system of claim 9, wherein the detection system is further adapted to analyze the spectral region by calculating a spectral ratio.

11. The detection system of claim 10, wherein the spectral ratio being greater than or equal to one corresponds to rebar within the interaction region.

12. The detection system of claim 1, wherein the detection system further comprises a computer system adapted to analyze spectroscopic data.

13. The detection system of claim 12, wherein the computer system comprises a microprocessor, a memory subsystem, and a display.

14. The detection system of claim 13, wherein the microprocessor and the memory subsystem are mounted in an enclosure.

15. A detection system for use during irradiation of an interaction region of a structure with laser light, the structure comprising embedded material, the detection system comprising:
    means for drilling a hole in the structure, thereby exposing previously-unexposed embedded material within the interaction region;
    means for collecting light emitted from the interaction region during drilling;
    means for separating the collected light into a spectrum of wavelengths; and
    means for analyzing at least a portion of the spectrum and producing a signal indicative of the exposed embedded material within the interaction region, wherein the drilling means is adapted to avoid damaging the irradiated embedded material upon receiving the signal from the analyzing means.

16. A method of detecting an embedded object within a laser-irradiated interaction region of a structure comprising the embedded object, the method comprising:
    drilling a hole in the structure, thereby exposing the embedded object within the interaction region;
    collecting light from the interaction region during drilling;
    separating the collected light into a spectrum of wavelengths;
    analyzing at least a portion of the spectrum for indications of the exposed embedded object within the interaction region; and
    selectively adjusting the drilling in response to the indications, thereby avoiding substantially damaging the embedded object.

17. The method of claim 16, wherein the embedded object comprises a reinforcing member.

18. The method of claim 17, wherein the reinforcing member comprises rebar.

19. A method of detecting an embedded material within a laser-irradiated interaction region of a structure comprising the embedded material, the method comprising:
    drilling a hole in the structure, thereby exposing the embedded material within the interaction region;
    collecting light from the interaction region during drilling;
    separating the collected light into a spectrum of wavelengths;
    analyzing at least a portion of the spectrum for indications of the embedded material within the interaction region; and avoiding irradiation of the interaction region when the indications of the embedded material are detected.

20. The method of claim 19, wherein the embedded material comprises a reinforcing member.

21. The method of claim 20, wherein the reinforcing member comprises rebar.

* * * * *